(12) United States Patent
Yamaoka et al.

(10) Patent No.: US 10,369,862 B2
(45) Date of Patent: Aug. 6, 2019

(54) AIR CONDITIONING DEVICE

(71) Applicant: DENSO CORPORATION, Kariya, Aichi-pref. (JP)

(72) Inventors: Jun Yamaoka, Kariya (JP); Shinya Kato, Kariya (JP); Yasuhiro Sekito, Kariya (JP); Kenichiro Maeda, Kariya (JP); Syunsuke Ishiguro, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 329 days.

(21) Appl. No.: 15/037,056

(22) PCT Filed: Nov. 13, 2014

(86) PCT No.: PCT/JP2014/005705
§ 371 (c)(1),
(2) Date: May 17, 2016

(87) PCT Pub. No.: WO2015/075912
PCT Pub. Date: May 28, 2015

(65) Prior Publication Data
US 2016/0288609 A1 Oct. 6, 2016

(30) Foreign Application Priority Data

Nov. 20, 2013 (JP) ................................ 2013-239601
Jun. 5, 2014 (JP) ................................ 2014-116789
Sep. 19, 2014 (JP) ................................ 2014-191317

(51) Int. Cl.
*B60H 1/00* (2006.01)
*F24F 1/0018* (2019.01)
(52) U.S. Cl.
CPC ..... *B60H 1/00064* (2013.01); *B60H 1/00021* (2013.01); *B60H 1/00564* (2013.01);
(Continued)

(58) Field of Classification Search
CPC ............ B60H 1/00064; B60H 1/00021; B60H 1/00564
(Continued)

(56) References Cited

U.S. PATENT DOCUMENTS 4,482,009 A * 11/1984 Nishimura ......... B60H 1/00842
165/203
4,947,735 A * 8/1990 Guillemin .......... B60H 1/00071
454/141
(Continued)

FOREIGN PATENT DOCUMENTS

JP S5664288 A 6/1981
JP H05039810 B2 6/1993
(Continued)

*Primary Examiner* — Gregory L Huson
*Assistant Examiner* — Frances F. Hamilton
(74) *Attorney, Agent, or Firm* — Harness, Dickey & Pierce, P.L.C.

(57) ABSTRACT

An air conditioning device includes a casing that provides multiple air passages, a blower fan that suctions an air from the multiple air passages and blows out the air in the casing, a suction side partitioning member that is disposed on a suction side of the blower fan in the casing and separates air flows from the multiple air passages from each other, and a blowing side partitioning member that is disposed on a blowing side of the blower fan in the casing and separates the air flows from the multiple air passages from each other. The suction side partitioning member and the blowing side partitioning member are disposed so that a relative position of the blowing side partitioning member to the suction side partitioning member is deviated in a rotation direction of the blower fan.

19 Claims, 33 Drawing Sheets

(52) U.S. Cl.
CPC ....... *B60H 1/00678* (2013.01); *F24F 1/0018* (2013.01); *B60H 1/00471* (2013.01); *B60H 2001/00085* (2013.01); *B60H 2001/00092* (2013.01); *B60H 2001/00135* (2013.01); *B60H 2001/00192* (2013.01); *B60H 2001/00721* (2013.01)

(58) Field of Classification Search
USPC .......................................................... 454/152
See application file for complete search history.

(56) References Cited

U.S. PATENT DOCUMENTS

| | | | | |
|---|---|---|---|---|
| 5,181,553 A * | 1/1993 | Doi | ..................... | B60H 1/00842 165/203 |
| 5,337,802 A * | 8/1994 | Kajino | ................. | B60H 1/0075 165/203 |
| 5,511,939 A * | 4/1996 | Tokunaga | ........... | B60H 1/00471 415/119 |
| 6,142,864 A * | 11/2000 | Uemura | ............. | B60H 1/00064 454/121 |
| 6,206,092 B1 * | 3/2001 | Beck | ................... | B60H 1/00064 165/203 |
| 6,575,701 B2 * | 6/2003 | Kamiya | ............. | B60H 1/00471 415/206 |
| 6,886,350 B2 * | 5/2005 | Petesch | .............. | B60H 1/00064 165/42 |
| 8,382,563 B2 * | 2/2013 | Sievers | ............... | B60H 1/00007 454/126 |
| 8,443,873 B2 * | 5/2013 | Nanaumi | ............. | B60H 1/0005 165/202 |

FOREIGN PATENT DOCUMENTS

| | | | | |
|---|---|---|---|---|
| JP | 08276722 A | * | 10/1996 | ................ B60H 1/34 |
| JP | H08276722 A | | 10/1996 | |
| JP | 2010143313 A | * | 7/2010 | ............ B60H 1/3421 |

* cited by examiner

AIR CONDITIONING DEVICE

CROSS REFERENCE TO RELATED APPLICATIONS

This application is a U.S. National Phase Application under 35 U.S.C. 371 of International Application No. PCT/JP2014/005705 filed on Nov. 13, 2014 and published in Japanese as WO 2015/075912 A1 on May 28, 2015. This application is based on and claims the benefit of priority from Japanese Patent Applications No. 2013-239601 filed on Nov. 20, 2013, No. 2014-116789 filed on Jun. 5, 2014, and No. 2014-191317 filed on Sep. 19, 2014. The entire disclosures of all of the above applications are incorporated herein by reference.

TECHNICAL FIELD

The present disclosure relates to an air conditioning device having a blower fan.

BACKGROUND ART

Up to now, Patent Documents 1 and 2 disclose an air conditioning device having a layout in which a blower fan is disposed on an air flow downstream side of a heat exchanger within an air conditioning duct.

In the conventional art, an air conditioning wind that has been adjusted in temperature by the heat exchanger within an air conditioning duct is suctioned into the blower fan, and blown out in a radial direction, and the air conditioning wind blown out of the blower fan in the radial direction is blown out from a blowing port of the air conditioning duct.

In the conventional art disclosed in Patent Document 2, a heat core and an evaporator are disposed in parallel to two air passages, and a warm air heated by the heater core and a cold air cooled by the evaporator are suctioned into one blower fan and blown out in the radial direction. For that reason, a partition wall that separates a warm air passage from a cold air passage is disposed on each of a suction side and a blowing side of the blower fan.

On the other hand, in a vehicle air conditioning device having a layout in which the blower fan is disposed on an air flow upstream side of the heat exchanger, a vehicle air conditioning device of an independent temperature control system that controls air-conditioning of multiple zones within a vehicle interior, independently, and improves air conditioning feeling in the respective zones has been commercialized.

In the conventional art, after the air blown out of the blower fan flows in the two air passages in parallel, and is adjusted to temperatures different from each other in the respective two air passages by the heat exchangers, the air is blown into the multiple zones in the vehicle interior, separately.

In the conventional art disclosed in Patent Document 2, there is a time when the air suctioned into the blower fan stays in the fan without being immediately blown out. In other words, since it takes slight time for the blower fan to blow out the air after suctioning the air, a rotation angle of the blower fan when blowing out the air is different from a rotation angle of the blower fan when suctioning the air. For that reason, there is a risk that the warm air and the cold air which have been blown out of the blower fan may be mixed together.

In the case where the air conditioning device of the independent temperature control system is configured by using the conventional art disclosed in Patent Document 1, two air conditioning winds adjusted to temperatures different from each other are blown by one blower fan. For that reason, since the two air conditioning winds different in temperature from each other are mixed together after being blown by the blower fan, it is difficult to control the air conditioning in the multiple zones, independently.

PRIOR ART DOCUMENT

Patent Document

Patent Document 1: JP H08-276722 A
Patent Document 2: JP H05-039810 B2

SUMMARY OF THE INVENTION

In consideration of the above, the objective of the present disclosure is to restrain multiple air flows from being mixed together in an air conditioning device in which a blower fan is disposed on a downstream side of multiple air passages in air flow.

According to a first aspect of the present disclosure, an air conditioning device includes a casing including a plurality of air passages, a rotary blower fan that is disposed in the casing, suctions air from the plurality of air passages and blows out the air, a blowing side partitioning member that is disposed on a suction side of the rotary blower fan in the casing and separates air flows from the plurality of air passages from each other, and a blowing side partitioning member that is disposed on a blowing side of the rotary blower fan in the casing and separates the air flows from the plurality of air passages from each other. A position of the blowing side partitioning member is deviated from a position of the suction side partitioning member in a rotation direction of the rotary blower fan.

According to the above configuration, since a relative position of the suction side partitioning member and the blowing side partitioning member is set taking a rotation angle of a rotary blower fan since suctioning the air until blowing out the air into account, the mixing of the multiple air flows blown out of the rotary blower fan can be suppressed.

According to a second aspect of the present disclosure, the air conditioning device may include a blowing duct that is connected to the casing and includes a blowing air passage which sends the air flows from the plurality of air passages to a space to be air-conditioned, separately. The actuating device may increase the deviation between the position of the suction side partitioning member and the position of the blowing side partitioning member in the rotation direction of the rotary blower fan with increase in pressure loss of the air flows in the casing and the blowing duct.

In general, a pressure loss of the overall air conditioning device is changed according to a situation. For example, when the blowing port mode is switched to another, the opening of the blowing port is changed, and the pressure loss is changed. When the blowing air flow rate is changed, the pressure loss is changed.

When the pressure loss of the overall air conditioning device is changed, the angle by which the rotary blower fan rotates since the rotary blower fan suctions the air until the rotary blower fan blows out the air is also changed. Specifically, when the pressure loss is large, the angle by which the rotary blower fan rotates since the rotary blower fan suctions the air until the rotary blower fan blows out the air becomes large as compared with a case in which the pressure loss is small.

For that reason, even if a partitioning member that separates flows of the two air conditioning winds different in temperature from each other is disposed on each of the suction side and the blowing side of the rotary blower fan, since a position of a boundary between the two air conditioning winds does not match the position of the partitioning member with a change in the pressure loss, the two air conditioning winds become mixed together after being blown out by the rotary blower fan.

When a driving force of the rotary blower fan is changed, the blowing air flow rate is changed, and the pressure loss is also changed. Since the angle by which the rotary blower fan rotates since the rotary blower fan suctions the air until the rotary blower fan blows out the air is not changed, the above problem does not arise.

According to the second aspect of the present disclosure, when the pressure loss becomes larger, the angle from the suction side partitioning member to the blowing side partitioning member can be increased. For that reason, even if the pressure loss becomes larger, and the angle by which the rotary blower fan rotates since the rotary blower fan suctions the air until the rotary blower fan blows out the air becomes larger, the position of the boundary between the two air flows can match the positions of the suction side partitioning member and the blowing side partitioning member as much as possible. As a result, the air flow from the first air passage can be restrained from being mixed with the air flow of the second air passage.

According to a third aspect of the present disclosure, the casing may include a plurality of blowing opening portions that blows out the respective air flows separated by the blowing side partitioning member toward a space to be air-conditioned, separately. A virtual line segment that extends from a rotation center of the rotary blower fan toward one air passage of the plurality of air passages may be defined as a suction side virtual line segment. A virtual line segment that extends from the rotation center of the rotary blower fan toward one blowing opening portion of the plurality of blowing opening portions for blowing out an air flow from the one air passage may be defined as a blowing side virtual line segment. When viewed in a rotation shaft direction of the rotary blower fan, an angle from the suction side virtual line segment to the blowing side virtual line segment in the rotation direction of the rotary blower fan may be smaller than an angle from the suction side virtual line segment to the blowing side virtual line segment in a direction opposite to the rotation direction of the rotary blower fan.

In general, when a flow channel length of the air conditioning wind from the rotary blower fan to the blowing port is longer, the pressure loss is increased.

However, according to the third aspect, when viewed from a rotation axis direction of the rotary blower fan, an angle from the suction side virtual line segment to the blowing side virtual line segment in the rotation direction of the rotary blower fan is smaller than an angle from the suction side virtual line segment to the blowing side virtual line segment in an opposite direction to the rotation direction of the rotary blower fan. Therefore, the rotary blower fan can blow out the air suctioned from one air passage on a side closer to one blowing opening portion. For that reason, since the flow channel length from the rotary blower fan to one blowing opening portion can be shortened, the pressure loss of the air flow can be reduced.

EMBODIMENTS FOR EXPLOITATION OF THE INVENTION

Figure 1:
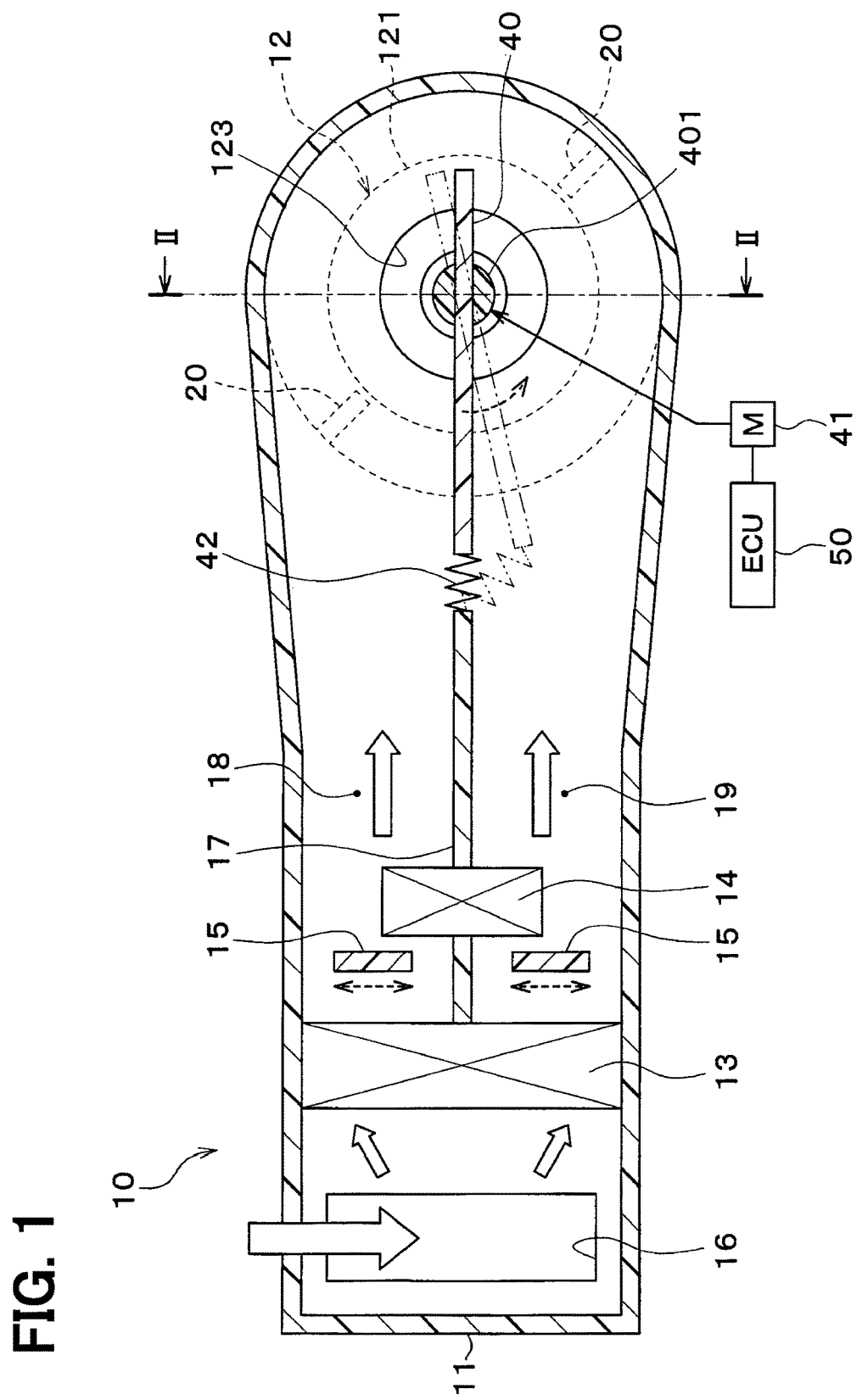
FIG. 1 is a schematic cross-sectional view illustrating a vehicle air conditioning device according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Subsequently, a detailed configuration of a vehicle air conditioning device 1 according to the present embodiment will be described with reference to FIGS. 1 to 4. As illustrated in FIG. 1, the vehicle air conditioning device 1 includes an interior air conditioning unit 10. The interior air conditioning unit 10 has a function of adjusting a temperature of a blown air and blowing the air into a vehicle interior (space to be air-conditioned).

The interior air conditioning unit 10 is disposed inside of a dashboard panel (instrument panel) on a foremost portion of the vehicle interior. The interior air conditioning unit 10 includes a casing 11, a blower 12, an evaporator 13, a heater core 14, and air mix doors 15.

The casing 11 forms an outer shell of the interior air conditioning unit 10. The blower 12, the evaporator 13, the heater core 14, and the air mix doors 15 are housed in the casing 11.

The casing 11 defines an air passage of the blown air which is blown into the vehicle interior, and is made of a resin (for example, polypropylene) having a certain degree of elasticity and excellent in strength. An air inlet port 16 is defined on an air flow most upstream side in the casing 11. Although not illustrated, the air inlet port 16 includes an inside air inlet port and an outside air inlet port.

The inside air inlet port introduces an inside air (vehicle interior air) into the casing 11. The outside air inlet port introduces an outside air (vehicle exterior air) into the casing 11. Opening areas of the inside air inlet port and the outside air inlet port are continuously adjusted by an inside and outside air switching door (not illustrated). The inside and outside air switching door is an inside and outside air flow proportion change device for continuously changing an air flow proportion of the inside air flow rate and the outside air flow rate.

The evaporator 13 is disposed on an air flow downstream side of the air inlet port 16 within the casing 11. The evaporator 13 is a cooling heat exchanger for performing a heat exchange between a low-pressure side refrigerant (low-temperature refrigerant) of a refrigeration cycle and an air introduced from the air inlet port 16 to cool the air.

A partition wall 17 is disposed on the air flow downstream side of the evaporator 13 within the casing 11. The partition wall 17 is formed into a plate shape extending in an air flow direction (horizontal direction in FIG. 1), and partitions an air passage within the casing 11 into a first air passage 18 and a second air passage 19.

The heater core 14 is disposed in the first air passage 18 and the second air passage 19. The heater core 14 is a heating heat exchanger for heating a part of air that has passed through the evaporator 13, and performs a heat exchange between a coolant (warm water) for cooling an engine and an air that has passed through the evaporator 13, and heats the air that has passed through the evaporator 13.

In the first air passage 18 and the second air passage 19, the air mix doors 15 are disposed between the evaporator 13 and the heater core 14. Each of the air mix doors 15 is a temperature adjusting device for continuously changing an air flow proportion between a cold air flowing into the heater core 14 and a cold air flowing while bypassing the heater core 14 to adjust a temperature of the blown air that is blown into the vehicle interior.

In an example of FIG. 1, each of the air mix doors 15 is configured by a slide door that slides in a direction (vertical direction in FIG. 1) substantially orthogonal to the air flow direction. The air mix doors 15 may be each configured by a plate door that swings about a rotation axis.

The respective air mix doors 15 are driven by an electric actuator (not illustrated), independently. The operation of the electronic actuator for the air mix doors 15 is controlled according to a control signal output from an air-conditioning control device 50 (ECU). The air-conditioning control device 50 is a control device that controls the operation of various electric components of the vehicle air conditioning device 1.

Since the air mix doors 15 in the first air passage 18 and the air mix doors 15 in the second air passage 19 are driven, independently, an air flowing in the first air passage 18 and an air flowing in the second air passage 19 can be adjusted in temperature, independently.

In the casing 11, the blower 12 (blower) is disposed on the air flow downstream side of the first air passage 18 and the second air passage 19. The blower 12 is a blowing device that blows the air into the vehicle interior, and suctions the air adjusted in temperature by the evaporator 13 and the heater core 14 and blows the air into the vehicle interior.

The blower 12 includes a blower fan 121 (rotary blower fan) and an electric motor 122. The blower fan 121 is a centrifugal fan that includes a rotation axis and multiple blades (vanes) around the rotation axis, and suctions the air from a radially inner side, and blows the air toward a radially outer side. An axial direction of the blower fan 121 is in parallel to a width direction (a direction perpendicular to a paper plane in FIG. 1) of the partition wall 17.

For example, the blower fan 121 is a sirocco fan (centrifugal multi-blade fan). The blower fan 121 may be a turbo fan.

The blower fan 121 is rotationally driven by the electric motor 122. The electric motor 122 is controlled in rotation speed (blowing rate) according to a control voltage output from the air-conditioning control device 50.

Figure 2:
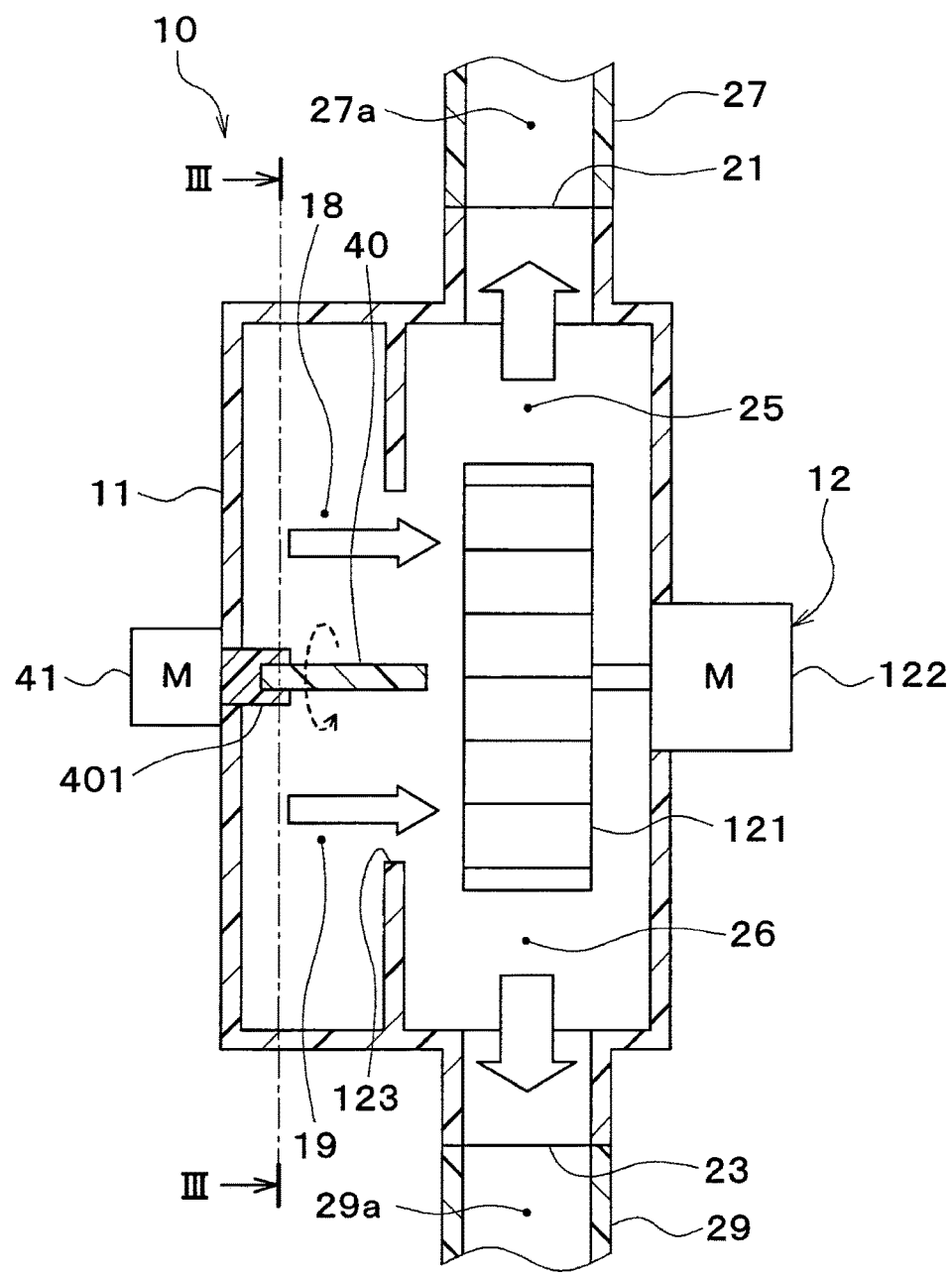
FIG. 2 is a schematic cross-sectional view taken along a line II-II in FIG. 1.
Figure 3:
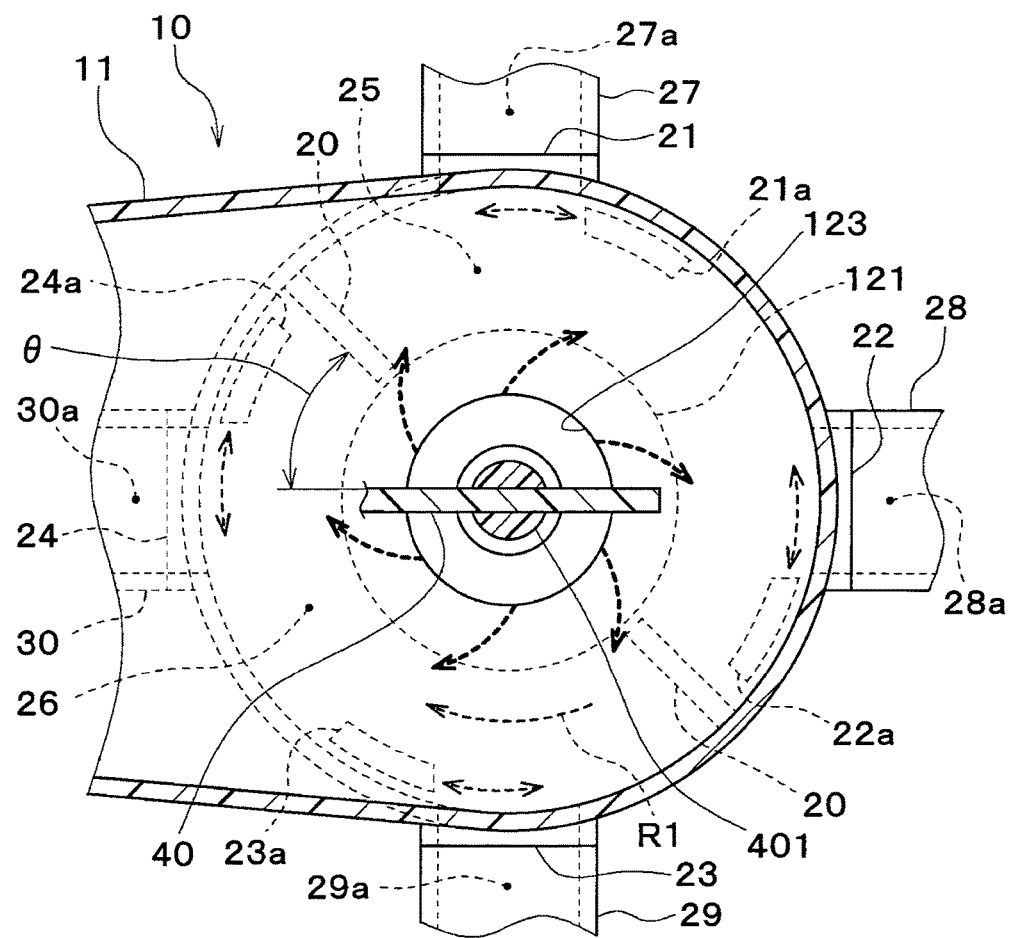
FIG. 3 is a schematic cross-sectional view taken along a line III-III in FIG. 2.

Blowing side partitioning members 20 are disposed on the radially outer side of the blower fan 121 in the casing 11. The blowing side partitioning members 20 are each formed into a plate shape extending in a radial direction of the blower fan 121. As illustrated in FIGS. 2 and 3, the blowing side partitioning members 20 partition a space into which the air blown out of the blower fan 121 flows into a first blowing space 25 and a second blowing space 26.

A driver's seat side center opening portion 21, a driver's seat side side opening portion 22, a passenger's seat side center opening portion 23, and a passenger's seat side side opening portion 24 are defined in an air flow downstream most portion of the casing 11.

The driver's seat side center opening portion 21 and the driver's seat side side opening portion 22 communicate with the first blowing space 25. The passenger's seat side center opening portion 23 and the passenger's seat side side opening portion 24 communicate with the second blowing space 26.

The air flow downstream sides of the respective opening portions 21 to 24 are connected to blowing ducts 27, 28, 29, and 30, respectively. The respective blowing ducts 27, 28, 29, and 30 include blowing air passages 27a, 28a, 29a, and 30a in which the air to be blown into the vehicle interior flows, and blowing ports (not illustrated) for blowing the air into the vehicle interior.

The blowing port of the blowing duct 27 connected to the driver's seat side center opening portion 21 is disposed substantially in the center of a vehicle interior foremost portion in a vehicle width direction, and the air conditioning wind adjusted in temperature by the interior air conditioning unit 10 is blown toward an upper body of an occupant on a driver's seat.

The blowing port of the blowing duct 28 connected to the driver's seat side side opening portion 22 is disposed on an end of the driver's seat side of the vehicle interior foremost portion in the vehicle width direction, and the air conditioning wind adjusted in temperature by the interior air conditioning unit 10 is blown toward the upper body of the occupant on the driver's seat.

The blowing port of the blowing duct 29 connected to the passenger's seat side center opening portion 23 is disposed substantially in the center of the vehicle interior foremost portion in the vehicle width direction, and the air conditioning wind adjusted in temperature by the interior air conditioning unit 10 is blown toward the upper body of an occupant on a passenger's seat.

The blowing port of the blowing duct 30 connected to the passenger's seat side side opening portion 24 is disposed on an end of the passenger's seat side of the vehicle interior foremost portion in the vehicle width direction, and the air conditioning wind adjusted in temperature by the interior air conditioning unit 10 is blown toward the upper body of the occupant on the passenger's seat.

The blowing ports of the respective blowing ducts 27, 28, 29, and 30 are each formed with a louver (not illustrated) for adjusting a blowing direction of the air conditioning wind and opening or closing the blowing port. When each blowing port is opened or closed by the louver, a pressure loss of the air conditioning wind is changed. Each louver is a pressure loss change device that changes the pressure loss of the air conditioning wind.

A driver's seat side center door 21a is disposed on an air flow upstream side of the driver's seat side center opening portion 21. The driver's seat side center door 21a is an opening and closing device that opens and closes the driver's seat side center opening portion 21, and adjusts an opening area of the driver's seat side center opening portion 21.

A driver's seat side side door 22a is disposed on an air flow upstream side of the driver's seat side side opening portion 22. The driver's seat side side door 22a is an opening and closing device that opens and closes the driver's seat side side opening portion 22, and adjusts an opening area of the driver's seat side side opening portion 22.

A passenger's seat side center door 23a is disposed on an air flow upstream side of the passenger's seat side center opening portion 23. The passenger's seat side center door 23a is an opening and closing device that opens and closes the passenger's seat side center opening portion 23, and adjusts an opening area of the passenger's seat side center opening portion 23.

A passenger's seat side side door 24a is disposed on an air flow upstream side of the passenger's seat side side opening portion 24. The passenger's seat side side door 24a is an opening and closing device that opens and closes the passenger's seat side side opening portion 24, and adjusts an opening area of the passenger's seat side side opening portion 24.

The driver's seat side center door 21a, the driver's seat side side door 22a, the passenger's seat side center door 23a, and the passenger's seat side side door 24a configure blowing port mode switching doors (blowing port mode switching devices) for switching a blowing port mode to another.

When each blowing port mode switching door switches the blowing port mode to another, the pressure loss of the air conditioning wind is changed. The blowing port mode switching door is a pressure loss change device that changes the pressure loss of the air conditioning wind.

The driver's seat side center door 21a, the driver's seat side side door 22a, the passenger's seat side center door 23a, and the passenger's seat side side door 24a are coupled to an electric actuator (not illustrated) for driving blowing port mode doors through a link mechanism not illustrated, and rotationally operated in conjunction with the electric mechanism. The operation of the electric actuator for driving the blowing port mode doors is controlled according to a control signal output from the air-conditioning control device 50.

An air suction port 123 of the blower 12 is defined on the air flow upstream side of the blower fan 121 within the casing 11. Suction side partitioning members 40 are disposed in the air suction port 123. The suction side partitioning members 40 are each formed into a plate shape that extends in a radial direction (hereinafter referred to as "fan radial direction") of the blower fan 121, and crosses the air suction port 123, and are supported to the casing 11 so as to be swingable about a swing shaft 401.

The swing shaft 401 of the suction side partitioning members 40 is disposed coaxially with the blower fan 121, and driven by an electric actuator 41. The operation of the electric actuator 41 for the suction side partitioning members 40 is controlled according to a control signal output from the air-conditioning control device 50. The electric actuator 41 and the air-conditioning control device 50 are an actuating device for moving the suction side partitioning members 40.

One end of each suction side partitioning member 40 is coupled to the partition wall 17 through a connection portion 42. The connection portion 42 is formed of a stretchable member such as a rubber bellow.

Similarly to the partition wall 17, the suction side partitioning members 40 and the connection portion 42 separate the air passage in the casing 11 into the first air passage 18 and the second air passage 19. As a result, the air conditioning wind in the first air passage 18 and the air conditioning wind in the second air passage 19 are suctioned into the blower fan 121, separately.

When the electric actuator 41 drives the swing shaft 401 of the suction side partitioning members 40, a position of each suction side partitioning member 40 is changed in a circumferential direction of the blower fan 121. As a result, a position of a boundary between the air flow in the first air passage 18 and the air flow in the second air passage 19 is changed in the circumferential direction of the blower fan 121 in the air suction port 123.

Since each suction side partitioning member 40 is coupled to the partition wall 17 through the stretchable connection portion 42, the air passage in the casing 11 can be separated into the first air passage 18 and the second air passage 19 regardless of an angle of each suction side partitioning member 40.

The air-conditioning control device 50 includes a known microcomputer including a CPU, a ROM, and a RAM, and peripheral circuits around the microcomputer, performs various calculations and processing on the basis of an air conditioning control program stored in the ROM, and controls the operation of various devices connected to an output side of the air-conditioning control device 50.

An input side of the air-conditioning control device 50 is connected with various air conditioning control sensor sets (not illustrated). As the air conditioning control sensor set, for example, an inside air sensor, an outside air sensor, an insolation sensor, an evaporator temperature sensor, and a coolant temperature sensor are connected to the input side of the air-conditioning control device 50.

The inside air sensor is a sensor for detecting a vehicle interior temperature. The outside air sensor is a sensor for detecting the outside air temperature. The insolation sensor is a sensor for detecting an amount of insolation in the vehicle interior. The evaporator temperature sensor is a sensor for detecting a blowing air temperature blown from the evaporator 13 (evaporator temperature). The coolant temperature sensor is a sensor for detecting a coolant temperature of the coolant flowing out from the engine.

Operation signals from various air conditioning operation switches disposed on an air conditioning operation panel (not illustrated) are input to the input side of the air-conditioning control device 50. The air conditioning operation panel is disposed in the vicinity of an instrument panel on a vehicle interior front part.

The various air conditioning operation switches include, for example, an operation switch of the vehicle air conditioning device 1, an automatic switch, a changeover switch of operation modes, a changeover switch of blowing port modes, an air flow rate setting switch of the blower 12, and a vehicle interior temperature setting switch.

The automatic switch is an automatic control setting device for setting or cancelling automatic control of the vehicle air conditioning device 1 by occupant's operation. The vehicle interior temperature setting switch is a temperature setting device for setting a vehicle interior target temperature by the occupant's operation.

The air-conditioning control device 50 is integrated with a control unit that controls various equipments to be controlled which are connected to the output side of the air-conditioning control device 50, and a configuration (hardware and software) for controlling the operation of the respective equipments to be controlled configures the control unit that controls the operation of the respective equipments to be controlled.

The air-conditioning control device 50 controls the operation of the electric actuator 41 for each suction side partitioning member 40 according to the blowing port modes. For example, when the blowing port mode switching doors 21a, 22a, 23a, and 24a fully open the blowing ports 21, 22, 23, and 24, respectively, as illustrated in FIG. 3, the air-conditioning control device 50 moves each suction side partitioning member 40 to a position illustrated in FIG. 3.

An angle $\theta$ illustrated in FIG. 3 indicates an angle defined by each suction side partitioning member 40 and the corresponding blowing side partitioning member 20. In more detail, the angle $\theta$ indicates an angle from each suction side partitioning member 40 to the corresponding blowing side partitioning member 20 adjacent in a rotation direction R1 (clockwise direction in FIG. 3) of the blower fan 121.

The angle $\theta$ is substantially equal to an angle obtained by adding an angle by which the blower fan 121 rotates since the blower fan 121 suctions the air until the blower fan 121 blows out the air in an operating state of FIG. 3 to an advancing angle or a receding angle. The advancing angle and the receding angle are an angle defined between a line segment connecting the rotation shaft and a blade inlet of the blower fan 121 and a line segment connecting the rotation shaft and a blade outlet of the blower fan 121.

In other words, when the blower fan 121 is a sirocco fan (centrifugal multi-blade fan), the angle $\theta$ is substantially equal to an angle obtained by adding an angle by which the blower fan 121 rotates since the blower fan 121 suctions the air until the blower fan 121 blows out the air in the operating state of FIG. 3 to the advancing angle. When the blower fan 121 is a turbo fan, the angle $\theta$ is substantially equal to an angle obtained by adding an angle by which the blower fan 121 rotates since the blower fan 121 suctions the air until the blower fan 121 blows out the air in the operating state of FIG. 3 to the receding angle.

For that reason, the air conditioning wind suctioned from the first air passage 18 by the blower fan 121 is blown into the first blowing space 25, and the air conditioning wind suctioned from the second air passage 19 by the blower fan 121 is blown into the second blowing space 26. Therefore, the air conditioning wind in the first air passage 18 can be restrained from being mixed with the air conditioning wind in the second air passage 19.

Figure 4:
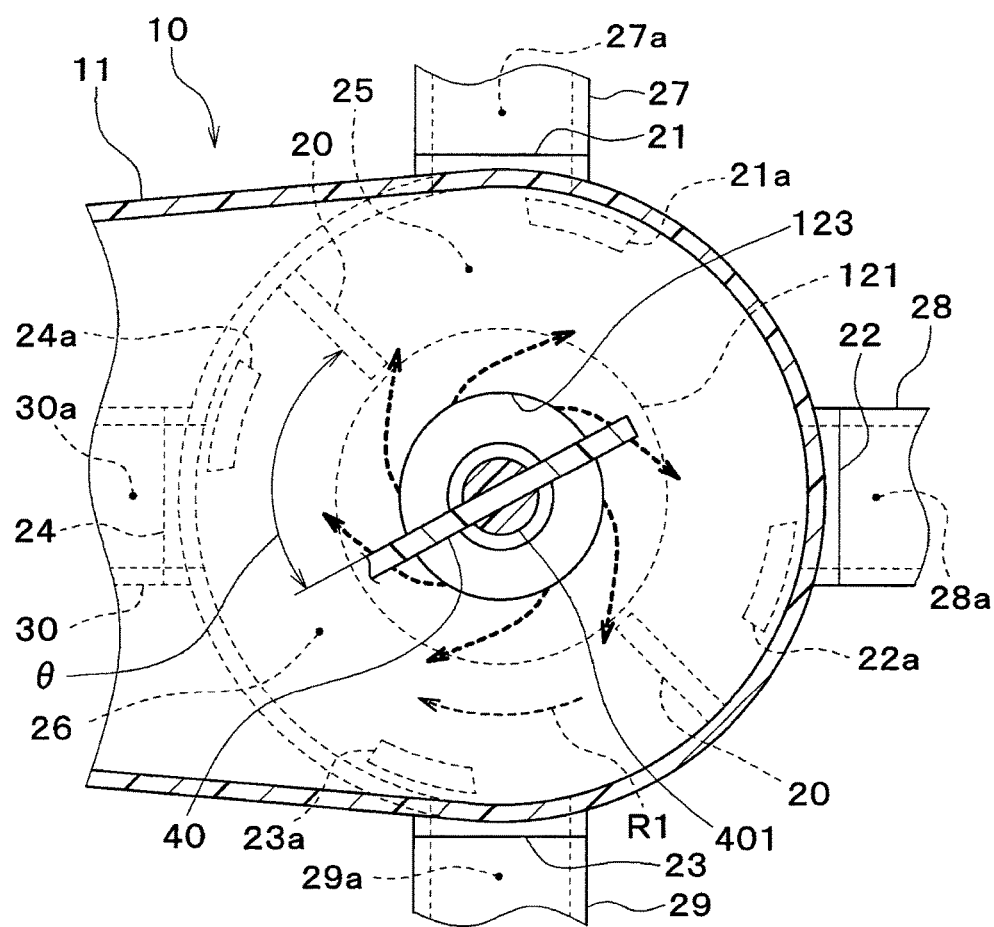
FIG. 4 is a schematic cross-sectional view illustrating an operating state when a pressure loss is large in FIG. 3.

For example, when the blowing port mode switching doors 21a, 22a, 23a, and 24a half-open the blowing ports 21, 22, 23, and 24, respectively, as illustrated in FIG. 4, the air-conditioning control device 50 moves each suction side partitioning member 40 to a position illustrated in FIG. 4. Specifically, the air-conditioning control device 50 moves each suction side partitioning member 40 in a direction opposite to a fan rotation direction R1 in the blowing port mode illustrated in FIG. 3. Therefore, the angle θ illustrated in FIG. 4 is larger than the angle θ illustrated in FIG. 3.

In the blowing port mode (mode in which the opening portions 21, 22, 23, and 24 are half-opened) illustrated in FIG. 4, a pressure loss (in other words, ventilation resistance) of the overall air conditioning device becomes larger than that in the blowing port mode (mode in which the opening portions 21 to 24 are fully opened) illustrated in FIG. 3. For that reason, in the blowing port mode illustrated in FIG. 4, the angle by which the blower fan 121 rotates since the blower fan 121 suctions the air until the blower fan 121 blows out the air becomes larger than that in the blowing port mode illustrated in FIG. 3.

In view of the above, since the angle θ in the blowing port mode illustrated in FIG. 4 is set to be larger than that in the blowing port mode illustrated in FIG. 3, the angle θ in the blowing port mode illustrated in FIG. 4 can be set to be substantially equal to the angle obtained by adding the angle by which the blower fan 121 rotates since the blower fan 121 suctions the air until the blower fan 121 blows out the air to the advancing angle or the receding angle, like the blowing port mode illustrated in FIG. 3. Further, the air conditioning wind in the first air passage 18 can be restrained from being mixed with the air conditioning wind in the second air passage 19.

In other words, in the present embodiment, a relative position of each blowing side partitioning member 20 relative to the corresponding suction side partitioning member 40 more moves in the rotation direction R1 of the blower fan 121 as the pressure loss (in other words, the pressure loss of the air flow in the casing 11 and the blowing ducts 27, 28, 29, and 30) of the overall air passage in the air conditioning device is larger. In other words, a deviation between the position of each suction side partitioning member 40 and the position of the corresponding blowing side partitioning member 20 in the rotation direction R1 of the blower fan 121 increases more as the pressure loss of the overall air passage in the air conditioning device is larger.

According to the above configuration, when the pressure loss becomes larger, since the angle θ from each suction side partitioning member 40 to the corresponding blowing side partitioning member 20 becomes larger, even if the angle by which the blower fan 121 rotates since the blower fan 121 suctions the air until the blower fan 121 blows out the air becomes larger, the air flow from the first air passage 18 can be restrained from being mixed with the air flow from the second air passage 19.

In the present embodiment, the suction side partitioning members 40 and the blowing side partitioning members 20 are disposed so that the relative position of each blowing side partitioning member 20 to the corresponding suction side partitioning member 40 is deviated in the rotation direction R1 of the blower fan 121. In other words, the position of each blowing side partitioning member 20 is deviated from the position of the corresponding suction side partitioning member 40 in the rotation direction R1 of the blower fan 121.

According to the above configuration, since the relative position of the suction side partitioning member 40 and the corresponding blowing side partitioning member 20 is set taking the rotation angle of the blower fan 121 since the blower fan 121 suctions the air until the blower fan 121 blows out the air into account, the mixture of the multiple air flows blown out of the blower fan 121 can be suppressed.

In other words, the suction side partitioning members 40 and the blowing side partitioning members 20 are disposed in such a manner that the respective corresponding spaces of the multiple air passages 18 and 19 (suction spaces) separated by the suction side partitioning members 40 and the multiple blowing spaces 25 and 26 separated by the blowing side partitioning members 20 are deviated in the rotation direction R1 of the blower fan 121. Therefore, the relative position of the respective corresponding spaces is set taking the rotation angle of the blower fan 121 since the blower fan 121 suctions the air until the blower fan 121 blows out the air into account, and further the mixture of the multiple air flows blown from the blower fan 121 can be suppressed.

Second Embodiment

Figure 5:
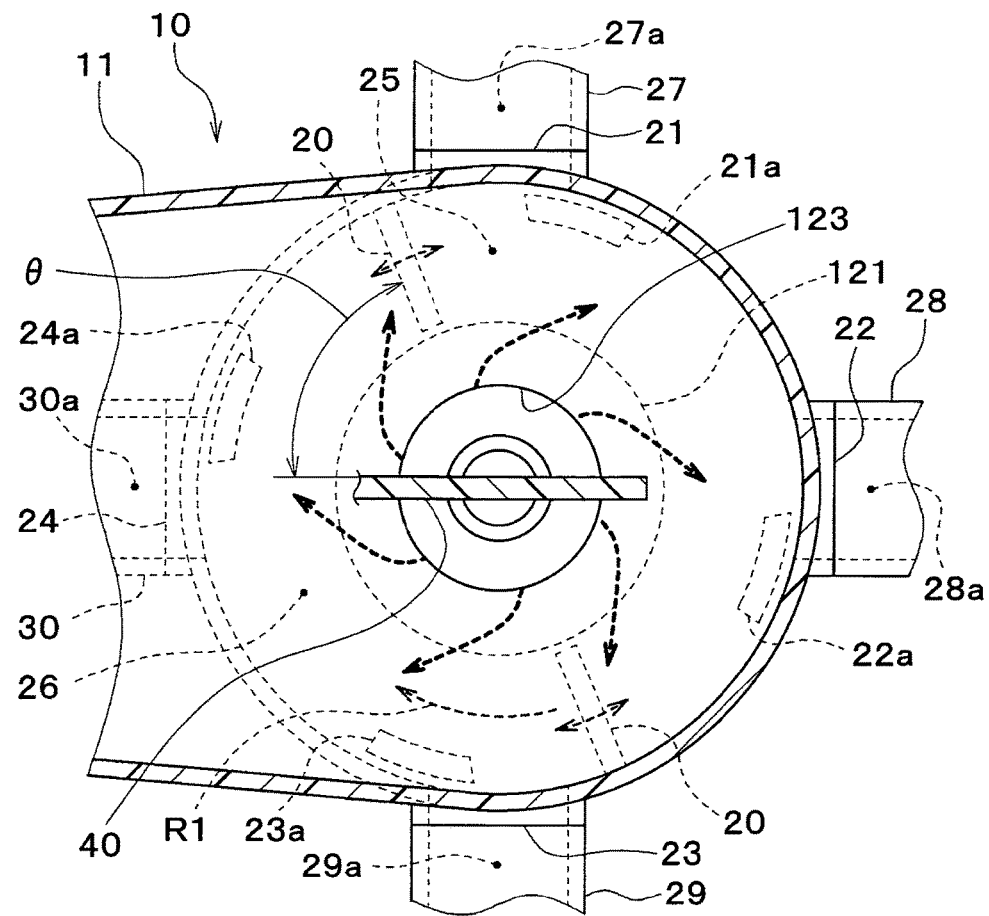
FIG. 5 is a schematic cross-sectional view illustrating a vehicle air conditioning device according to a second embodiment of the present disclosure.

In the above embodiment, the position of each blowing side partitioning member 20 is fixed, and the position of each suction side partitioning member 40 is changed. On the other hand, in the present embodiment, as illustrated in FIG. 5, contrary to the above embodiment, a position of each suction side partitioning member 40 is fixed, and a position of each blowing side partitioning member 20 is changed.

The blowing side partitioning members 20 are driven in a circumferential direction of a blower fan 121 by an electric actuator (not illustrated). The operation of the electric actuator for the blowing side partitioning members 20 is controlled according to a control signal output from an air-conditioning control device 50.

The air-conditioning control device 50 controls the electric actuator for the blowing side partitioning members 20 according to a pressure loss of an overall air passage in an air conditioning device. Specifically, the air-conditioning control device 50 moves the blowing side partitioning members 20 in a fan rotation direction R1 more as the pressure loss is larger, and increases an angle θ from each suction side partitioning member 40 to the corresponding blowing side partitioning member 20.

With the above configuration, like the above embodiment, an air conditioning wind in a first air passage 18 can be restrained from being mixed with an air conditioning wind in a second air passage 19.

Third Embodiment

In the above embodiments, the air mix doors 15 and the suction side partitioning members 40 are provided, separately. On the other hand, in the present embodiment, as illustrated in FIGS. 6 to 8, each air mix door 15 is disposed integrally with a corresponding suction side partitioning member 40.

Figure 6:
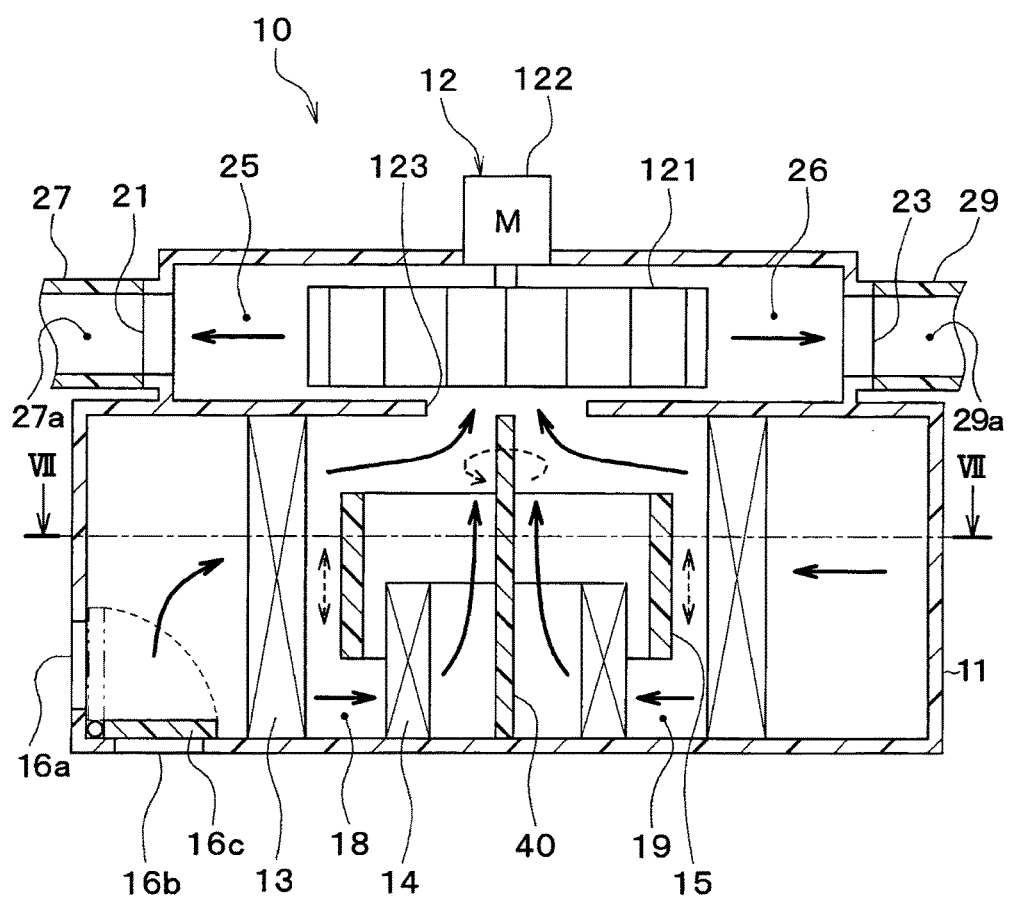
FIG. 6 is a schematic cross-sectional view illustrating a vehicle air conditioning device according to a third embodiment of the present disclosure.
Figure 7:
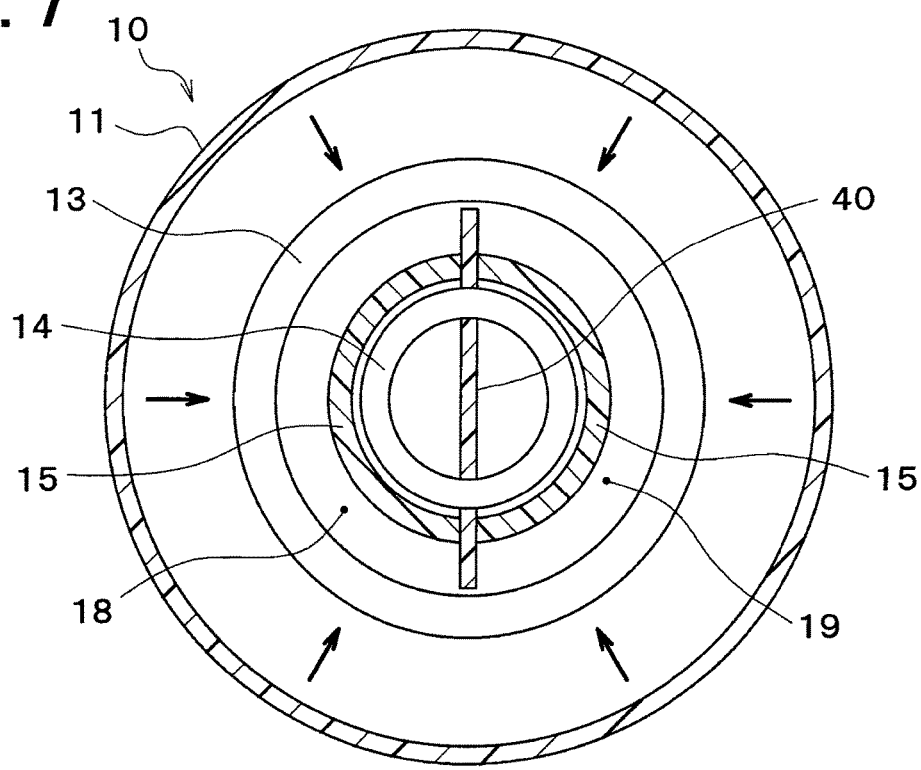
FIG. 7 is a schematic cross-sectional view taken along a line VII-VII in FIG. 6.
Figure 8:
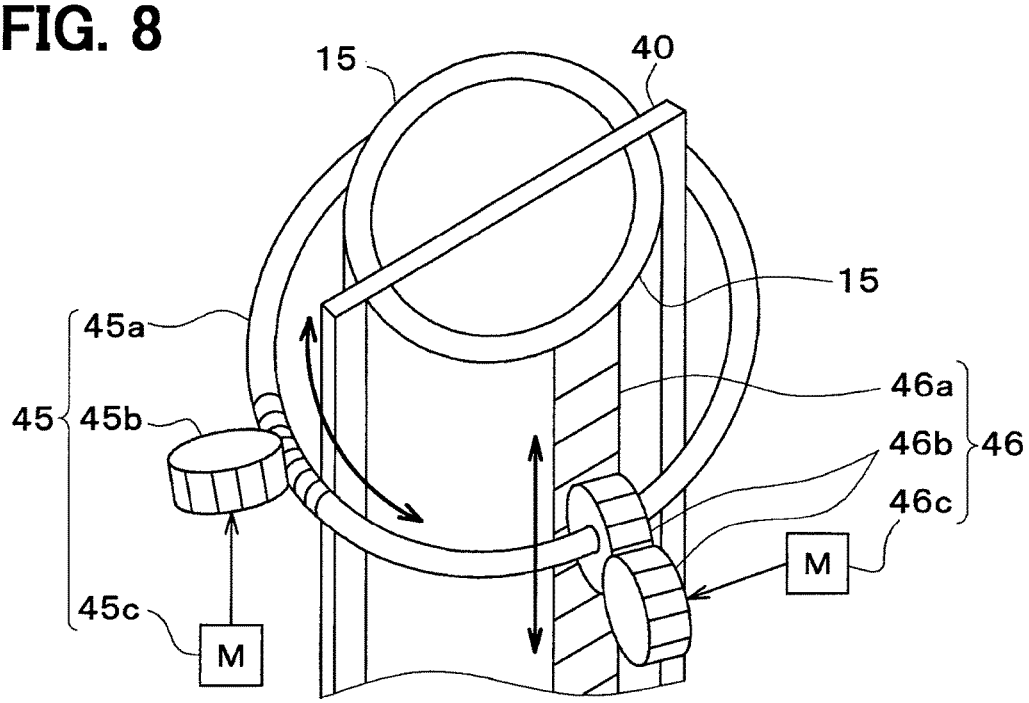
FIG. 8 is a schematic perspective view illustrating an air mix door and a suction damper according to the third embodiment.

As illustrated in FIGS. 6 and 7, in the present embodiment, a casing 11 is formed into a cylindrical shape. An inside air inlet port 16a and an outside air inlet port 16b are defined in an outermost periphery of the casing 11. Opening areas of the inside air inlet port and the outside air inlet port are continuously adjusted by an inside and outside air switching door 16c.

An evaporator 13 is cylindrically disposed inside of the casing 11. A heater core 14 is cylindrically disposed inside of the evaporator 13 in the interior of the casing 11. The evaporator 13 and the heater core 14 are disposed coaxially with the casing 11.

The suction side partitioning members 40 are disposed inside of the evaporator 13 in the interior of the casing 11. Each of the suction side partitioning members 40 is formed into a plate shape, and separates an air passage inside of the evaporator 13 into a first air passage 18 and a second air passage 19.

An air mix door 15 is disposed in each of the first air passage 18 and the second air passage 19. Each air mix door 15 is formed into a semi-circular shape, and disposed coaxially with the casing 11.

The suction side partitioning members 40 and the respective air mix doors 15 are supported to the casing 11 so as to be rotatable in the circumferential direction of the casing 11. For example, as illustrated in FIG. 8, a driving mechanism 45 that rotates the suction side partitioning members 40 and the air mix doors 15 includes a rack 45a, a pinion 45b, and an electric actuator 45c. The operation of the electric actuator 45c is controlled according to a control signal output from the air-conditioning control device 50.

The respective air mix doors 15 are supported to be slidable in an axial direction of the casing 11. The air mix doors 15 are driven by a slide electric actuator (not illustrated), independently. For example, as illustrated in FIG. 8, a driving mechanism 46 that slides the air mix doors 15 includes a rack 46a, a pinion 46b, and an electric actuator 46c.

The blower 12 is disposed on one end side in the axial direction (upper side in FIG. 6) of the casing 11. The blower 12 suctions the air in the axial direction of the casing 11, and blows out the air in the radial direction of the casing 11.

As in the above first embodiment, blowing side partitioning members 20 (not illustrated), a driver's seat side center opening portion 21, a driver's seat side side opening portion 22 (not illustrated), a passenger's seat side center opening portion 23, and a passenger's seat side side opening portion 24 (not illustrated) are defined on an air flow downstream most portion of the casing 11. A downstream side space of the blower fan 121 in the casing 11 is separated into a first blowing space 25 and a second blowing space 26 by the blowing side partitioning members 20.

The air mix doors 15 slide in the axial direction (vertical direction in FIG. 6) of the casing 11, thereby being capable of changing an air flow proportion of a cold air flowing into the heater core 14 and a cold air flowing while bypassing the heater core 14. As a result, a temperature of the blown air to be blown into a vehicle interior is adjusted.

The suction side partitioning members 40 rotate in the circumferential direction of the casing 11, thereby being capable of changing a position of a boundary between the air flow of the first air passage 18 and the air flow of the second air passage 19 in the air suction port 123 in the circumferential direction of the blower fan 121.

The air-conditioning control device 50 controls the electric actuator 45 for rotation of the suction side partitioning members 40 according to a pressure loss of an overall air passage in an air conditioning device. Specifically, as in the above first embodiment, the air-conditioning control device 50 moves the suction side partitioning members 40 in a direction opposite to a fan rotation direction R1 more as the pressure loss is larger, and increases an angle from each suction side partitioning member 40 to the corresponding blowing side partitioning member 20.

With the above configuration, like the above embodiment, an air conditioning wind in a first air passage 18 can be restrained from being mixed with an air conditioning wind in a second air passage 19.

Fourth Embodiment

Figure 9:
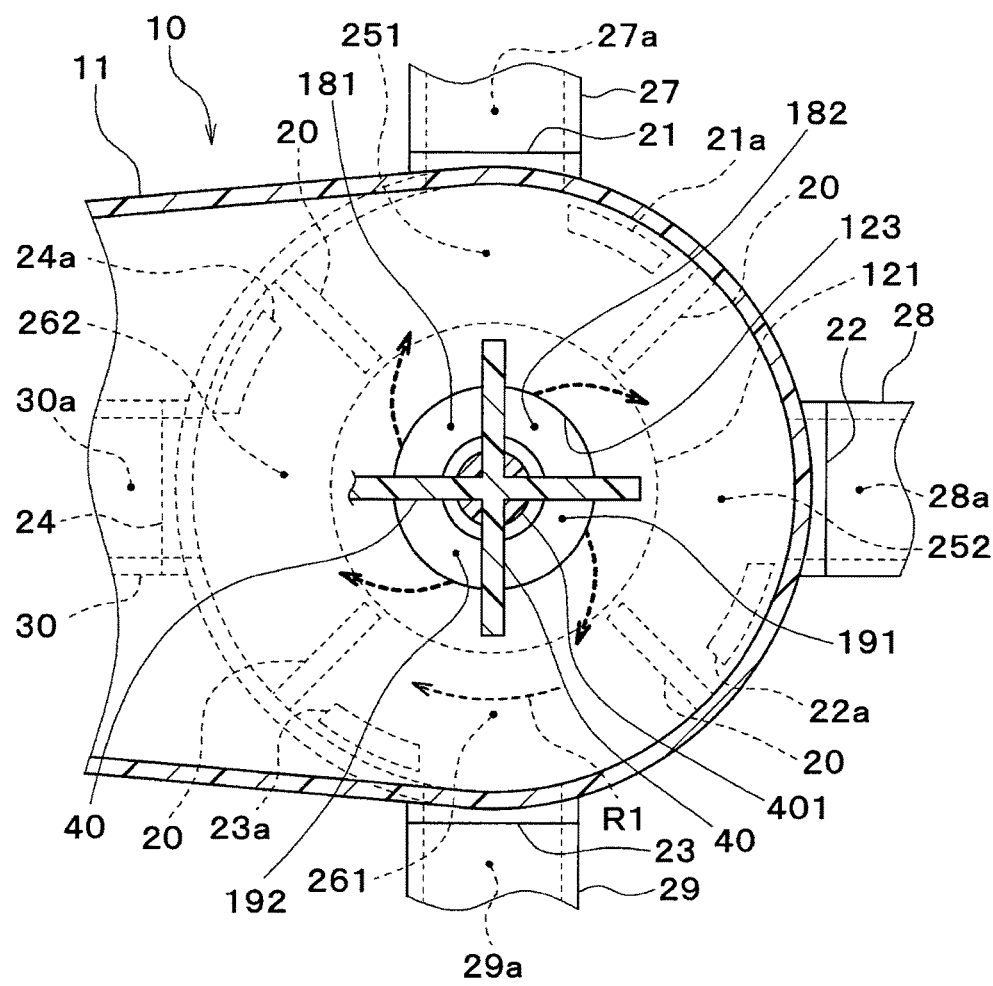
FIG. 9 is a schematic cross-sectional view illustrating a vehicle air conditioning device according to a fourth embodiment of the present disclosure.

In the above first embodiment, the blowing side partitioning members 20 and the suction side partitioning members 40 separate the space within the casing 11 into two spaces. On the contrary, in the present embodiment, as illustrated in FIG. 9, blowing side partitioning members 20 and suction side partitioning members 40 separate a space within the casing 11 into four spaces corresponding to four opening portions 21 to 24.

The blowing side partitioning members 20 are disposed at regular intervals in a cross shape, further separate the first blowing space 25 in the first embodiment into two spaces 251 and 252, and further separate the second blowing space 26 in the first embodiment into two spaces 261 and 262.

In other words, the blowing side partitioning members 20 separate a space on an air flow downstream side of a blower fan 121 into a space 251 in which an air flows toward the driver's seat side center opening portion 21, a space 252 in which the air flows toward the driver's seat side side opening portion 22, a space 261 in which the air flows toward the passenger's seat side center opening portion 23, and a space 262 in which the air flows toward the passenger's seat side side opening portion 24.

The suction side partitioning members 40 are also disposed at regular intervals in a cross shape, further separate the first air passage 18 in the first embodiment into two spaces 181 and 182, and further separate the second air passage 19 in the first embodiment into two spaces 191 and 192.

In other words, the suction side partitioning members 40 separate a space on an air flow upstream side of the blower fan 121 into a space 181 in which an air flows toward the driver's seat side center opening portion 21, a space 182 in which the air flows toward the driver's seat side side opening portion 22, a space 191 in which the air flows toward the passenger's seat side center opening portion 23, and a space 192 in which the air flows toward the passenger's seat side side opening portion 24.

As described above, in the present embodiment, the suction side partitioning members 40 and the blowing side partitioning members 20 separate the air flow for each of the four (multiple) opening portions 21, 22, 23, and 24.

According to the above configuration, since the blower fan 121 can suction and blow out the air for each of the opening portions 21 to 24, the circulation of the air can restrain the blowing air flow rates from the respective opening portions 21 to 24 from being biased.

Fifth Embodiment

In the above fourth embodiment, the blowing side partitioning members 20 and the suction side partitioning members 40 are each arranged at regular intervals in a cross shape. On the other hand, in the present embodiment, as illustrated in FIG. 10, the respective intervals of the blowing side partitioning members 20 and the suction side partitioning members 40 are different according to the pressure loss.

Figure 10:
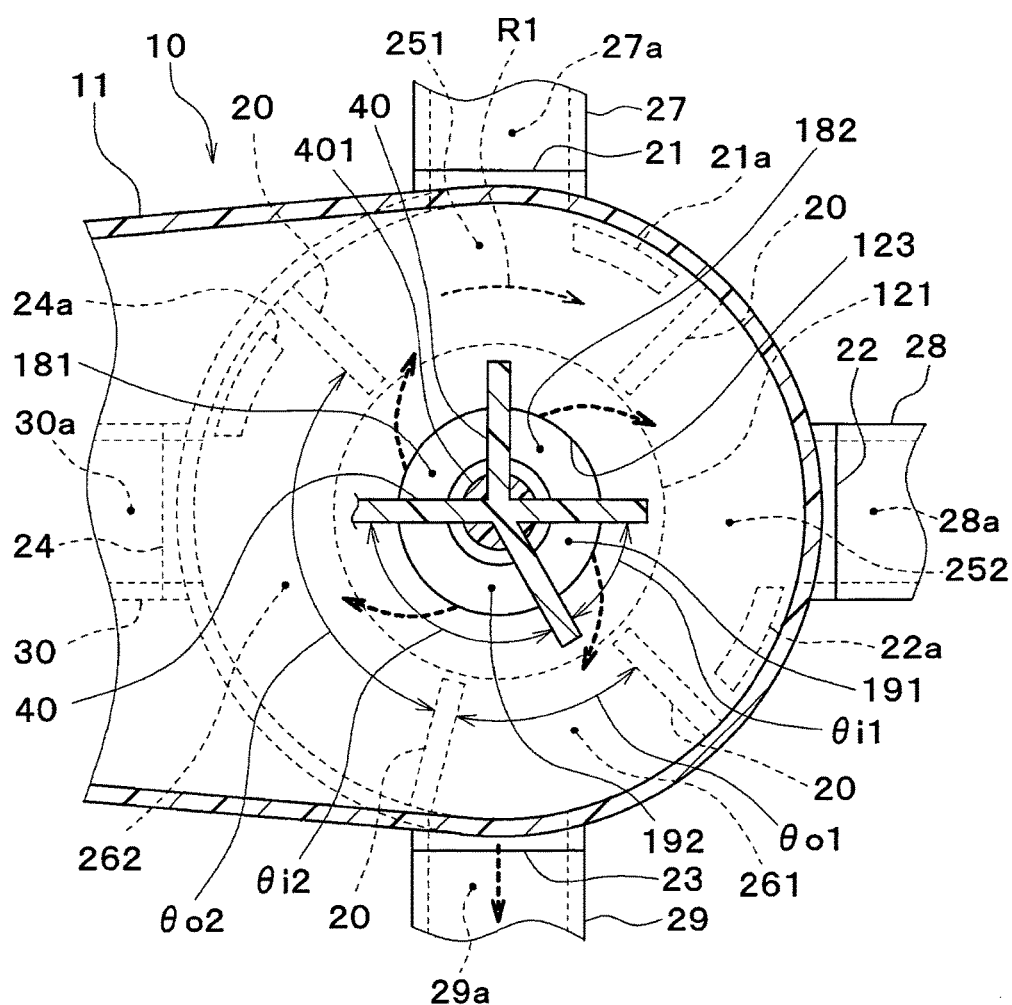
FIG. 10 is a schematic cross-sectional view illustrating a vehicle air conditioning device according to a fifth embodiment of the present disclosure.

In an example of FIG. 10, the pressure loss of the blowing air passage 30a in the blowing duct 30 connected to the passenger's seat side side opening portion 24 is larger than the pressure loss of the blowing air passage 29a in the blowing duct 29 connected to the passenger's seat side center opening portion 23.

An angle $\theta o2$ defined between the respective blowing side partitioning members 20 that partition the space 262 in which the air flows toward the passenger's seat side side opening portion 24 is larger than an angle $\theta o1$ defined between the respective blowing side partitioning members 20 that partition the space 261 in which the air flows toward the passenger's seat side center opening portion 23.

In other words, the intervals of the respective blowing side partitioning members 20 that partition the space 262 in which the air flows toward the passenger's seat side side opening portion 24 in the fan circumferential direction are larger than the intervals of the respective blowing side partitioning members 20 that partition the space 261 in which the air flows toward the passenger's seat side center opening portion 23 in the fan circumferential direction.

Therefore, the space 262 in which the air flows toward the passenger's seat side side opening portion 24 is larger than the space 261 in which the air flows toward the passenger's seat side center opening portion 23 in the fan circumferential direction.

Likewise, an angle θi2 defined between the respective suction side partitioning members 40 that partition the space 192 in which the air flows toward the passenger's seat side side opening portion 24 is larger than an angle θi1 defined between the respective suction side partitioning members 40 that partition the space 191 in which the air flows toward the passenger's seat side center opening portion 23.

In other words, the intervals of the respective suction side partitioning members 40 that partition the space 192 in which the air flows toward the passenger's seat side side opening portion 24 in the fan circumferential direction are larger than the intervals of the respective suction side partitioning members 40 that partition the space 191 in which the air flows toward the passenger's seat side center opening portion 23 in the fan circumferential direction.

Therefore, the space 192 in which the air flows toward the passenger's seat side side opening portion 24 is larger than the space 191 in which the air flows toward the passenger's seat side center opening portion 23 in the fan circumferential direction.

With the above configuration, since the distribution of work of the blower fan 121 can be changed according to the pressure loss of the respective blowing air passages 29a and 30a, the proportion of the air flow rate blown through the respective blowing air passages 29a and 30a can be equalized.

As described above, in the present embodiment, the first blowing air passage 29a that communicates with one opening portion 23 of the multiple opening portions 21 to 24, and the second blowing air passage 30a that communicates with another opening portion 24 of the multiple opening portions 21 to 24 are provided. The pressure loss of the air flow in the second blowing air passage 30a is larger than the pressure loss of the air flow in the first blowing air passage 29a, and the suction side partitioning members 40 and the blowing side partitioning members 20 partition the first space 261 in which the air flows toward one opening portion 23, and the second space 262 in which the air flows toward another opening portion 24. The second opening portion 262 is larger than the first space 261 in the circumferential direction of the blower fan 121.

With the above configuration, since the distribution of the work of the blower fan 121 can be changed according to the pressure loss of the ventilation passage through the respective opening portions 23 and 24, the proportion of the air flow rate blown from the respective opening portions 23 and 24 can be equalized.

Sixth Embodiment

Figure 11:
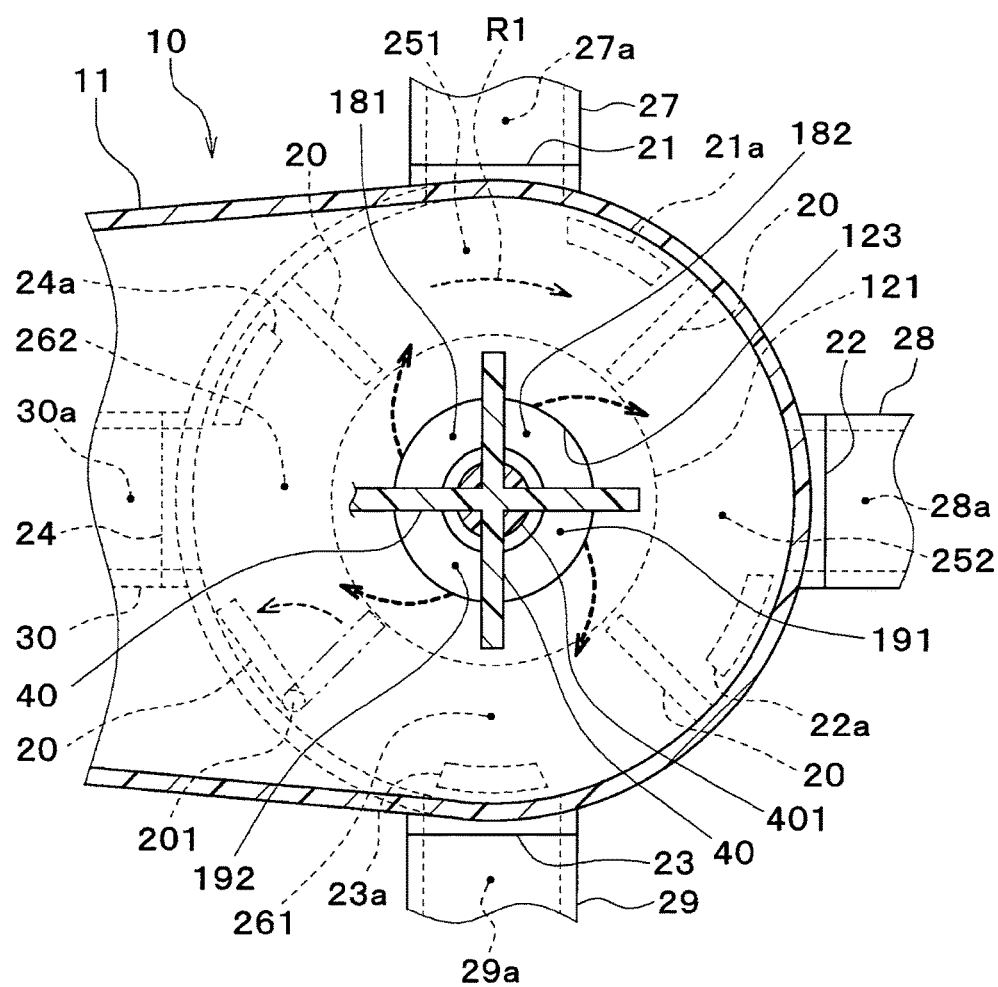
FIG. 11 is a schematic cross-sectional view illustrating a vehicle air conditioning device according to a sixth embodiment of the present disclosure.
Figure 12:
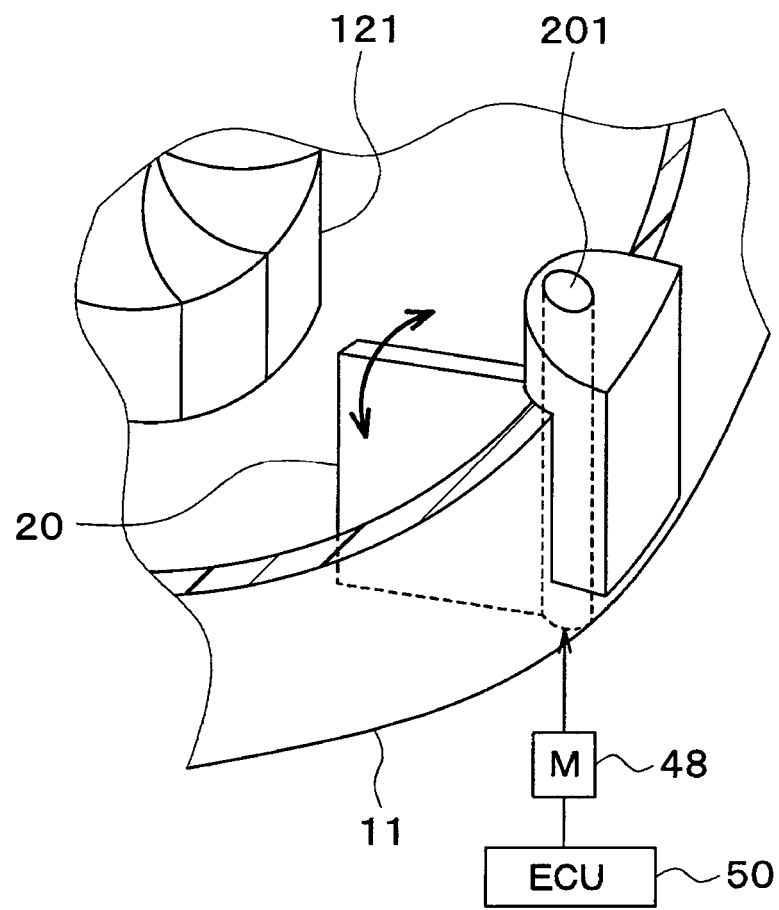
FIG. 12 is a schematic perspective cross-sectional view illustrating a vehicle air conditioning device according to the sixth embodiment.

In the present embodiment, as illustrated in FIGS. 11 and 12, blowing side partitioning members 20 can be stored. Specifically, each of the blowing side partitioning members 20 is formed into a plate door shape, and can swing about a rotation axis 201.

The rotation axis 201 of each blowing side partitioning member 20 is disposed in proximity to a side wall of a casing 11. The rotation axis 201 of each blowing side partitioning member 20 is driven by an electric actuator 48. The operation of the electric actuator 45 is controlled according to a control signal output from an air-conditioning control device 50.

The blowing side partitioning members 20 are switched between a partition state indicated by two-dot chain lines in FIG. 11 and a low resistance state indicated by broken lines in FIG. 11. In the partition state, each of the blowing side partitioning members 20 protrudes toward a center of the casing 11 from the side wall of the casing 11, and partitions an air flow toward the passenger's seat side center opening portion 23 (one opening portion). In the low resistance state, each of the blowing side partitioning members 20 is stored at a position along the side wall of the casing 11, and a resistance to the air flow toward the passenger's seat side side opening portion 24 is lower than that in the partition state.

In an operating example of FIG. 11, the passenger's seat side center opening portion 23 is closed by the passenger's seat side center door 23a, and the passenger's seat side side opening portion 24 is opened by the passenger's seat side side door 24a. The blowing side partitioning member 20 corresponding to the passenger's seat side center opening portion 23 is switched to the low resistance state.

With the above configuration, the air blown toward the passenger's seat side center opening portion 23 from the blower fan 121 flows toward the passenger's seat side side opening portion 24 without being blocked by the blowing side partitioning member 20, and is blown into the vehicle interior through the passenger's seat side side opening portion 24. For that reason, the pressure loss can be reduced as compared with a case in which the blowing side partitioning member 20 is not stored.

As described above, in the present embodiment, the blowing side partitioning member 20 is switched to the partition state in which the air flow toward the passenger's seat side center opening portion 23 (one opening portion) is partitioned, and the low resistance state in which the resistance to the air flow toward the passenger's seat side side opening portion 24 (another opening portion) becomes low as compared with the partition state. When the passenger's seat side center door 23a closes the passenger's seat side center opening portion 23, the air-conditioning control device 50 and the electric actuator 48 switch the blowing side partitioning member 20 to the low resistance state.

With the above configuration, when the passenger's seat side center door 23a closes the passenger's seat side center opening portion 23, the pressure loss when the air blown from the blower fan 121 toward the passenger's seat side center opening portion 23 flows toward the passenger's seat side side opening portion 24 can be reduced.

Seventh Embodiment

Figure 13:
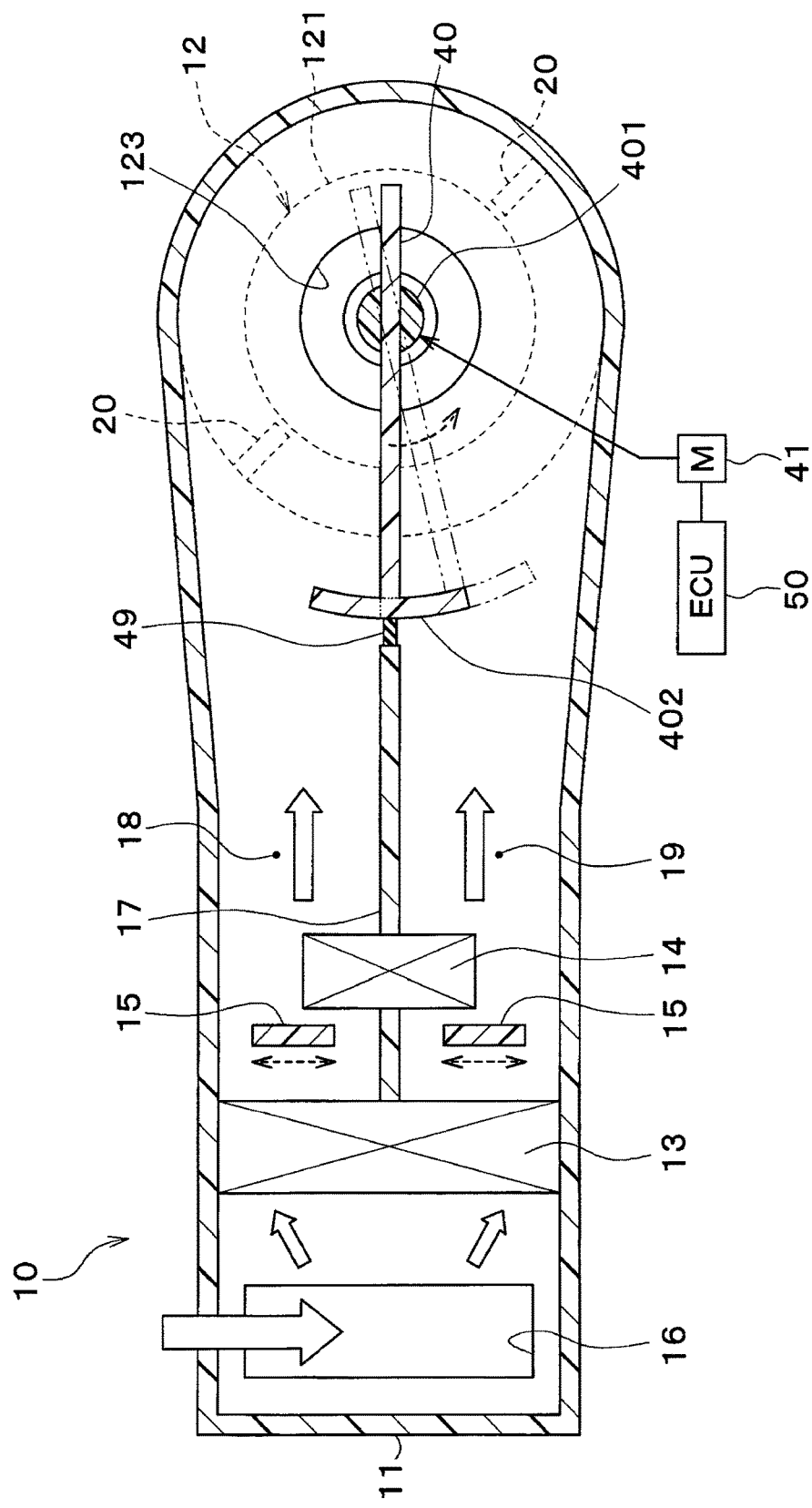
FIG. 13 is a schematic cross-sectional view illustrating a vehicle air conditioning device according to a seventh embodiment of the present disclosure.

In the above first embodiment, one end of each suction side partitioning member 40 is coupled with a partition wall 17 through a stretchable connection portion 42. On the other hand, in a seventh embodiment, as illustrated in FIG. 13, one end of each suction side partitioning member 40 is configured to slide relative to the partition wall 17 through a slide member 49.

An arcuate part 402 concentric with a swing shaft 401 is formed on one end of the suction side partitioning member 40. The slide member 49 is made of an elastic material such as elastomer, and fixed to the partition wall 17.

The slide member 49 comes in close contact with the arcuate part 402. Since the suction side partitioning member 40 slides relative to the partition wall 17 through the elastic slide member 49, the suction side partitioning members 40 can partition an air passage in the casing 11 into a first air passage 18 and a second air passage 19 regardless of an angle of the suction side partitioning member 40.

Similarly, in the present embodiment, the same effects as those in the above first embodiment can be obtained.

Eighth Embodiment

In the present embodiment, a rotation direction R1 of a blower fan 121 is appropriately set to reduce a pressure loss of an air flow reaching a blowing opening portion from the blower fan 121.

Figure 14:
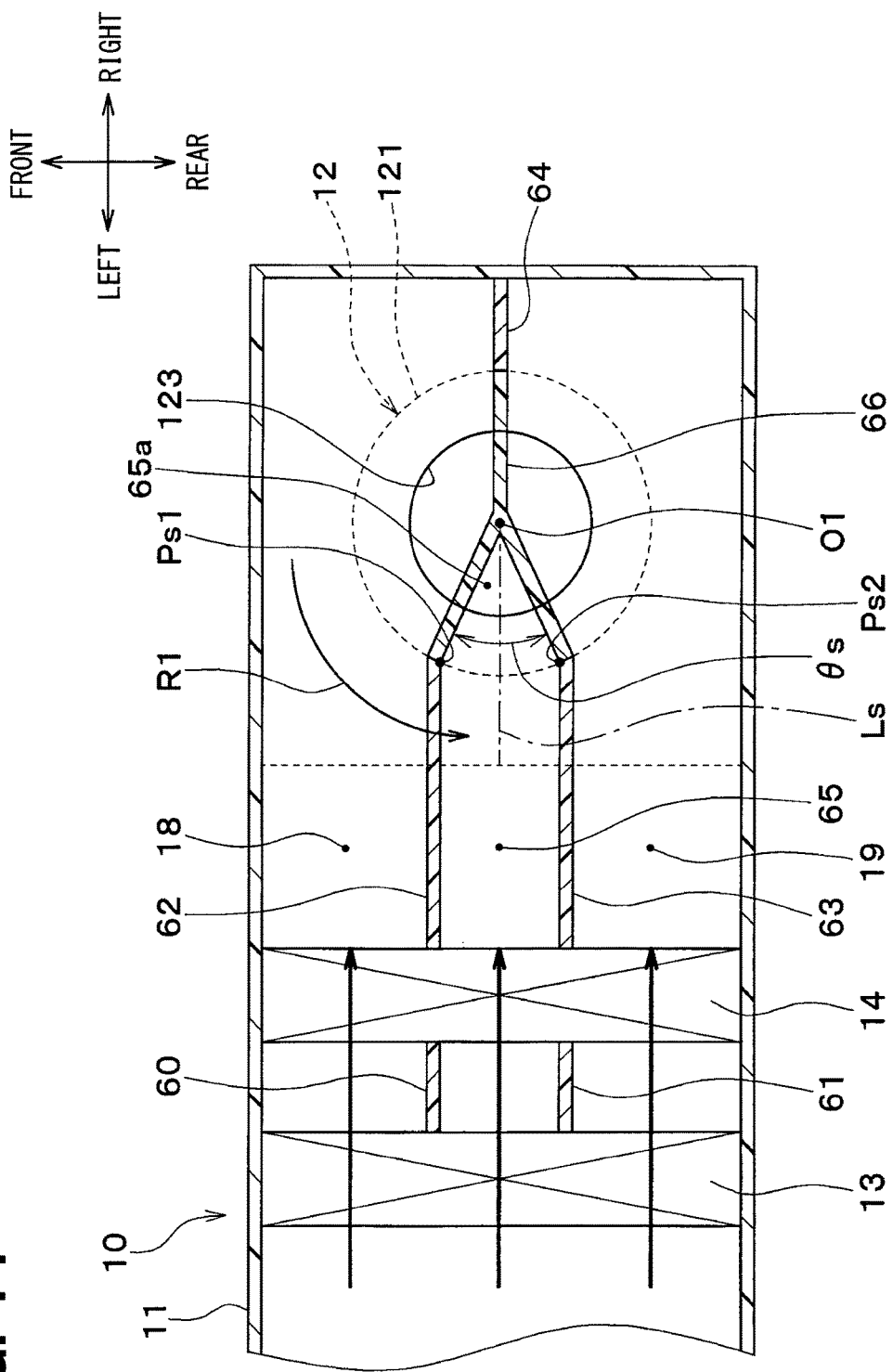
FIG. 14 is a schematic horizontal cross-sectional view illustrating a vehicle air conditioning device according to an eighth embodiment of the present disclosure.
Figure 15:
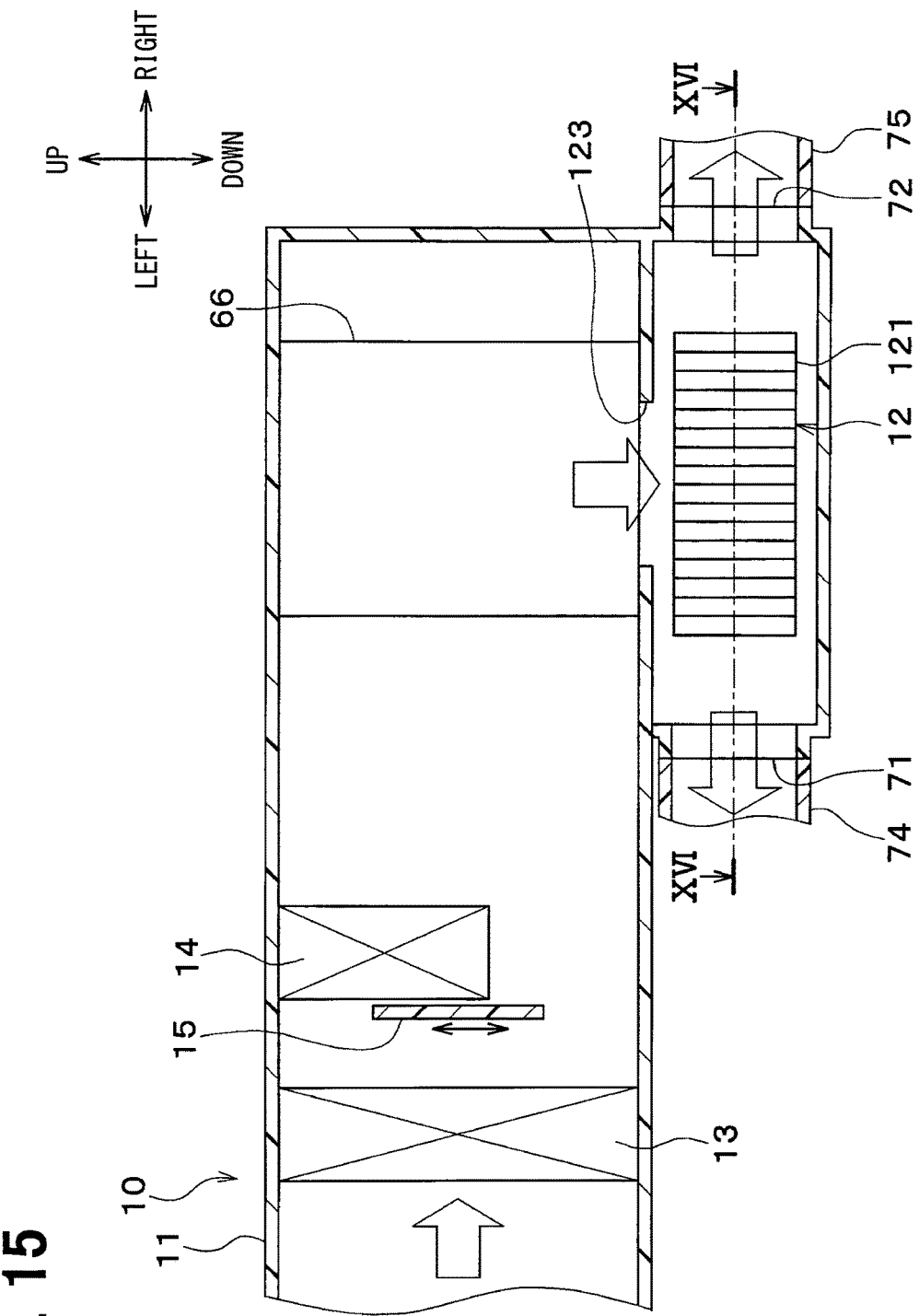
FIG. 15 is a schematic vertical cross-sectional view illustrating a vehicle air conditioning device according to the eighth embodiment.

As illustrated in FIGS. 14 and 15, partition walls 60, 61, 62, 63, and 64 are disposed on an air flow downstream side of an evaporator 13 within a casing 11. The partition walls 60 to 64 are shaped into plates for partitioning an air passage in the casing 11 into a first air passage 18, a second air passage 19, and a third air passage 65.

In the casing 11, a suction side partitioning member 66 is disposed in an air suction port 123 of a blower 12. The suction side partitioning member 66 is shaped into a plate that extends in a fan radial direction and crosses the air suction port 123.

When viewed from a rotation axis direction (hereinafter referred to as "fan rotation axis direction") of the blower fan 121, each end of the suction side partitioning member 66 is located on an outer edge of the blower fan 121.

Similarly to the partition walls 60 to 64, the suction side partitioning member 66 partitions the air passage in the casing 11 into the first air passage 18, the second air passage 19, and the third air passage 65. With the above configuration, the air conditioning wind in the first air passage 18, the air conditioning wind in the second air passage 19, and the air conditioning wind in the third air passage 65 are suctioned into the blower fan 121, separately.

In this example, the suction side partitioning member 66 is formed of a member separated from the partition walls 60 to 64, but the suction side partitioning member 66 may be formed integrally with the partition walls 60 to 64.

Figure 16:
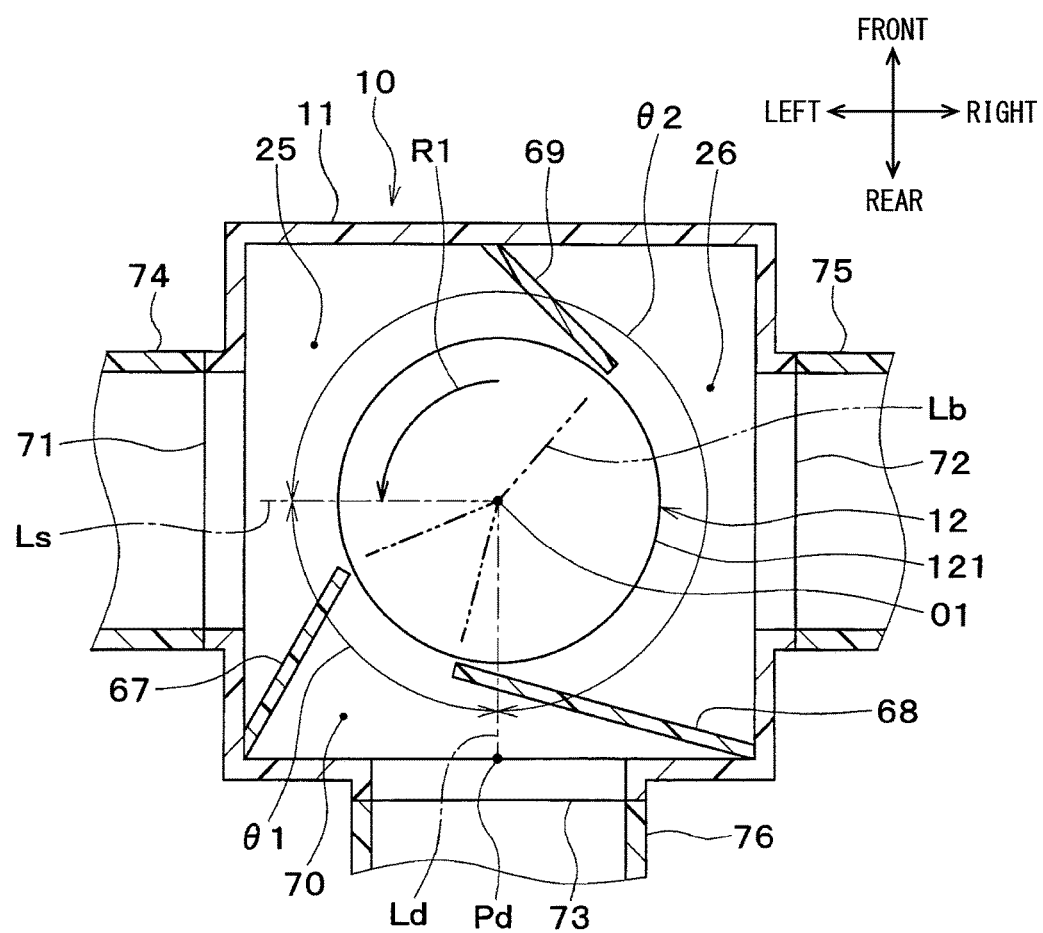
FIG. 16 is a schematic cross-sectional view taken along a line XVI-XVI in FIG. 15.

As illustrated in FIG. 16, blowing side partitioning members 67, 68, and 69 are disposed on a radially outer side of the blower fan 121 within the casing 11. The blowing side partitioning members 67 to 69 are shaped into plates for partitioning a space in which an air blown from the blower fan 121 flows into a first blowing space 25, a second blowing space 26, and a third blowing space 70.

The air conditioning wind suctioned from the first air passage 18 by the blower fan 121 is blown into the first blowing space 25. The air conditioning wind suctioned from the second air passage 19 by the blower fan 121 is blown into the second blowing space 26. The air conditioning wind suctioned from the third air passage 65 by the blower fan 121 is blown into the third blowing space 70.

Two-dot chain lines Lb in FIG. 16 schematically indicate boundaries of the air conditioning wind suctioned from the first air passage 18, the air conditioning wind suctioned from the second air passage 19, and the air conditioning wind suctioned from the third air passage 65.

In this example, an angle by which the blower fan 121 rotates since the blower fan 121 suctions the air until the blower fan 121 blows out the air is about 50°. In general, the angle by which the blower fan 121 rotates since the blower fan 121 suctions the air until the blower fan 121 blows out the air is substantially 90° or less.

An angle defined between the suction side partitioning member 66 and each of the blowing side partitioning members 67 to 69 when viewed from the rotation axis direction (hereinafter referred to as "fan rotation axis direction") of the blower fan 121 is substantially equal to an angle obtained by adding the angle by which the blower fan 121 rotates since the blower fan 121 suctions the air until the blower fan 121 blows out the air to an advancing angle or a receding angle. The reason is the same as that in the above first embodiment.

For that reason, the air conditioning wind suctioned from the first air passage 18 by the blower fan 121 is blown into the first blowing space 25, the air conditioning wind suctioned from the second air passage 19 by the blower fan 121 is blown into the second blowing space 26, and the air conditioning wind suctioned from the third air passage 65 by the blower fan 121 is blown into the third blowing space 70. Therefore, the air conditioning wind in the first air passage 18, the air conditioning wind in the second air passage 19, and the air conditioning wind in the third air passage 65 can be restrained from being mixed together.

A left side blowing opening portion 71, a right side blowing opening portion 72, and a rear side blowing opening portion 73 are defined in an air flow downstream most portion of the casing 11. The left side blowing opening portion 71 communicates with the first blowing space 25, the right side blowing opening portion 72 communicates with the second blowing space 26, and the rear side blowing opening portion 73 communicates with the third blowing space 70.

The left side blowing opening portion 71 is connected with a left side blowing duct 74, the right side blowing opening portion 72 is connected with a right side blowing duct 75, and the rear side blowing opening portion 73 is connected with a rear side blowing duct 76.

With the above configuration, the air conditioning wind in the first blowing space 25 is blown toward an occupant on a left front seat (for example, passenger's seat) through the left side blowing opening portion 71 and the left side blowing duct 74. The air conditioning wind in the second blowing space 26 is blown toward an occupant on a right front seat (for example, driver's seat) through the right side blowing opening portion 72 and the right side blowing duct 75. The air conditioning wind in the third blowing space 70 is blown toward occupants on rear seats through the rear side blowing opening portion 73 and the rear side blowing duct 76.

The opening areas of the left side blowing opening portion 71, the right side blowing opening portion 72, and the rear side blowing opening portion 73 are each adjusted by a blowing port mode switching door (not illustrated).

The blowing port mode switching door is coupled to an electric actuator (not illustrated) for driving a blowing port mode door through a link mechanism not illustrated, and opened or closed in tandem with the link mechanism. The operation of the electric actuator for driving the blowing port mode doors is controlled according to a control signal output from the air-conditioning control device 50.

When the opening areas of the left side blowing opening portion 71, the right side blowing opening portion 72, and the rear side blowing opening portion 73 are adjusted by the blowing port mode switching door (not illustrated), the pressure loss of the air conditioning wind is changed.

Blowing ports of the respective blowing ducts 74, 75, and 76 are each formed with a louver (not illustrated) for adjusting a blowing direction of the air conditioning wind, and opening and closing the blowing port. When each blowing port is opened or closed by the louver, a pressure loss of the air conditioning wind is changed.

A suction side virtual line segment Ls illustrated in FIG. 14 is a virtual line segment that extends from a rotation center O1 of the blower fan 121 toward a third suction space 65a. The third suction space 65a is a portion of the third air passage 65 which overlaps with the blower fan 121 when viewed from the fan rotation axis direction.

In the example of FIGS. 14 and 16, when viewed from the fan rotation axis direction, the suction side virtual line segment Ls is a virtual line segment that bisects a center angle θs of the fan-shaped third suction space 65a. The center angle θs is an angle defined between a virtual line segment connecting one end point Ps1 of an arc (virtual line) of the third suction space 65a and the rotation center O1 of the blower fan 121, and a virtual line segment connecting the other end point Ps2 of the arc (virtual line) of the third suction space 65a and the rotation center O1 of the blower fan 121.

A blowing side virtual line segment Ld illustrated in FIG. 16 is a virtual line segment that extends from the rotation center O1 of the blower fan 121 toward the rear side blowing opening portion 73.

In the example of FIG. 16, when viewed from the fan rotation axis direction, the blowing side virtual line segment Ld is a virtual line segment that bisects the rear side blowing opening portion 73. In other words, when viewed from the fan rotation axis direction, the blowing side virtual line segment Ld in FIG. 16 is a virtual line segment connecting a middle point Pd of the rear side blowing opening portion 73 in a width direction (vehicle horizontal direction in the example of FIG. 16) and the rotation center O1 of the blower fan 121.

As illustrated in FIG. 16, when viewed from the fan rotation axis direction, an angle θ1 (hereinafter referred to as "rotation direction angle") from the suction side virtual line segment Ls to the blowing side virtual line segment Ld in the rotation direction R1 of the blower fan 121 is smaller than an angle θ2 (hereinafter referred to as "counter rotation direction angle") from the suction side virtual line segment Ls to the blowing side virtual line segment Ld in an opposite direction to the rotation direction R1 of the blower fan 121.

Figure 17:
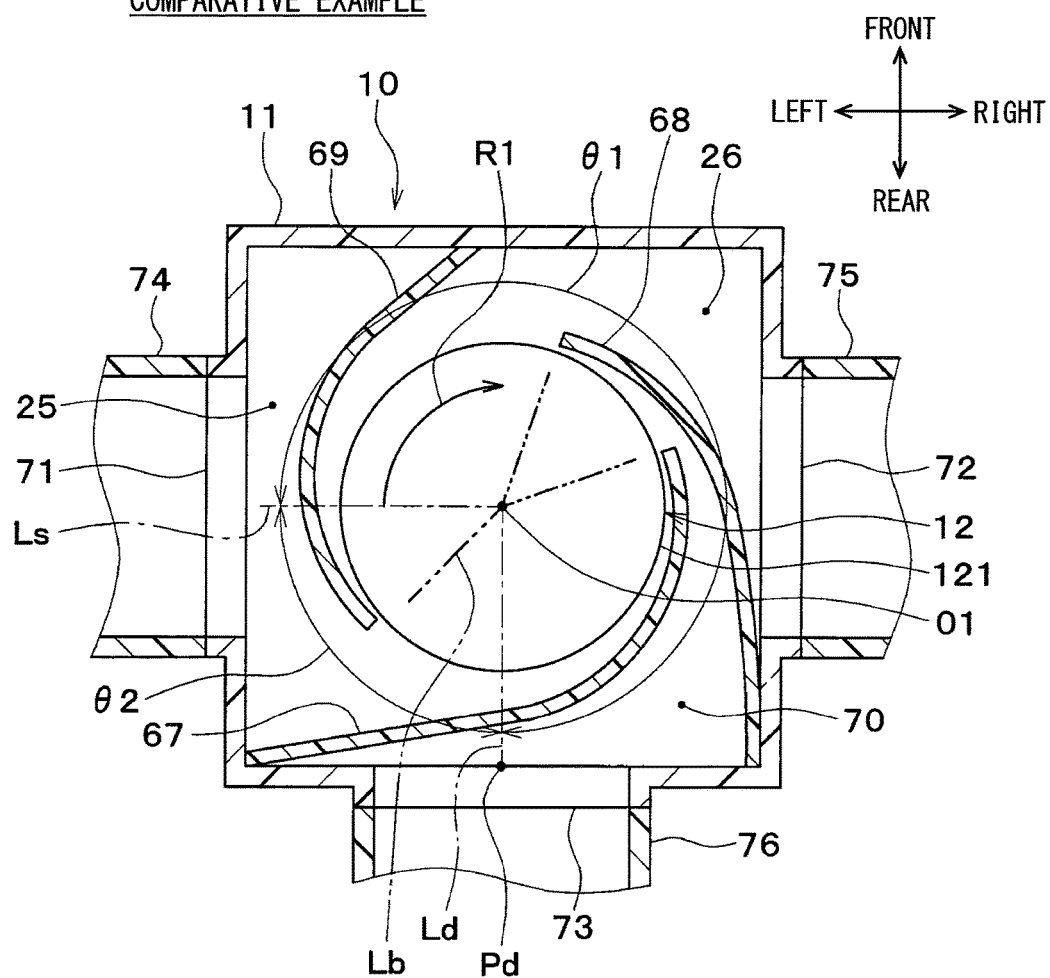
FIG. 17 is a schematic cross-sectional view illustrating a vehicle air conditioning device according to the eighth embodiment.

FIG. 17 illustrates a comparative example in which the rotation direction R1 of the blower fan 121 is opposite to that in the present embodiment. As a result, contrary to the present embodiment, the rotation direction angle θ1 is larger than the counter rotation direction angle θ2.

In this comparative example, since the blower fan 121 blows the air conditioning wind suctioned from the third air passage 65 on an opposite side of the rear side blowing opening portion 73, a flow channel length of the third blowing space 70 becomes longer. As a result, the pressure loss of the air flow from the blower fan 121 to the rear side blowing opening portion 73 becomes larger.

On the contrary, in the present embodiment, as illustrated in FIG. 16, since the blower fan 121 blows out the air conditioning wind suctioned from the third air passage 65 on a side close to the rear side blowing opening portion 73, the flow channel length of the third blowing space 70 can be shortened as compared with the comparative example. As a result, since the pressure loss of the air flow from the blower fan 121 to the rear side blowing opening portion 73 can be reduced, a blowing efficiency can be improved.

The suction side virtual line segment Ls and the blowing side virtual line segment Ld are defined, for example, as follows. When viewed from the rotation axis direction of the blower fan 121, the suction side virtual line segment Ls is a virtual line segment that bisects an angle θs. The angle θs is defined between a virtual line segment that connects an end point Ps1 of the third air passage 65 which overlaps with an outer edge of the blower fan 121 and is located on one end side in the circumferential direction of the blower fan 121 and the rotation center O1 of the blower fan 121, and a virtual line segment that connects an end point Ps2 of the third air passage 65 which overlaps with the outer edge of the blower fan 121 and is located on the other circumferential end side of the blower fan 121, and the rotation center O1 of the blower fan 121.

The blowing side virtual line segment Ld is a virtual line segment that connects a middle point Pd of the rear side blowing opening portion 73 in the width direction and the rotation center O1 of the blower fan 121 when viewed from the rotation axis direction of the blower fan 121.

Ninth Embodiment

Figure 18:
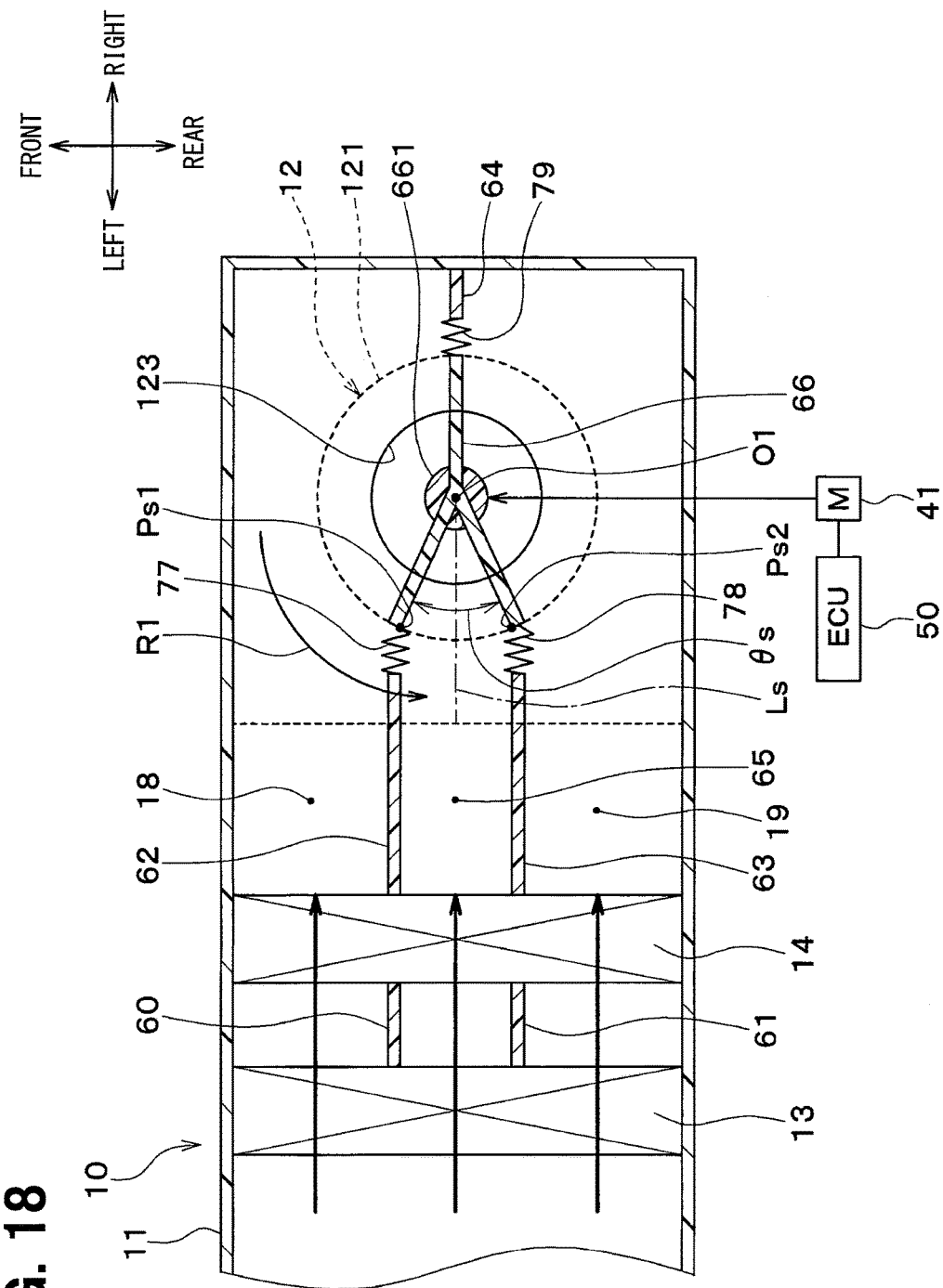
FIG. 18 is a schematic cross-sectional view illustrating a vehicle air conditioning device according to a ninth embodiment of the present disclosure.

In the above eighth embodiment, the suction side partitioning member 66 is fixed to the casing 11. On the other hand, in the present embodiment, as illustrated in FIG. 18, suction side partitioning members 66 are supported to a casing 11 so as to be swingable about a swing shaft 661.

The swing shaft 661 of the suction side partitioning members 66 is disposed coaxially with the blower fan 121, and swung by an electric actuator 41. The operation of the electric actuator 41 for the suction side partitioning members 66 is controlled according to a control signal output from the air-conditioning control device 50. The electric actuator 41 and the air-conditioning control device 50 are an actuating device for moving the suction side partitioning members 66.

The respective ends of the suction side partitioning members 66 are coupled to partition walls 62, 63, and 64 through connection portions 77, 78, and 79. The connection portions 77, 78, and 79 are formed of a stretchable member such as a rubber bellow.

Similarly to the suction side partitioning member 66 and the partition walls 62 to 64, the connection portions 77 to 79 partition the air passage in the casing 11 into a first air passage 18, a second air passage 19, and a third air passage 65. With the above configuration, the air conditioning wind in the first air passage 18, the air conditioning wind in the second air passage 19, and the air conditioning wind in the third air passage 65 are suctioned into the blower fan 121, separately.

When the electric actuator 41 swings the swing shaft 661 of the suction side partitioning member 66, a position (swing angle) of the suction side partitioning members 66 is changed in a circumferential direction of the blower fan 121. As a result, the respective positions of boundaries between the first air passage 18, the second air passage 19, and the third air passage 65 are changed in the circumferential direction of the blower fan 121 in the air suction port 123.

Since the suction side partitioning members 66 are coupled to the partition walls 62 to 64 through the stretchable connection portions 77 to 79, the air passage in the casing 11 can be partitioned into the first air passage 18, the second air passage 19, and the third air passage 65 regardless of the swing angle of the suction side partitioning members 66.

As in the above eighth embodiment, in the present embodiment, when the opening areas of the left side blowing opening portion 71, the right side blowing opening portion 72, and the rear side blowing opening portion 73 are adjusted by the blowing port mode switching doors (not illustrated), or the blowing ports of the respective blowing ducts 74, 75, and 76 are opened or closed by the louvers (not illustrated), the pressure loss of the air conditioning wind is changed. Each of the blowing port mode switching doors and the louvers is a pressure loss change device for changing a pressure loss of the air conditioning wind.

The air-conditioning control device 50 controls the operation of the electric actuator 41 in such a manner that the suction side partitioning members 66 move in the rotation direction R1 of the blower fan 121 more as the pressure loss of the air flow in the casing 11 and the blowing ducts 74, 75, and 76 is larger.

According to the above configuration, as in the above first embodiment, when the pressure loss is increased, since the angles from the suction side partitioning members 66 to the blowing side partitioning members 67 to 69 become larger, even if the angle by which the blower fan 121 rotates since the blower fan 121 suctions the air until the blower fan 121 blows out the air becomes larger, the air flow from the first air passage 18, the air flow from the second air passage 19, and the air flow from the third air passage 65 can be restrained from being mixed together.

In the present embodiment, the positions of the blowing side partitioning members 67, 68, and 69 are fixed, and the positions of the suction side partitioning members 66 are changed. Alternatively, as in the above second embodiment, the positions of the suction side partitioning members 66 may be fixed, and the positions of the blowing side partitioning members 67 to 69 may be changed.

In other words, actuating devices 41 and 50 for moving at least any one of the suction side partitioning members 66 and the blowing side partitioning members 67, 68, and 69 may be provided so as to move a relative position of the blowing side partitioning members 67, 68, and 69 to the suction side partitioning members 66 in the rotation direction R1 of the blower fan 121 more as the pressure loss of the air flow in the casing 11 and the blowing ducts 74, 75, and 76 is larger. In other words, the actuating devices 41 and 50 increase a deviation between the position of the suction side partitioning members 66 and the positions of the blowing side partitioning members 67, 68, and 69 in the rotation direction R1 of the blower fan 121 more as the pressure loss of the air flow in the casing 11 and the blowing duct 74, 75, 76 is larger. In that case, as in the above first and second embodiments, the air flow from the first air passage 18, the air flow from the second air passage 19, and the air flow from the third air passage 65 can be restrained from being mixed together.

Tenth Embodiment

Figure 19:
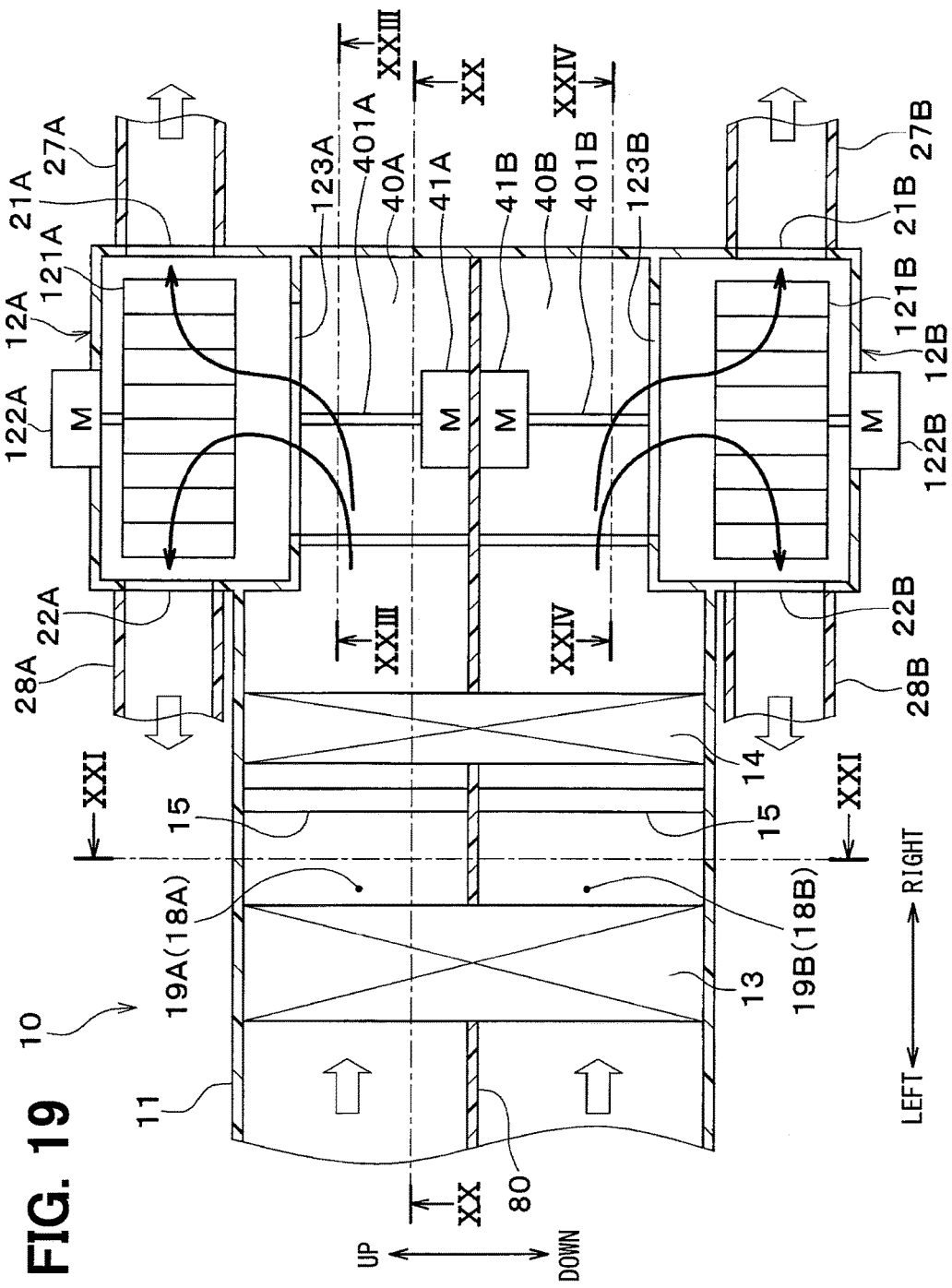
FIG. 19 is a schematic cross-sectional view illustrating a vehicle air conditioning device according to a tenth embodiment of the present disclosure.
Figure 20:
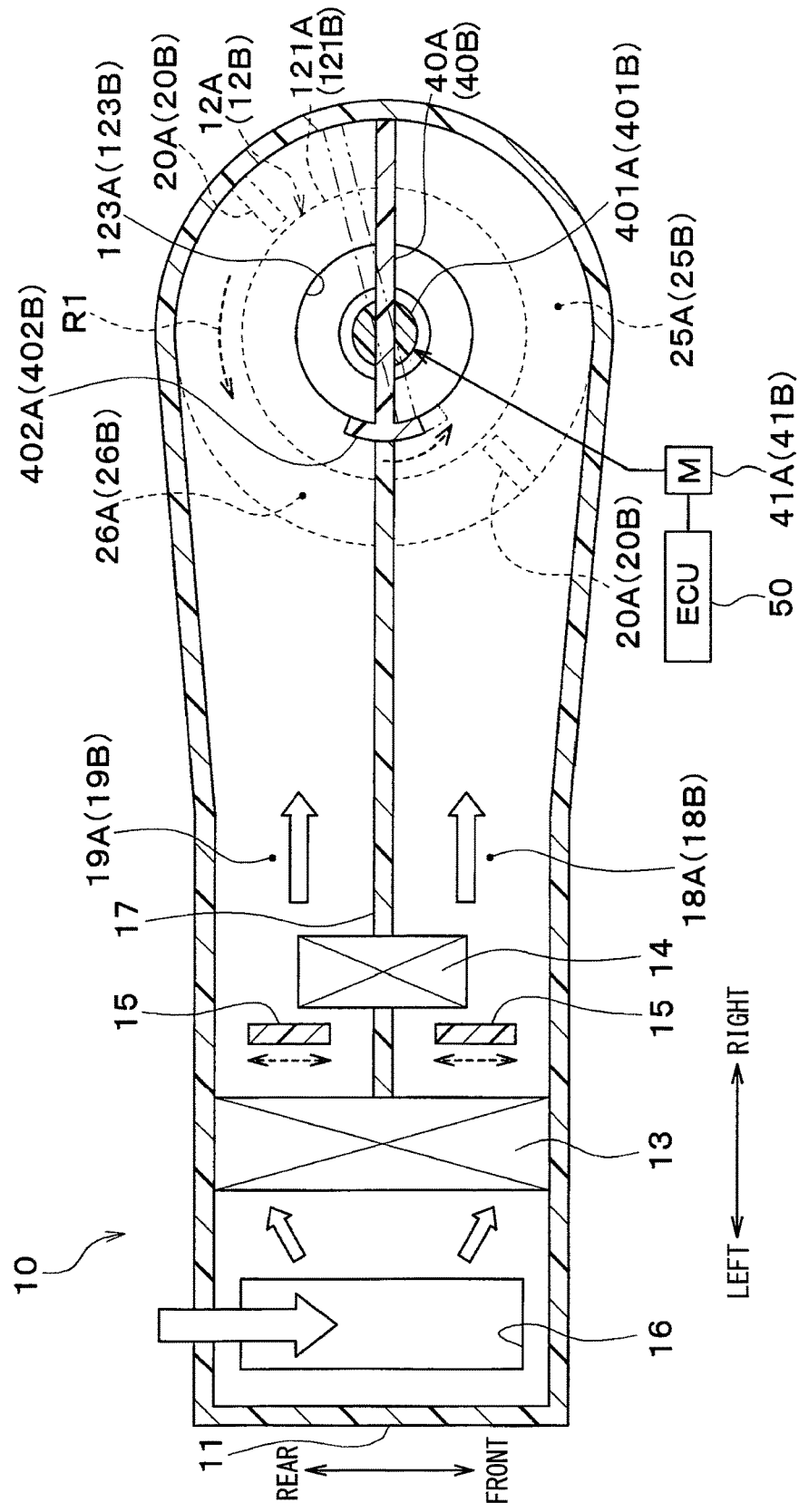
FIG. 20 is a schematic cross-sectional view taken along a line XX-XX in FIG. 19.
Figure 21:
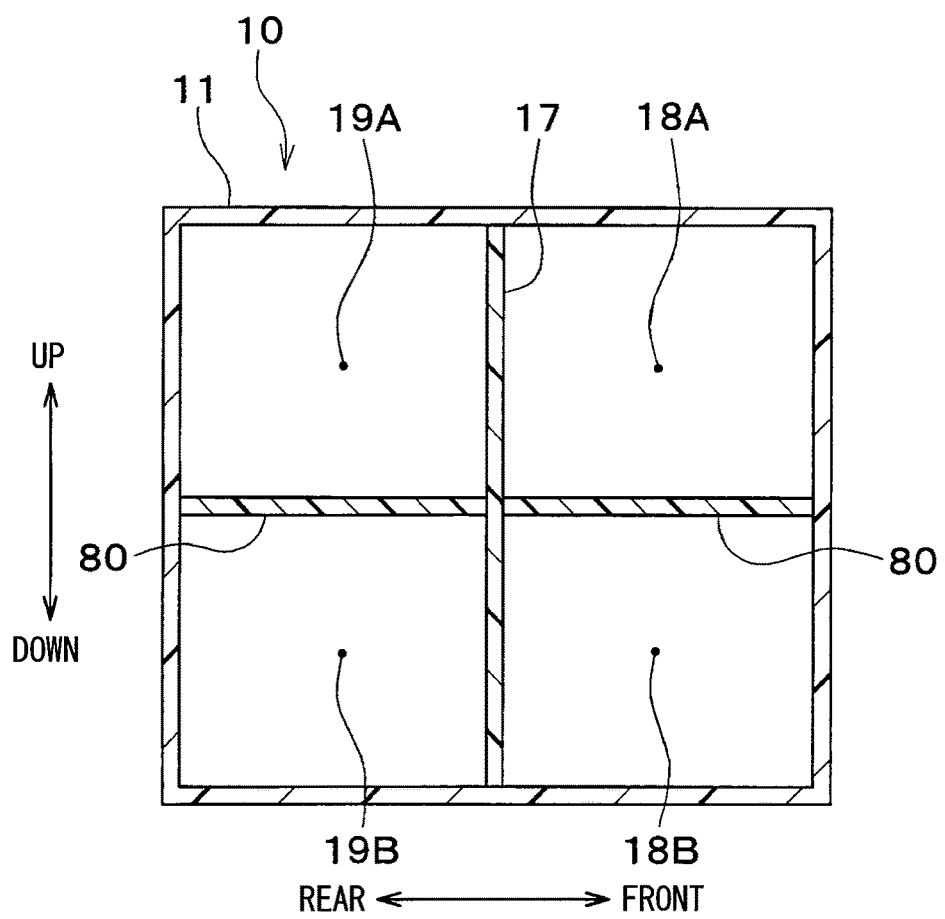
FIG. 21 is a schematic cross-sectional view taken along a line XXI-XXI in FIG. 19.

In the above embodiments, the air passage in the casing 11 is partitioned into the first air passage 18 on the driver's seat side and the second air passage 19 on the passenger's seat side by the partition wall 17. On the other hand, in the present embodiment, as illustrated in FIGS. 19, 20, and 21, a second partition wall 80 allows a first air passage 18 on a driver's seat side to be partitioned into a driver's seat side outside air passage 18A and a driver's seat side inside air passage 18B. The second partition wall 80 further allows a second air passage 19 on the passenger's seat side to be partitioned into a passenger's seat side outside air passage 19A and a passenger's seat side inside air passage 19B.

In the drawings, respective arrows of up, down, front, rear, right, and left indicate the respective directions of up, down, front, rear, right, and left in a vehicle state equipped with an interior air conditioning unit 10.

The interior air conditioning unit 10 can switch an outside air mode for blowing only an outside air, an inside air mode for blowing only an inside air, and an inside and outside air two-layer mode for blowing the outside air and the inside air, separately.

In the outside air mode, an outside air flows into all of the driver's seat side outside air passage 18A, the driver's seat side inside air passage 18B, the passenger's seat side outside air passage 19A, and the passenger's seat side inside air passage 19B. In the inside air mode, an inside air flows into all of the driver's seat side outside air passage 18A, the driver's seat side inside air passage 18B, the passenger's seat side outside air passage 19A, and the passenger's seat side inside air passage 19B. In the inside and outside air two-layer mode, the outside air flows into the driver's seat side outside air passage 18A and the passenger's seat side outside air passage 19A, and the inside air flows into the driver's seat side inside air passage 18B and the passenger's seat side inside air passage 19B.

An air mix door 15 is disposed in each of the driver's seat side outside air passage 18A, the driver's seat side inside air passage 18B, the passenger's seat side outside air passage 19A, and the passenger's seat side inside air passage 19B.

In the casing 11, an outside air blower 12A is disposed on an air flow downstream side of the driver's seat side outside air passage 18A and the passenger's seat side outside air passage 19A. In the casing 11, an inside air blower 12B is disposed on an air flow downstream side of the driver's seat side inside air passage 18B and the passenger's seat side inside air passage 19B. A basic configuration of the outside air blower 12A and the inside air blower 12B is identical with that of the blower 12 in the above embodiments.

The outside air blower 12A is disposed on a lateral side (upper side in FIG. 19) of the driver's seat side outside air passage 18A and the passenger's seat side outside air passage 19A. Therefore, a rotation shaft of a blower fan 121A of the outside air blower 12A is orthogonal to the driver's seat side outside air passage 18A and the passenger's seat side outside air passage 19A.

The inside air blower 12B is disposed on a lateral side (lower side in FIG. 19) of the driver's seat side inside air passage 18B and the passenger's seat side inside air passage 19B. Therefore, a rotation shaft of a blower fan 121B of the inside air blower 12B is orthogonal to the driver's seat side inside air passage 18B and the passenger's seat side inside air passage 19B.

Outside air blowing side partitioning members 20A are disposed on a radially outer side of the blower fan 121A of the outside air blower 12A in the casing 11. The outside air blowing side partitioning members 20A are each formed into a plate shape extending in a radial direction of the blower fan 121A of the outside air blower 12A. As illustrated in FIG. 20, the outside air blowing side partitioning members 20A partition a space in which the air blown from the blower fan 121A flows into a first outside air blowing space 25A and a second outside air blowing space 26A.

Inside air blowing side partitioning members 20B are disposed on a radially outer side of the blower fan 121B of the inside air blower 12B in the casing 11. The inside air blowing side partitioning members 20B are each formed into a plate shape extending in a radial direction of the blower fan 121B of the inside air blower 12B. As indicated by reference symbols in parentheses in FIG. 20, the inside air blowing side partitioning members 20B partition a space in which the air blown from the blower fan 121B flows into a first inside air blowing space 25B and a second inside air blowing space 26B.

A driver's seat side face opening portion 21A, a passenger's seat side face opening portion 22A, a driver's seat side foot opening portion 21B, and a passenger's seat side foot opening portion 22B are defined on an air flow downstream most portion of the casing 11.

The driver's seat side face opening portion 21A communicates with the first outside air blowing space 25A. The passenger's seat side face opening portion 22A communicates with the second outside air blowing space 26A.

The driver's seat side foot opening portion 21B communicates with the first inside air blowing space 25B. The passenger's seat side foot opening portion 22B communicates with the second inside air blowing space 26B.

A driver's seat side face duct 27A is connected to an air flow downstream side of the driver's seat side face opening portion 21A. The driver's seat side face duct 27A has a blowing port for blowing out the air conditioning wind adjusted in temperature by the interior air conditioning unit 10 toward an upper body of an occupant on a driver's seat and a vehicle windshield.

A passenger's seat side face duct 28A is connected to an air flow downstream side of the passenger's seat side face opening portion 22A. The passenger's seat side face duct 28A has a blowing port for blowing out the air conditioning wind adjusted in temperature by the interior air conditioning unit 10 toward the upper body of the occupant on the passenger's seat and the vehicle windshield.

A driver's seat side foot duct 27B is connected to an air flow downstream side of the driver's seat side foot opening portion 21B. The driver's seat side foot duct 27B has a blowing port for blowing the air conditioning wind adjusted in temperature by the interior air conditioning unit 10 toward feet of the occupant on the driver's seat.

A passenger's seat side foot duct 28B is connected to an air flow downstream side of the passenger's seat side foot opening portion 22B. The passenger's seat side foot duct 28B has a blowing port for blowing the air conditioning wind adjusted in temperature by the interior air conditioning unit 10 toward feet of the occupant on the passenger's seat.

A driver's seat side face door is disposed on an air flow upstream side of the driver's seat side face opening portion 21A. The driver's seat side face door is an opening and closing device for opening and closing the driver's seat side center opening portion 21, and adjusts an opening area of the driver's seat side face opening portion 21A.

A passenger's seat side face door is disposed on an air flow upstream side of the passenger's seat side face opening portion 22A. The passenger's seat side face door is an opening and closing device for opening and closing the passenger's seat side face opening portion 22A, and adjusts an opening area of the passenger's seat side face opening portion 22A.

A driver's seat side foot door is disposed on an air flow upstream side of the driver's seat side foot opening portion 21B. The driver's seat side foot door is an opening and closing device for opening and closing the driver's seat side foot opening portion 21B, and adjusts the opening area of the driver's seat side foot opening portion 21B.

A passenger's seat side foot door is disposed on an air flow upstream side of the passenger's seat side foot opening portion 22B. The passenger's seat side foot door is an opening and closing device for opening and closing the passenger's seat side foot opening portion 22B, and adjusts the opening area of the passenger's seat side foot opening portion 22B.

The driver's seat side face door, the passenger's seat side face door, the driver's seat side foot door, and the passenger's seat side foot door configure the blowing port mode switching doors (blowing port mode switching devices) for switching one blowing port mode to another.

When each blowing port mode switching door switches the blowing port mode to another, the pressure loss of the air conditioning wind is changed. The blowing port mode switching door is a pressure loss change device that changes the pressure loss of the air conditioning wind.

The driver's seat side face door, the passenger's seat side face door, the driver's seat side foot door, and the passenger's seat side foot door are each coupled to an electric actuator (not illustrated) for driving the blowing port mode doors through a link mechanism not illustrated, and rotated in conjunction with the electric actuator. The operation of the electric actuator for driving the blowing port mode doors is controlled according to a control signal output from the air-conditioning control device 50.

An air suction port 123A of the outside air blower 12A is defined on an air flow upstream side of the blower fan 121A of the outside air blower 12A within the casing 11. An outside air suction side partitioning member 40A is disposed in the air suction port 123A.

An air suction port 123B of the inside air blower 12B is defined on an air flow upstream side of the blower fan 121B of the inside air blower 12B within the casing 11. An inside air suction side partitioning member 40B is disposed in the air suction port 123B.

The basic configurations of the outside air suction side partitioning member 40A and the inside air suction side partitioning member 40B are identical with the basic configuration of the suction side partitioning members 40 in the above seventh embodiment.

An arcuate part 402A concentric with a swing shaft 401A is formed on one end of the outside air suction side partitioning member 40A. The arcuate part 402A slides on the partition wall 17.

As with the partition wall 17, the outside air suction side partitioning member 40A partitions an air passage in the casing 11 into the driver's seat side outside air passage 18A and the passenger's seat side outside air passage 19A. With this configuration, the air conditioning wind in the driver's seat side outside air passage 18A and the air conditioning wind in the passenger's seat side outside air passage 19A are suctioned into the blower fan 121A of the outside air blower 12A, separately.

When an electric actuator 41A drives the swing shaft 401A of the outside air suction side partitioning member 40A, a position of the outside air suction side partitioning member 40A is changed in a circumferential direction of the blower fan 121A. As a result, a position of a boundary between the air flow in the driver's seat side outside air passage 18A and the air flow in the passenger's seat side outside air passage 19A is changed in the circumferential direction of the blower fan 121A in the air suction port 123A.

Since the arcuate part 402A of the outside air suction side partitioning member 40A slides on the partition wall 17, the outside air suction side partitioning member 40A can partition an air passage in the casing 11 into the driver's seat side outside air passage 18A and the passenger's seat side outside air passage 19A regardless of an angle of the outside air suction side partitioning member 40A.

An arcuate part 402B concentric with a swing shaft 401B is formed on one end of the inside air suction side partitioning member 40B. The arcuate part 402B slides on the partition wall 17.

As with the partition wall 17, the inside air suction side partitioning member 40B partitions the air passage in the casing 11 into the driver's seat side inside air passage 18B and the passenger's seat side inside air passage 19B. With this configuration, the air conditioning wind in the driver's seat side inside air passage 18B and the air conditioning wind in the passenger's seat side inside air passage 19B are suctioned into the blower fan 121B of the inside air blower 12B, separately.

When an electric actuator 41B drives the swing shaft 401B of the inside air suction side partitioning member 40B, a position of the inside air suction side partitioning member 40B is changed in a circumferential direction of the blower fan 121B. As a result, a position of a boundary between the air flow in the driver's seat side inside air passage 18B and the air flow in the passenger's seat side inside air passage 19B is changed in the circumferential direction of the blower fan 121B in the air suction port 123B.

Since the arcuate part 402B of the inside air suction side partitioning member 40B slides on the partition wall 17, the inside air suction side partitioning member 40B can partition an air passage in the casing 11 into the driver's seat side inside air passage 18B and the passenger's seat side inside air passage 19B regardless of an angle of the inside air suction side partitioning member 40B.

In the present embodiment, the blower fan 121A (first blower fan) of the outside air blower 12A suctions the air from the driver's seat side outside air passage 18A and the passenger's seat side outside air passage 19A and blows out the air, and the blower fan 121B (second blower fan) of the inside air blower 12B suctions the air from the driver's seat side inside air passage 18B and the passenger's seat side inside air passage 19B and blows out the air.

According to the above configuration, an inside and outside air two-layer unit for blowing out the inside air and the outside air into a vehicle interior, separately can be realized. In other words, since the inside air is circulated underfoot, an inside air rate is increased to reduce a ventilation loss and improve a heating efficiency. Since the outside air is blown toward an upper layer of the interior, a vehicle windshield can be prevented from being fogged.

Moreover, as in the above embodiments, the air flow blown toward the driver's seat side and the air flow blown toward the passenger's seat side can be restrained from being mixed together.

In the present embodiment, the blower fan 121A of the outside air blower 12A is disposed on a lateral side of the driver's seat side outside air passage 18A and the passenger's seat side outside air passage 19A.

According to the above configuration, the air flowing in the driver's seat side outside air passage 18A and the passenger's seat side outside air passage 19A is bent in the suction port of the blower fan 121A substantially at a right angle, and thereafter blown toward a radially outer side of the blower fan 121A.

For that reason, as indicated by bold solid arrows in FIG. 19, the air flow bent (turned) toward an upstream direction (left direction in FIG. 19) of the driver's seat side outside air passage 18A and the passenger's seat side outside air passage 19A substantially at 180°, and the air flow bent in a crank shape toward a downstream direction (right direction in FIG. 19) of the driver's seat side outside air passage 18A and the passenger's seat side outside air passage 19A can be produced.

Because a flow rate of the U-turned air flow decreases as compared with the air flow bent in the crank shape, a time during which the air flow stays in the interior of the blower fan 121A becomes longer, and further a rotation angle of the blower fan 121A since the air is suctioned until the air is blown out becomes larger.

Figure 22:
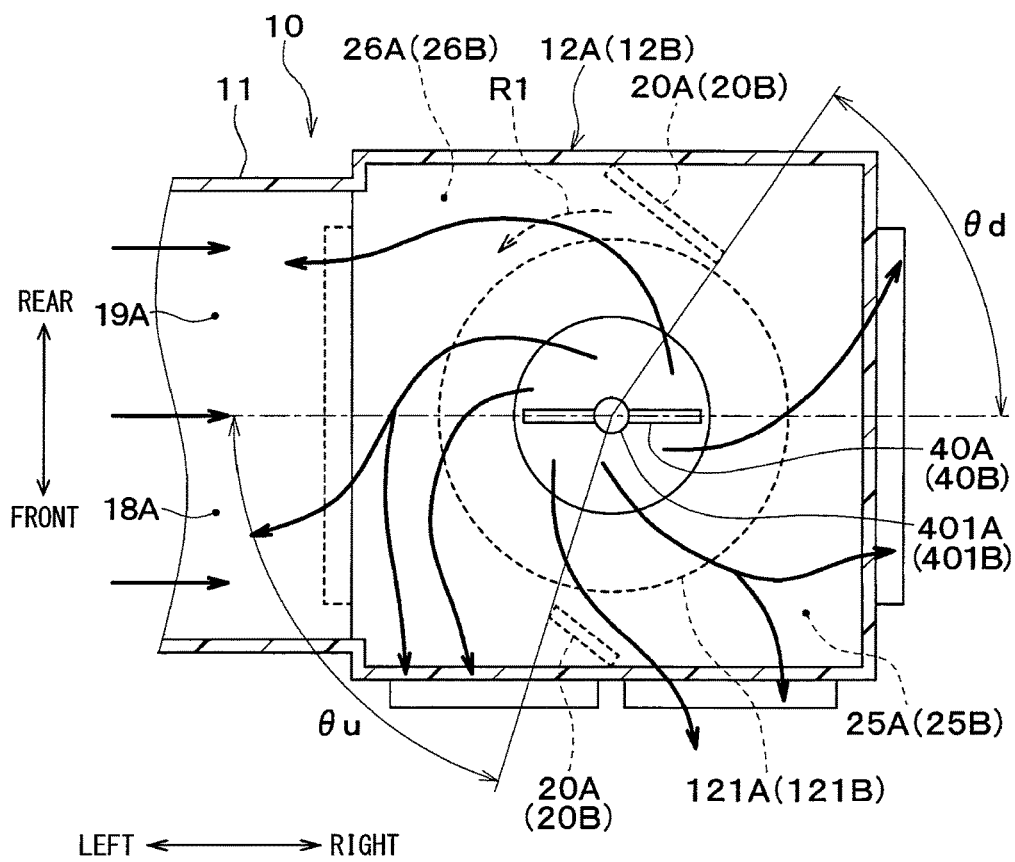
FIG. 22 is a schematic cross-sectional view illustrating an arrangement example of a suction side partitioning member and a blowing side partitioning member according to the tenth embodiment.

Therefore, as illustrated in FIG. 22, if an upstream side relative angle $\theta u$ is larger than a downstream side relative angle $\theta d$, the air flow from the driver's seat side outside air passage 18A and the air flow from the passenger's seat side outside air passage 19A can be excellently restrained from being mixed together.

The upstream side relative angle $\theta u$ is an angle from a portion of the suction side partitioning member 40A, which is located on an upstream side (left side in FIG. 22) of the driver's seat side outside air passage 18A and the passenger's seat side outside air passage 19A to the blowing side partitioning members 20A in the fan rotation direction R1. In other words, the upstream side relative angle $\theta u$ is an angle from a straight line extending from the rotation shaft of the blower fan 121A toward the air flow upstream side along the suction side partitioning member 40A to an upstream end of the blowing side partitioning members 20A in the fan rotation direction R1.

The downstream side relative angle $\theta d$ is an angle from a portion of the suction side partitioning member 40A which is located on a downstream side (right side in FIG. 22) of the driver's seat side outside air passage 18A and the passenger's seat side outside air passage 19A to the blowing side partitioning members 20A in the rotation direction R1. In other words, the downstream side relative angle $\theta d$ is an angle from a straight line extending from the rotation shaft of the blower fan 121A toward the air flow downstream side along the suction side partitioning member 40A to a downstream end of the blowing side partitioning members 20A in the fan rotation direction R1.

Similarly, on the inside air blower 12B side, the blower fan 121B of the inside air blower 12B is disposed on a lateral side of the driver's seat side inside air passage 18B and the passenger's seat side inside air passage 19B. Therefore, as indicated by bold solid arrows in FIG. 19, the air flow bent by substantially 180° and U-turned toward an upstream direction (left direction in FIG. 19) of the driver's seat side inside air passage 18B and the passenger's seat side inside air passage 19B, and the air flow bent in a crank shape toward a downstream direction (right direction in FIG. 19) of the driver's seat side inside air passage 18B and the passenger's seat side inside air passage 19B can be produced.

Therefore, if the upstream side relative angle $\theta u$ is larger than the downstream side relative angle $\theta d$, the air flow from the driver's seat side inside air passage 18B and the air flow from the passenger's seat side inside air passage 19B can be excellently restrained from being mixed together.

The upstream side relative angle $\theta u$ is an angle from a portion of the suction side partitioning member 40B on an upstream side (left side in FIG. 22) of the driver's seat side inside air passage 18B and the passenger's seat side inside air passage 19B to the blowing side partitioning members 20B in the fan rotation direction R1.

The downstream side relative angle $\theta d$ is an angle from a portion of the suction side partitioning member 40B on a downstream side (right side in FIG. 22) of the driver's seat side inside air passage 18B and the passenger's seat side inside air passage 19B to the blowing side partitioning members 20B in the fan rotation direction R1.

Since a flow velocity difference occurs between the U-turned air flow and the air flow bent in the crank shape, a difference also occurs between the flow velocities hit on the respective blowing side partitioning members 20A (20B). For that reason, a blade passing frequency sound (BPF sound) generated by hitting the air blown from the blower fan 121A (121B) on the respective blowing side partitioning members 20 can be reduced.

Figure 23:
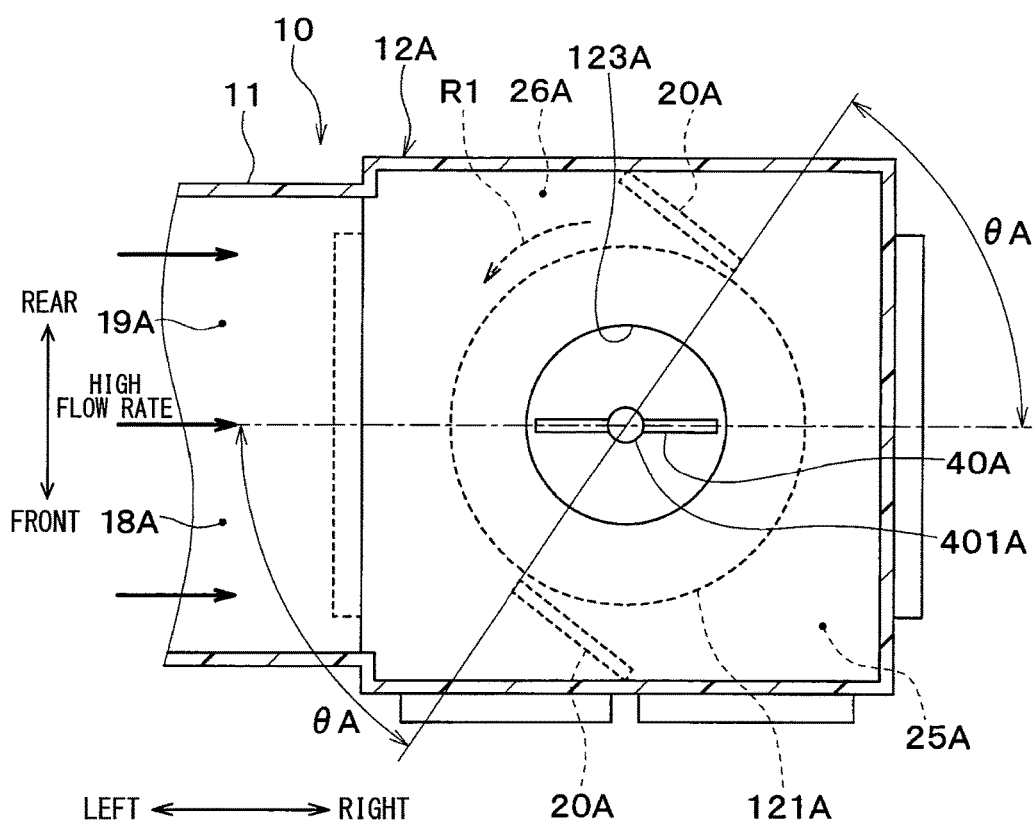
FIG. 23 is a schematic cross-sectional view illustrating an arrangement example of an outside air suction side partitioning member and an outside air blowing side partitioning member according to a modification example of the tenth embodiment.
Figure 24:
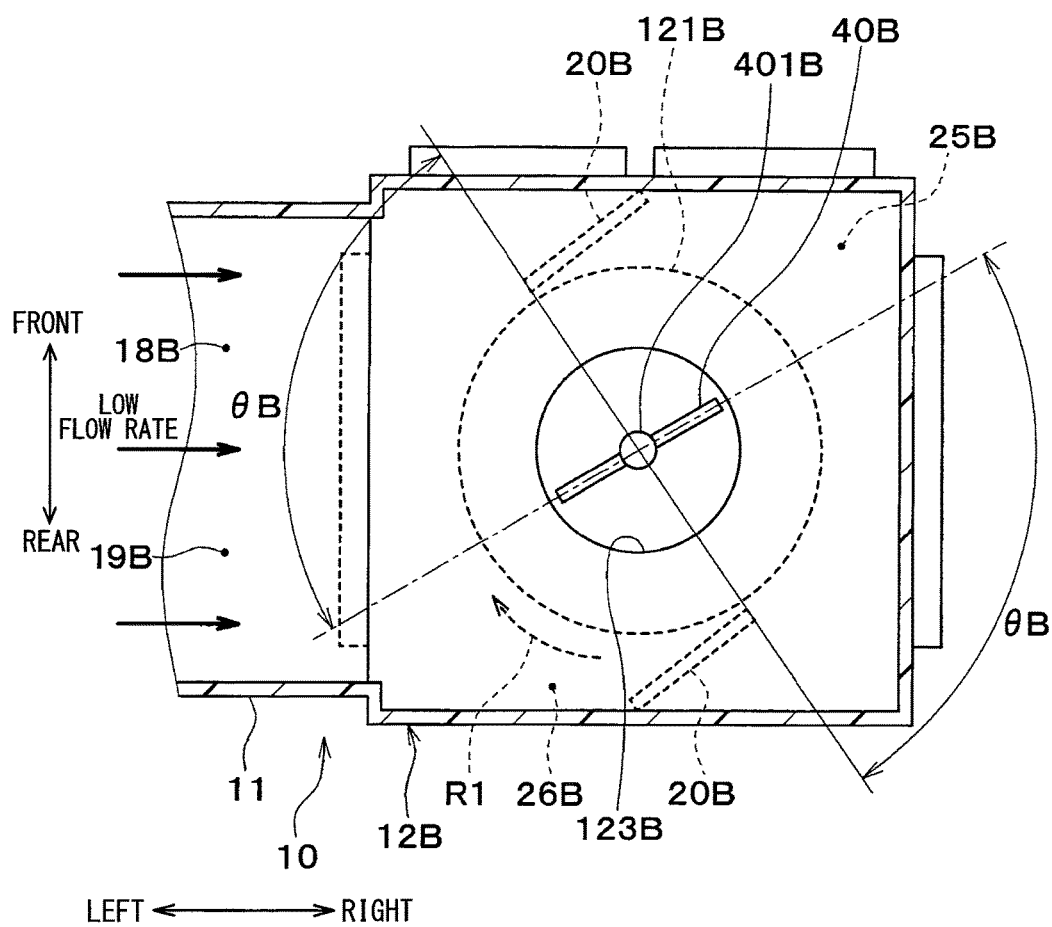
FIG. 24 is a schematic cross-sectional view illustrating an arrangement example of an inside air suction side partitioning member and an inside air blowing side partitioning member according to a modification example of the tenth embodiment.

In a modification of the present embodiment, the blower fan 121A of the outside air blower 12A and the blower fan 121B of the inside air blower 12B may be rotationally driven in electric or mechanical synchronization with each other. When the modification is employed, as illustrated in FIGS. 23 and 24, if a relative angle θA between the outside air suction side partitioning member 40A (first suction side partitioning member) and the outside air blowing side partitioning members 20A (first blowing side partitioning member) in the outside air blower 12A is different from a relative angle θB between the inside air suction side partitioning member 40B (second suction side partitioning member) and the inside air blowing side partitioning members 20B (second blowing side partitioning member) in the inside air blower 12B, the mixture of multiple air flows blown from the blower fan 121A and the blower fan 121B can be excellently restrained on the outside air blower 12A side and the inside air blower 12B side, respectively.

The reason will be described below. In the present embodiment, the pressure loss in the outside air passages 18A, 19A, 25A, 26A, 27A, and 28A (first air passage) in which the blower fan 121A of the outside air blower 12A suctions and blows out the air is different from the pressure loss in the inside air passages 18B, 19B, 25B, 26B, 27B, and 28B (second air passage) in which the blower fan 121B of the inside air blower 12B suctions and blows out the air.

For that reason, since a flow velocity of the air flowing into the blower fan 121A of the outside air blower 12A is different from a flow velocity of the air flowing into the blower fan 121B of the inside air blower 12B, a time during which the air stays in the interior of the blower fan 121A of the outside air blower 12A is different from a time during which the air stays in the interior of the blower fan 121B of the inside air blower 12B.

As a result, a rotation angle of the blower fan 121A of the outside air blower 12A since the air is suctioned until the air is blown out is different from a rotation angle of the blower fan 121B of the inside air blower 12B since the air is suctioned until the air is blown out.

Therefore, when the blower fan 121A of the outside air blower 12A and the blower fan 121B of the inside air blower 12B are rotationally driven in synchronization with each other, if the relative angle θA between the outside air suction side partitioning member 40A and the outside air blowing side partitioning members 20A is different from the relative angle θB between the inside air suction side partitioning member 40B and the inside air blowing side partitioning members 20B, the mixture of multiple air flows blown from the blower fan 121A and the blower fan 121B can be excellently restrained on the outside air blower 12A side and the inside air blower 12B side, respectively.

Specifically, the relative angle between the suction side partitioning member and the inside air blowing side partitioning member in the blower on a side where the pressure loss is larger and the flow velocity is smaller may be larger than the relative angle between the suction side partitioning member and the inside air blowing side partitioning member in the blower on a side where the pressure loss is smaller and the flow velocity is larger. For example, as illustrated in FIGS. 23 and 24, when the pressure loss in the inside air passages 18B, 19B, 25B, 26B, 27B, and 28B is larger than the pressure loss in the outside air passages 18A, 19A, 25A, 26A, 27A, and 28A, the flow velocity of the air flowing into the blower fan 121B of the inside air blower 12B becomes smaller than the flow velocity of the air flowing into the blower fan 121A of the outside air blower 12A. In that case, the relative angle θB between the inside air suction side partitioning member 40B and the inside air blowing side partitioning members 20B becomes larger than the relative angle θA between the outside air suction side partitioning member 40A and the outside air blowing side partitioning members 20A.

In the respective drawings illustrating the present embodiment, the respective directions of up, down, front, rear, right, and left are an example, and the respective directions of the up, down, front, rear, right, and left can be appropriately changed. For example, the driver's seat side air passages 18A and 18B, and the passenger's seat side air passages 19A and 19B may be disposed back to front.

In the above-mentioned example, the driver's seat side air passages 18A and 18B, and the passenger's seat side air passages 19A and 19B may be arranged in a longitudinal direction of the vehicle. Alternatively, the driver's seat side air passages 18A and 18B, and the passenger's seat side air passages 19A and 19B may be arranged in a lateral direction of the vehicle, or in a vertical direction of the vehicle.

In the above-described example, the outside air passages 18A and 19A, and the inside air passages 18B and 19B are arranged in the vertical direction of the vehicle. Alternatively, the outside air passages 18A and 19A, and the inside air passages 18B and 19B may be arranged in the longitudinal direction of the vehicle or in the lateral direction of the vehicle.

In the above-mentioned example, the respective passages 18A, 18B, 19A, and 19B are extended in a horizontal direction. Alternatively, the respective passages 18A, 18B, 19A, and 19B may be extended in the vertical direction of the vehicle.

In the above-mentioned example, an electric motor 122A of the outside air blower 12A and an electric motor 122B of the inside air blower 12B are disposed outside of the casing 11. Alternatively, the electric motors 122A and 122B may be disposed in the vicinity of the electric actuators 41A and 41B for the suction side partitioning members 40A and 40B inside of the casing 11, respectively.

In the above-mentioned example, the electric motor 122A of the outside air blower 12A and the electric motor 122B of the inside air blower 12B are different motors independently from each other. Alternatively, the electric motor 122A of the outside air blower 12A and the electric motor 122B of the inside air blower 12B may be configured by a single common motor.

Eleventh Embodiment

Figure 25:
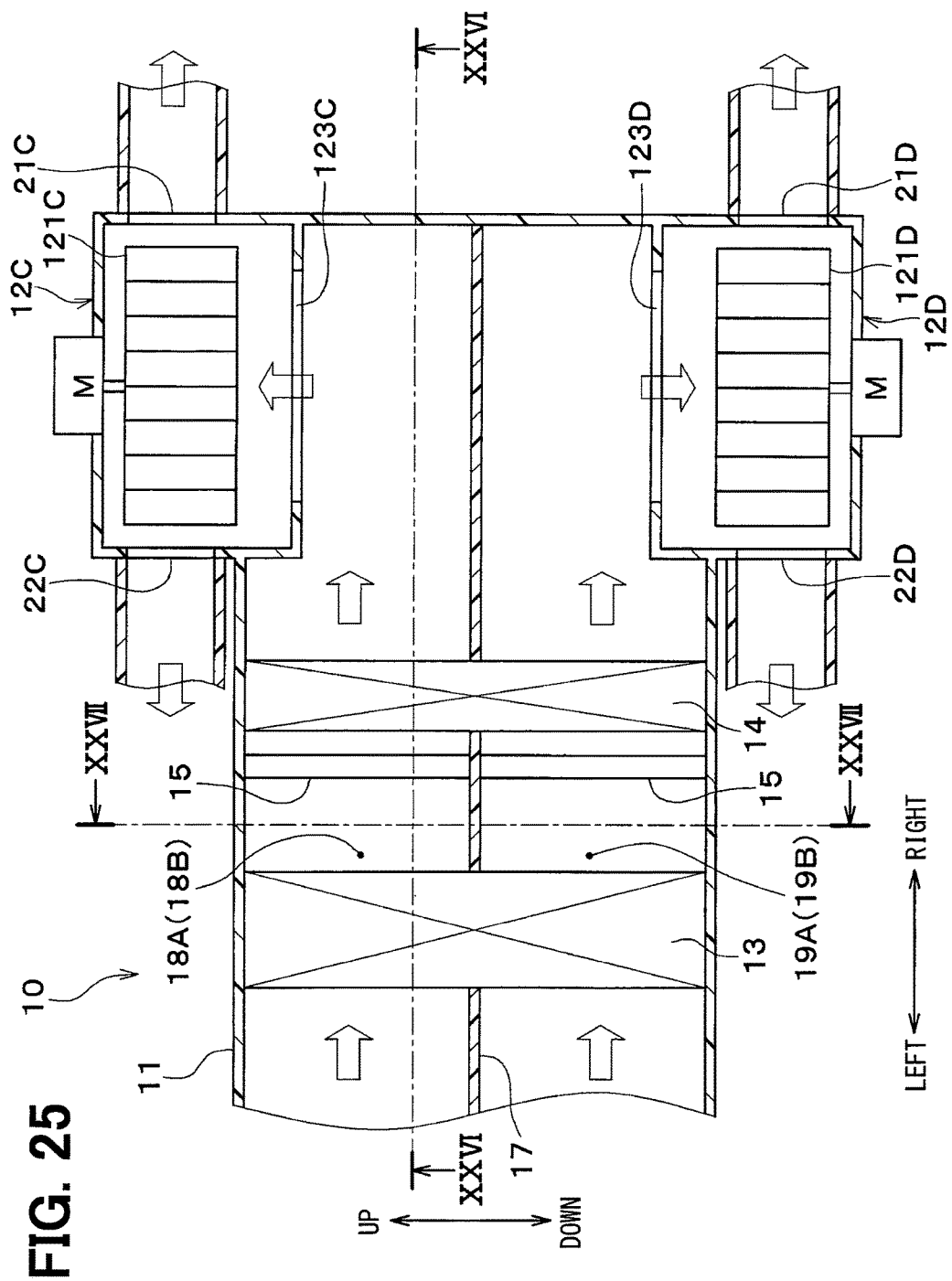
FIG. 25 is a schematic cross-sectional view illustrating a vehicle air conditioning device according to an eleventh embodiment of the present disclosure.
Figure 26:
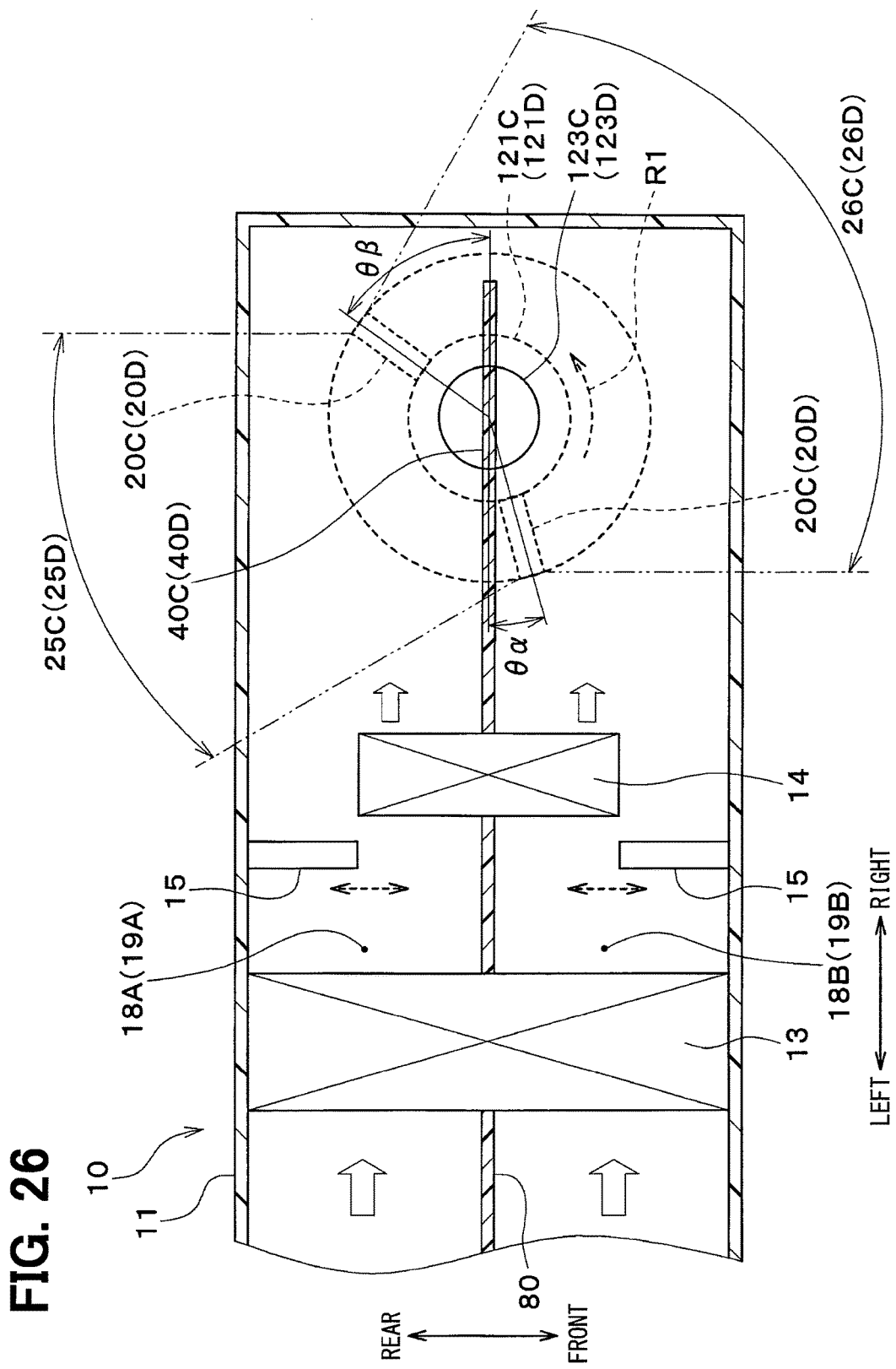
FIG. 26 is a schematic cross-sectional view taken along a line XXVI-XXVI in FIG. 25.
Figure 27:
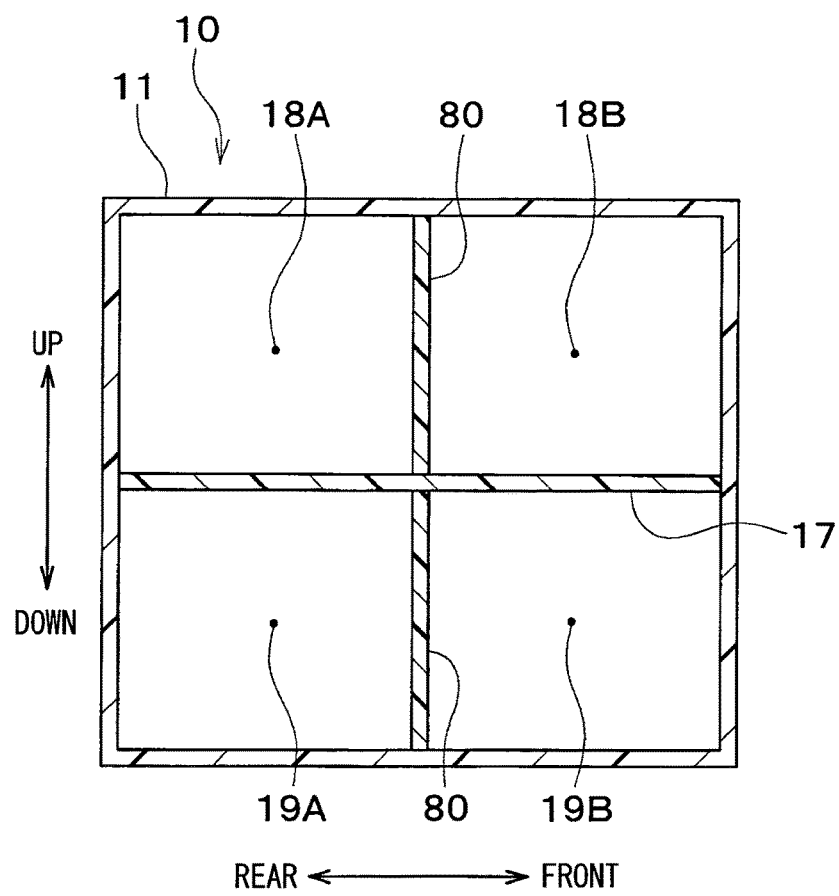
FIG. 27 is a schematic cross-sectional view taken along a line XXVII-XXVII in FIG. 25.

In the above tenth embodiment, the outside air blower 12A is disposed on the air flow downstream side of the driver's seat side outside air passage 18A and the passenger's seat side outside air passage 19A, and the inside air blower 12B is disposed on the air flow downstream side of the driver's seat side inside air passage 18B and the passenger's seat side inside air passage 19B. On the other hand, in the present embodiment, as illustrated in FIGS. 25, 26, and 27, a driver's seat side blower 12C is disposed on an air flow downstream side of a driver's seat side outside air passage 18A and a driver's seat side inside air passage 18B, and a passenger's seat side blower 12D is disposed on an air flow downstream side of a passenger's seat side outside air passage 19A and a passenger's seat side inside air passage 19B.

A basic configuration of the driver's seat side blower 12C and the passenger's seat side blower 12D is identical with that of the outside air blower 12A and the inside air blower 12B in the above tenth embodiment.

The driver's seat side blower 12C is disposed on a lateral side (upper side in FIG. 25) of the driver's seat side outside air passage 18A and the driver's seat side inside air passage 18B. Therefore, a rotation shaft of a blower fan 121C (third blower fan) of the driver's seat side blower 12C is orthogonal to the driver's seat side outside air passage 18A and the driver's seat side inside air passage 18B.

The passenger's seat side blower 12D is disposed on a lateral side (lower side in FIG. 25) of the passenger's seat side outside air passage 19A and the passenger's seat side inside air passage 19B. Therefore, a rotation shaft of a blower fan 121D (fourth blower fan) of the passenger's seat side blower 12D is orthogonal to the passenger's seat side outside air passage 19A and the passenger's seat side inside air passage 19B.

Driver's seat blowing side partitioning members 20C are disposed on a radially outer side of the blower fan 121C of the driver's seat side blower 12C in the casing 11. The driver's seat blowing side partitioning members 20C are each formed into a plate shape extending in a radial direction of the blower fan 121C of the driver's seat side blower 12C. As illustrated in FIG. 26, the driver's seat blowing side partitioning members 20C partition a space in which the air blown from the blower fan 121C flows into a first driver's seat side blowing space 25C and a second driver's seat side blowing space 26C.

Passenger's seat blowing side partitioning members 20D are disposed on a radially outer side of the blower fan 121D of the passenger's seat side blower 12D in the casing 11. The passenger's seat blowing side partitioning members 20D are each formed into a plate shape extending in a radial direction of the blower fan 121D of the passenger's seat side blower 12D. As indicated by reference symbols in parentheses in FIG. 26, the passenger's seat blowing side partitioning members 20D partition a space in which the air blown from the blower fan 121D flows into a first passenger's seat side blowing space 25D and a second passenger's seat side blowing space 26D.

The first driver's seat side blowing space 25C communicates with a driver's seat side face opening portion 22C. The second driver's seat side blowing space 26C communicates with a driver's seat side foot opening portion 21C. The first passenger's seat side blowing space 25D communicates with a passenger's seat side face opening portion 22D. The second passenger's seat side blowing space 26D communicates with a passenger's seat side foot opening portion 21D.

An air suction port 123C of the driver's seat side blower 12C is defined on the air flow upstream side of the blower fan 121C of the driver's seat side blower 12C within the casing 11. A driver's seat suction side partitioning member 40C is disposed in the air suction port 123C.

An air suction port 123D of the passenger's seat side blower 12D is defined on the air flow upstream side of the blower fan 121D of the passenger's seat side blower 12D within the casing 11. A passenger's seat suction side partitioning member 40D is disposed in the air suction port 123D.

The driver's seat suction side partitioning member 40C and the passenger's seat suction side partitioning member 40D are fixed to the casing 11. In this example, the driver's seat suction side partitioning member 40C and the passenger's seat suction side partitioning member 40D are molded integrally with the second partition wall 80.

As with the second partition wall 80, the driver's seat suction side partitioning member 40C partitions the air passage in the casing 11 into the driver's seat side outside air passage 18A and the driver's seat side inside air passage 18B. With the above configuration, the air conditioning wind in the driver's seat side outside air passage 18A and the air conditioning wind in the driver's seat side inside air passage 18B are suctioned into the blower fan 121C of the driver's seat side blower 12C, separately.

In an example of FIG. 26, a gap is defined between the driver's seat suction side partitioning member 40C and a wall surface of the casing 11 on a downstream end (right end in FIG. 26) of the driver's seat side outside air passage 18A and the driver's seat side inside air passage 18B. Even with this gap, since the mixture of the air conditioning wind in the driver's seat side outside air passage 18A and the air conditioning wind in the driver's seat side inside air passage 18B is slight, a practical impact of the gap hardly occurs.

As with the second partition wall 80, the passenger's seat suction side partitioning member 40D partitions the air passage in the casing 11 into the passenger's seat side outside air passage 19A and the passenger's seat side inside air passage 19B. With this configuration, the air conditioning wind in the passenger's seat side outside air passage 19A and the air conditioning wind in the passenger's seat side inside air passage 19B are suctioned into the blower fan 121D of the passenger's seat side blower 12D, separately.

A first angle θα indicated in FIG. 26 is a relative angle between respective portions of the driver's seat suction side partitioning member 40C and the driver's seat blowing side partitioning members 20C, which partition the air flow so as to allow the outside air to flow on a backward side in the rotation direction R1 of the blower fan 121C, and allow the inside air to flow on a forward side in the rotation direction R1. More specifically, the driver's seat suction side partitioning member 40C has a first portion for separating an outside air flow and an inside air flow from each other so that the rotation direction R1 is directed from the outside air flow to the inside air flow. The driver's seat blowing side partitioning member 20C has a first portion for separating an outside air flow and an inside air flow from each other so that the rotation direction R1 is directed from the outside air flow to the inside air flow. The first angle θα is a relative angle between the respective first portions of the driver's seat suction side partitioning member 40C and the driver's seat blowing side partitioning members 20C in the rotation direction R1.

A second angle θβ indicated in FIG. 26 is a relative angle between respective portions of the driver's seat suction side partitioning member 40C and the driver's seat blowing side partitioning members 20C, which partition the air flow so as to allow the inside air to flow on the backward side in the rotation direction R1 of the blower fan 121C, and allow the outside air to flow on the forward side in the rotation direction R1. More specifically, the driver's seat suction side partitioning member 40C has a second portion for separating the inside air flow and the outside air flow from each other so that the rotation direction R1 is directed from the inside air flow to the outside air flow. The driver's seat blowing side partitioning member 20C has a second portion for separating the inside air flow and the outside air flow from each other so that the rotation direction R1 is directed from the inside air flow to the outside air flow. The second angle θβ is a relative angle between the respective second portions of the driver's seat suction side partitioning member 40C and the driver's seat blowing side partitioning members 20C in the rotation direction R1.

The first angle θα is smaller than the second angle θβ. As a result, as compared with a case in which the first angle θα is identical with the second angle θβ, the first driver's seat side blowing space 25C is reduced in the fan rotation direction R1, and the second driver's seat side blowing space 26C is enlarged in the fan rotation direction R1.

Since the first driver's seat side blowing space 25C is reduced in the fan rotation direction R1, the inside air can be restrained from being blown into the first driver's seat side blowing space 25C from the blower fan 121C. For that reason, since the inside air can be restrained from being mixed with the outside air blown toward a vehicle windshield from the first driver's seat side blowing space 25C through a driver's seat side face opening portion 21A and a driver's seat side face duct 27A, the vehicle windshield can be restrained from fogging.

On the other hand, since the second driver's seat side blowing space 26C is enlarged in the fan rotation direction R1, the outside air may be mixed into the second driver's seat side blowing space 26C. However, even if the outside air is mixed into the second driver's seat side blowing space 26C, a heating efficiency is merely slightly reduced, and there is substantially no influence of the outside air.

Likewise, on the passenger's seat side blower 12D side, in the first angle θα and the second angle θβ which are relative angles between the passenger's seat suction side partitioning member 40D and the passenger's seat blowing side partitioning members 20D, the first angle θα is smaller than the second angle θβ.

For that reason, since the first passenger's seat side blowing space 25D is reduced in the fan rotation direction R1, and the second passenger's seat side blowing space 26D is enlarged in the fan rotation direction R1, the inside air can be restrained from being blown into the first passenger's seat side blowing space 25D from the blower fan 121D.

Therefore, even if the driver's seat suction side partitioning member 40C and the passenger's seat suction side partitioning member 40D are fixed to the casing 11, an inside and outside air two-layer mode for blowing the inside air and the outside air into the vehicle interior, separately, can be realized.

Since the driver's seat suction side partitioning member 40C and the passenger's seat suction side partitioning member 40D are fixed to the casing 11, the structure can be simplified as compared with a configuration in which the driver's seat suction side partitioning member 40C and the passenger's seat suction side partitioning member 40D are swingably driven.

In the present embodiment, the inside air flow and the outside air flow are separated from each other by the suction side partitioning member and the blowing side partitioning member. Therefore, as compared with a case in which the air flow on the driver's seat side and the air flow on the passenger's seat side are separated from each other by the suction side partitioning member and the blowing side partitioning member, even if the suction side partitioning member and the suction side partitioning member are fixed to the casing 11, the mixture of multiple air flows is easily suppressed. The reason will be described below.

In a normal inside and outside air mixing mode for mixing the inside air and the outside air together, and blowing the mixture into the vehicle interior, it is preferable to switch five blowing port modes including a face mode, a bi-level mode, a foot mode, a foot defroster mode, and a defroster mode.

The face mode is a blowing port mode for blowing out an air conditioning wind toward an upper body of an occupant. The bi-level mode is a blowing port mode for blowing out the air conditioning wind toward the upper body and feet of the occupant. The foot mode is a blowing port mode for blowing out the air conditioning wind toward the feet of the occupant. The foot defroster mode is a blowing port mode for blowing out the air conditioning wind toward the feet of the occupant and the vehicle windshield. The defroster mode is a blowing port mode for blowing out the air conditioning wind toward the vehicle windshield.

On the contrary, in the inside and outside air two-layer mode, two blowing port modes of the foot mode and the foot defroster mode have only to be switched to each other.

For that reason, in the inside and outside air two-layer mode, as compared with the inside and outside air mixing mode, a variation in the pressure loss caused by switching the blowing port modes is small.

In the inside and outside air mixing mode, a position of the air mix door 15 is adjusted to a wide range of from a maximum cooling position to a maximum heating position whereas in the inside and outside air two-layer mode, the position of the air mix door 15 may be set to the maximum heating position.

For that reason, in the inside and outside air two-layer mode, the variation in the pressure loss caused by the position adjustment of the air mix door 15 is small as compared with the inside and outside air mixing mode.

From the above viewpoint, in the present embodiment, even if the suction side partitioning member and the blowing side partitioning member are fixed to the casing 11, the mixture of the multiple air flows can be easily suppressed.

In the present embodiment, the suction side partitioning member 40C (40D) and the blowing side partitioning members 20C (20D) are fixed to the casing 11. The relative angle θα between the respective first portions of the suction side partitioning member 40C (40D) and the blowing side partitioning members 20C (20D) are smaller than the relative angle θβ between the respective second portions of the suction side partitioning member 40C (40D) and the blowing side partitioning members 20C (20D).

According to the above configuration, as compared with a configuration in which the suction side partitioning member 40C (40D) and the blowing side partitioning members 20C (20D) are swingably driven, the structure can be simplified, and the mixture of the multiple air flows blown from the blower fan 121C (121D) can be excellently suppressed.

In the present embodiment, since the air flow on the driver's seat side and the air flow on the passenger's seat side are surely partitioned by the partition wall 17, and blown by the driver's seat side blower 12C and the passenger's seat side blower 12D, separately, the mixture of the air flow on the driver's seat side and the air flow on the passenger's seat side can be surely prevented.

As a modification of the present embodiment, the partition wall 17 may be eliminated, and only one blower may be disposed. In that configuration, the air passage is not separated into the driver's seat side and the passenger's seat side, and one blower suctions the inside air and the outside air separated by the second partition wall 80, and blows out those airs. Similarly, the configuration can obtain the advantages of the above-mentioned present embodiments.

Twelfth Embodiment

Figure 28:
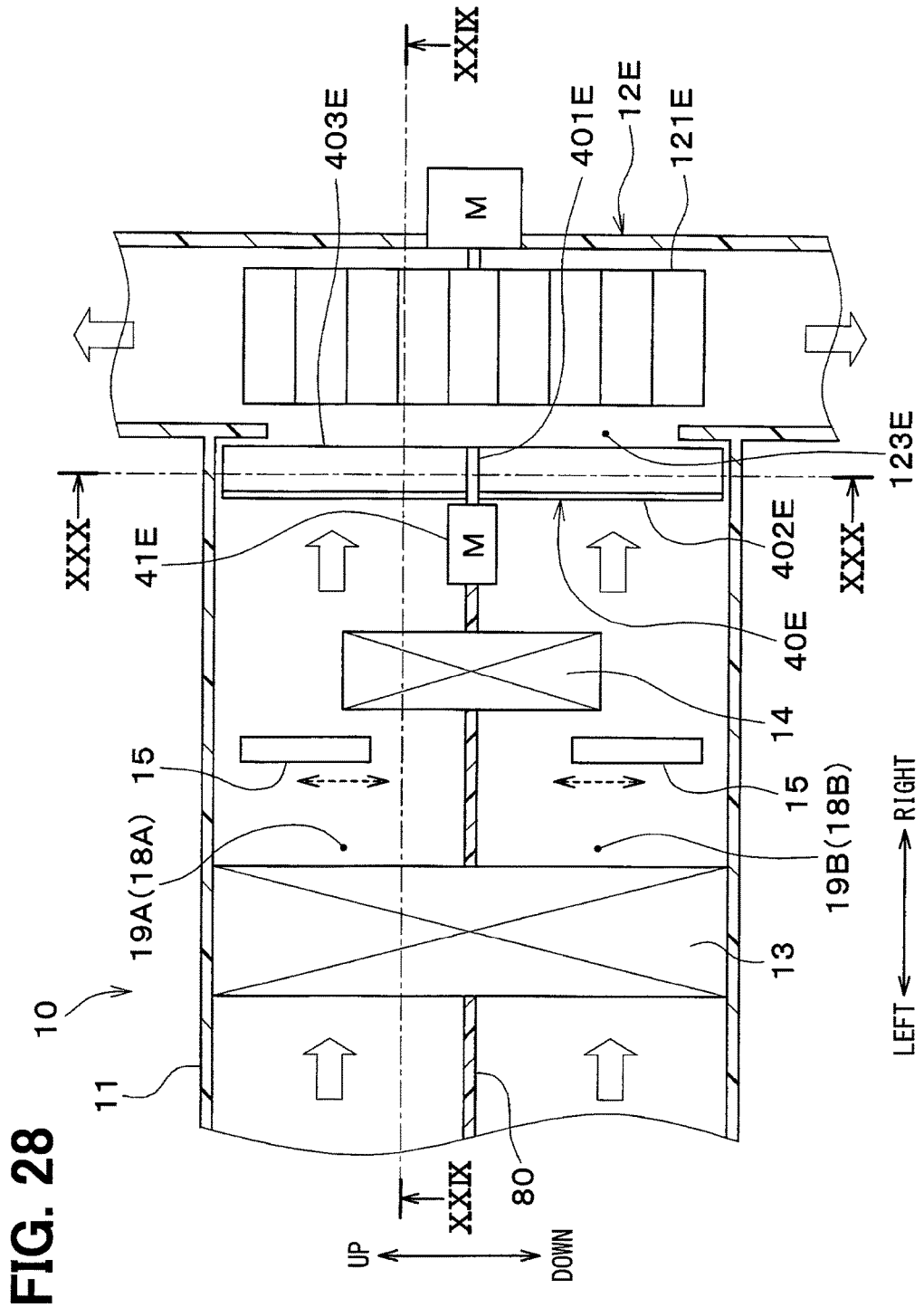
FIG. 28 is a schematic cross-sectional view illustrating a vehicle air conditioning device according to a twelfth embodiment of the present disclosure.
Figure 29:
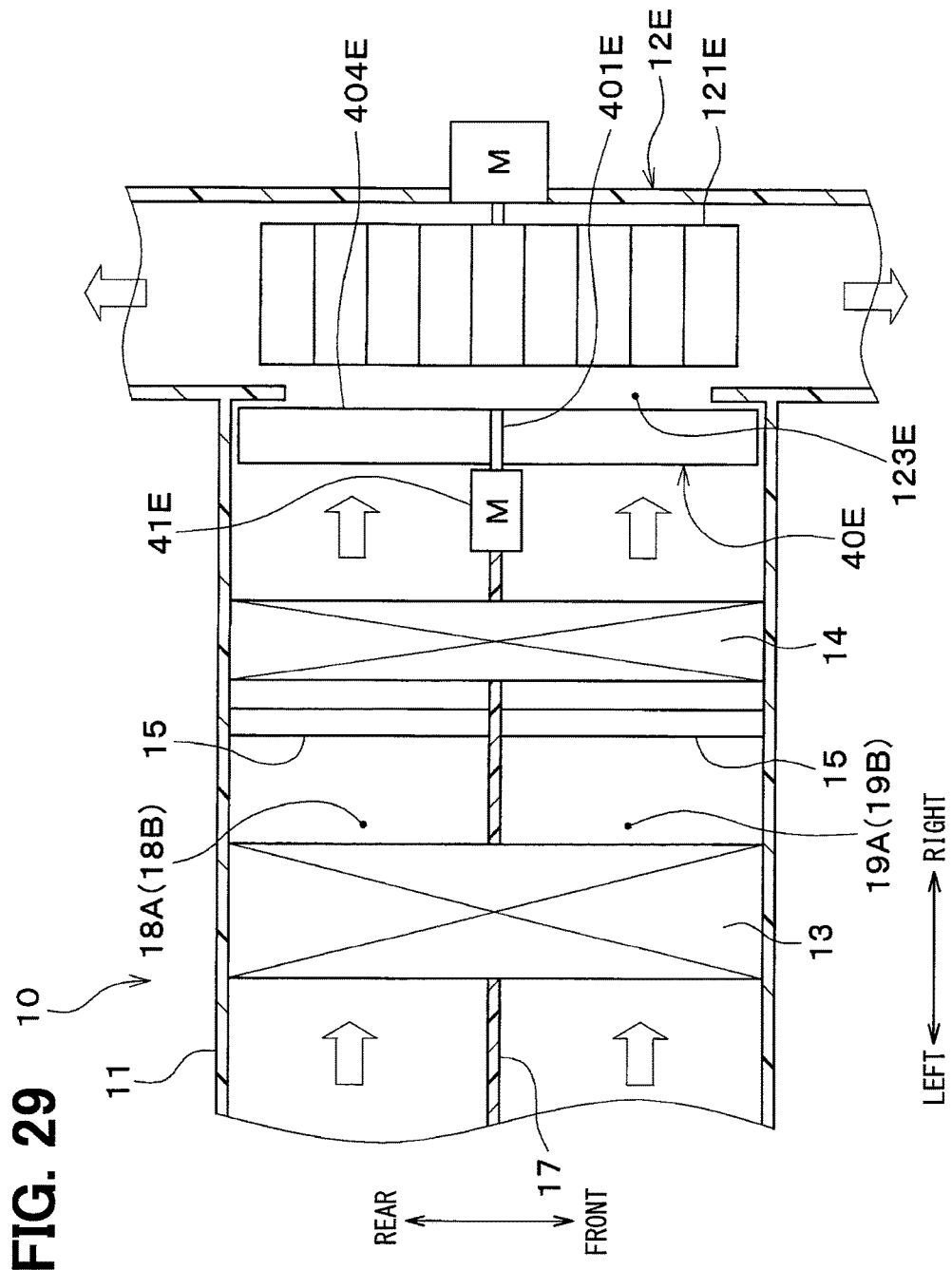
FIG. 29 is a schematic cross-sectional view taken along a line XXIX-XXIX in FIG. 28.

In the above eleventh embodiment, the two blowers 12C and 12D are disposed in the casing 11. On the other hand, in the present embodiment, as illustrated in FIGS. 28 and 29, one blower 12E is disposed in a casing 11.

The blower 12E is disposed on an air flow downstream side of a driver's seat side outside air passage 18A, a driver's seat side inside air passage 18B, a passenger's seat side outside air passage 19A, and a passenger's seat side inside air passage 19B.

The blower 12E is disposed on an end face side (right side in FIGS. 28 and 29) of a driver's seat side outside air passage 18A, a driver's seat side inside air passage 18B, a passenger's seat side outside air passage 19A, and a passenger's seat side inside air passage 19B. Therefore, a rotation shaft of a blower fan 121E (rotary blower fan) of the blower 12E is disposed in parallel to the driver's seat side outside air passage 18A, the driver's seat side inside air passage 18B, the passenger's seat side outside air passage 19A, and the passenger's seat side inside air passage 19B. A basic configuration of the blower 12E is identical with that of the blower 12 in the above eleventh embodiment.

Figure 30:
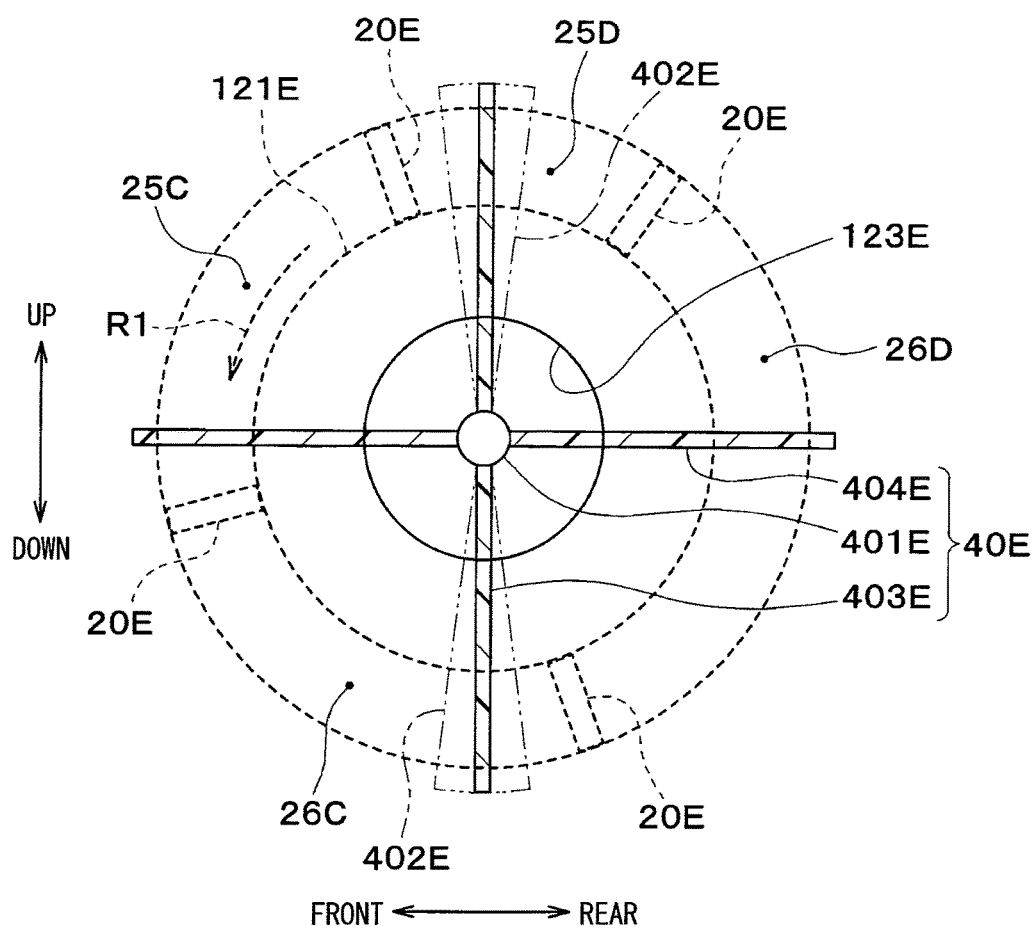
FIG. 30 is a schematic cross-sectional view taken along a line XXX-XXX in FIG. 28.

Blowing side partitioning members 20E are disposed on a radially outer side of the blower fan 121E in the casing 11. The blowing side partitioning members 20E are each formed into a plate shape extending in a radial direction of the blower fan 121E in the blower 12E. As illustrated in FIG. 30, the blowing side partitioning members 20E partition a space in which the air blown from the blower fan 121E flows into a first driver's seat side blowing space 25C, a second driver's seat side blowing space 26C, a first passenger's seat side blowing space 25D, and a second passenger's seat side blowing space 26D.

An air suction port 123E of the blower 12E is defined on an air flow upstream side of the blower fan 121E in the blower 12E in the casing 11. A suction side partitioning member 40E is disposed in the air suction port 123E.

The suction side partitioning member 40E includes a swinging part 403E that is supported to the casing 11 so as to be swingable about a swing shaft 401E, and a fixing portion 404E that is fixed to the casing 11.

The swinging part 403E and the fixing portion 404E are each formed into a plate shape that extends from the rotation shaft of the blower fan 121E in a radial direction of the blower fan 121E, and crosses the air suction port 123E. The swing shaft 401E slides on the fixing portion 404E.

The swing shaft 401E is disposed coaxially with the blower fan 121E, and driven by an electric actuator 41E. The operation of the electric actuator 41E for the suction side partitioning member 40E is controlled according to a control signal output from the air-conditioning control device 50.

A fan-shaped part 402E concentric with the swing shaft 401E is formed on one end of the swinging part 403E of the suction side partitioning member 40E. The fan-shaped part 402E slides on the partition wall 17.

As with the partition wall 17, the swinging part 403E of the suction side partitioning member 40E separates the driver's seat side outside air passage 18A and the passenger's seat side outside air passage 19A from each other, and also separates the driver's seat side inside air passage 18B and the passenger's seat side inside air passage 19B from each other.

As with the second partition wall 80, the fixing portion 404E of the suction side partitioning member 40E separates the driver's seat side outside air passage 18A and the driver's seat side inside air passage 18B from each other, and also separates the passenger's seat side outside air passage 19A and the passenger's seat side inside air passage 19B from each other. With this configuration, the air conditioning wind in the driver's seat side outside air passage 18A, the air conditioning wind in the driver's seat side inside air passage 18B, the air conditioning wind in the passenger's seat side outside air passage 19A, and the air conditioning wind in the passenger's seat side inside air passage 19B are suctioned into the blower fan 121E of the blower 12E, separately.

When the electric actuator 41E drives the swing shaft 401E of the suction side partitioning member 40E, a position of the swinging part 403E of the suction side partitioning member 40E is changed in a circumferential direction of the blower fan 121E. With the above configuration, in the air suction port 123E, a position of a boundary between the air flow in the driver's seat side outside air passage 18A and the air flow in the passenger's seat side outside air passage 19A, and a position of a boundary between the air flow in the driver's seat side inside air passage 18B and the air flow in the passenger's seat side inside air passage 19B are changed in the circumferential direction of the blower fan 121E.

Since the fan-shaped part 402E of the suction side partitioning member 40E slides on the partition wall 17, the driver's seat side outside air passage 18A and the passenger's seat side outside air passage 19A can be separated from each other, and the driver's seat side inside air passage 18B and the passenger's seat side inside air passage 19B can be separated from each other, regardless of an angle of the swinging part 403E of the suction side partitioning member 40E.

In the present embodiment, the blower fan 121E is disposed on an end face side of the driver's seat side outside air passage 18A, the passenger's seat side outside air passage 19A, the driver's seat side inside air passage 18B, and the passenger's seat side inside air passage 19B, and suctions the air from the driver's seat side outside air passage 18A, the passenger's seat side outside air passage 19A, the driver's seat side inside air passage 18B, and the passenger's seat side inside air passage 19B, and blows out the suctioned air.

According to the above configuration, since the air flows straightly into the blower fan 121E from the driver's seat side outside air passage 18A, the passenger's seat side outside air passage 19A, the driver's seat side inside air passage 18B, and the passenger's seat side inside air passage 19B, the pressure loss can be reduced as compared with a case in which the air is bent and flows into the blower fan.

In addition, since the air from the four air passages can be suctioned and blown out by one blower 12E, the configuration can be simplified as compared with a case using two blowers.

Thirteenth Embodiment

Figure 31:
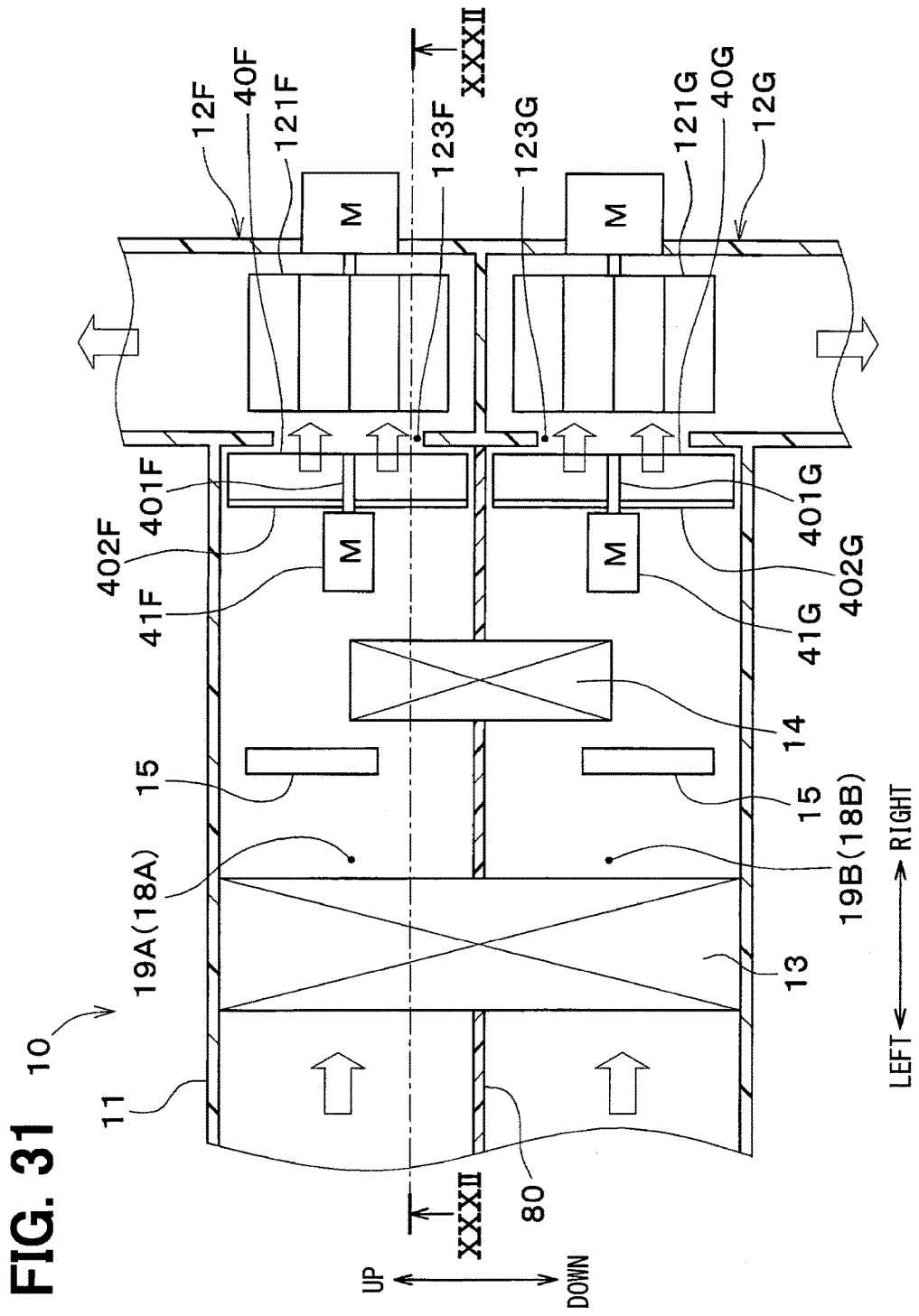
FIG. 31 is a schematic cross-sectional view illustrating a vehicle air conditioning device according to a thirteenth embodiment of the present disclosure.
Figure 32:
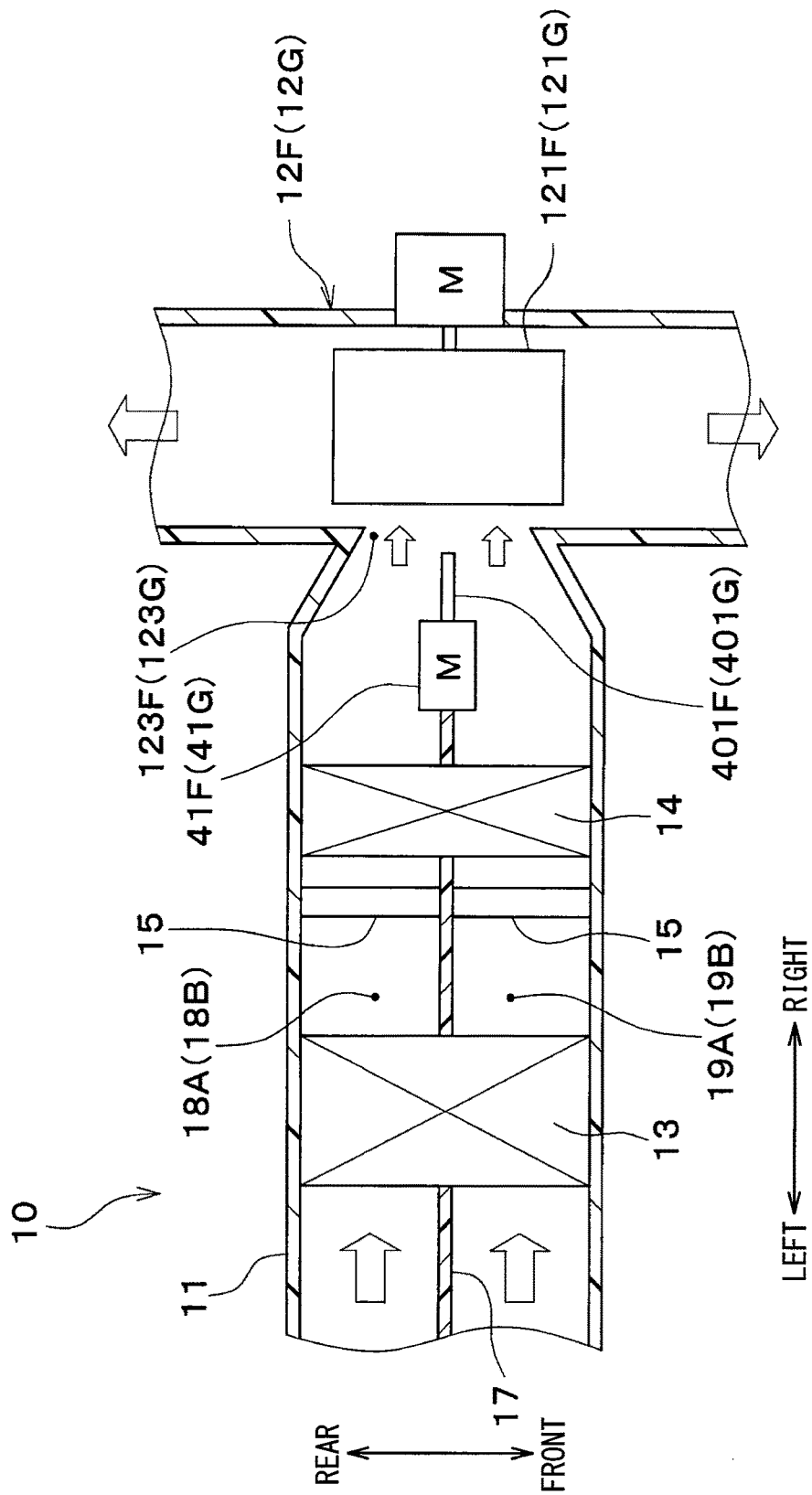
FIG. 32 is a schematic cross-sectional view taken along a line XXXII-XXXII in FIG. 31.

In the above twelfth embodiment, the air conditioning wind in the driver's seat side outside air passage 18A, the air conditioning wind in the driver's seat side inside air passage 18B, the air conditioning wind in the passenger's seat side outside air passage 19A, and the air conditioning wind in the passenger's seat side inside air passage 19B are suctioned into the blower fan 121E of one blower 12E, separately. On the other hand, in the present embodiment, as illustrated in FIGS. 31 and 32, an air conditioning wind in a driver's seat side outside air passage 18A and the air conditioning wind in a passenger's seat side outside air passage 19A are suctioned into a blower fan 121F of an outside air blower 12F, separately, and the air conditioning wind in a driver's seat side inside air passage 18B and the air conditioning wind in a passenger's seat side inside air passage 19B are suctioned into a blower fan 121G of an inside air blower 12G, separately.

The outside air blower 12F is disposed on an end face side (right side in FIGS. 31 and 32) of the driver's seat side outside air passage 18A and the passenger's seat side outside air passage 19A. Therefore, a rotation shaft of the blower fan 121F in the outside air blower 12F is in parallel to the driver's seat side outside air passage 18A and the passenger's seat side outside air passage 19A.

The inside air blower 12G is disposed on an end face side (right side in FIGS. 31 and 32) of the driver's seat side inside air passage 18B and the passenger's seat side inside air passage 19B. Therefore, a rotation shaft of the blower fan 121G in the inside air blower 12G is in parallel to the driver's seat side inside air passage 18B and the passenger's seat side inside air passage 19B.

A basic configuration of the outside air blower 12F and the inside air blower 12G is identical with that of the blower 12E in the above twelfth embodiment.

Outside air blowing side partitioning members (not illustrated) are disposed on a radially outer side of the blower fan 121F of the outside air blower 12F in a casing 11. The outside air blowing side partitioning members are each formed into a plate shape extending in a radial direction of the blower fan 121F of the outside air blower 12F. The outside air blowing side partitioning members partition a space into which the air blown out of the blower fan 121F flows into a first driver's seat side blowing space and a first passenger's seat side blowing space.

Inside air blowing side partitioning members (not illustrated) are disposed on a radially outer side of the blower fan 121G of the inside air blower 12G in the casing 11. The inside air blowing side partitioning members are each formed into a plate shape extending in a radial direction of the blower fan 121G of the inside air blower 12G. The inside air blowing side partitioning members partition a space into which the air blown out of the blower fan 121G flows into a second driver's seat side blowing space and a second passenger's seat side blowing space.

An air suction port 123F of the outside air blower 12F is defined on an air flow upstream side of the blower fan 121F of the outside air blower 12F within the casing 11. An outside air suction side partitioning member 40F is disposed in the air suction port 123F.

The outside air suction side partitioning member 40F is formed into a plate shape that extends from the rotation shaft of the blower fan 121F in the radial direction of the blower fan 121F, and crosses the air suction port 123F, and is supported to the casing 11 so as to be swingable about a swing shaft 401F.

The swing shaft 401F of the outside air suction side partitioning member 40F is disposed coaxially with the blower fan 121F, and driven by an electric actuator 41F. The operation of the electric actuator 41F for the outside air suction side partitioning members 40F is controlled according to a control signal output from an air-conditioning control device 50.

A fan-shaped part 402F concentric with a swing shaft 401F is formed on one end of the outside air suction side partitioning member 40F. The fan-shaped part 402F slides on the partition wall 17.

As with the partition wall 17, the outside air suction side partitioning member 40F partitions an air passage in the casing 11 into the driver's seat side outside air passage 18A and the passenger's seat side outside air passage 19A. With this configuration, the air conditioning wind in the driver's seat side outside air passage 18A and the air conditioning wind in the passenger's seat side outside air passage 19A are suctioned into the blower fan 121F of the outside air blower 12F, separately.

When an electric actuator 41F drives the swing shaft 401F of the outside air suction side partitioning member 40F, a position of the outside air suction side partitioning member 40F is changed in a circumferential direction of the blower fan 121F. As a result, a position of a boundary between the air flow in the driver's seat side outside air passage 18A and the air flow in the passenger's seat side outside air passage 19A is changed in the circumferential direction of the blower fan 121F in the air suction port 123F.

Since the fan-shaped part 402F of the outside air suction side partitioning member 40F slides on the partition wall 17, the outside air suction side partitioning member 40F can partition an air passage in the casing 11 into the driver's seat side outside air passage 18A and the passenger's seat side outside air passage 19A regardless of an angle of the outside air suction side partitioning member 40F.

An air suction port 123G of the inside air blower 12G is defined on an air flow upstream side of the blower fan 121G of the inside air blower 12G within the casing 11. An inside air suction side partitioning member 40G is disposed in the air suction port 123G.

The inside air suction side partitioning member 40G is formed into a plate shape that extends from the rotation shaft of the blower fan 121G in the radial direction of the blower fan 121G, and crosses the air suction port 123G, and is supported to the casing 11 so as to be swingable about a swing shaft 401G.

The swing shaft 401G of the inside air suction side partitioning members 40G is disposed coaxially with the blower fan 121G, and driven by an electric actuator 41G. The operation of the electric actuator 41G for the inside air suction side partitioning members 40G is controlled according to a control signal output from the air-conditioning control device 50.

A fan-shaped part 402G concentric with a swing shaft 401G is formed on one end of the inside air suction side partitioning member 40G. The fan-shaped part 402G slides on the partition wall 17.

As with the partition wall 17, the inside air suction side partitioning member 40G partitions the air passage in the casing 11 into the driver's seat side inside air passage 18B and the passenger's seat side inside air passage 19B. With this configuration, the air conditioning wind in the driver's seat side inside air passage 18B and the air conditioning wind in the passenger's seat side inside air passage 19B are suctioned into the blower fan 121F of the outside air blower 12F, separately.

When an electric actuator 41G drives the swing shaft 401G of the inside air suction side partitioning member 40G, a position of the inside air suction side partitioning member 40G is changed in a circumferential direction of the blower fan 121G. As a result, a position of a boundary between the air flow in the driver's seat side inside air passage 18B and the air flow in the passenger's seat side inside air passage 19B is changed in the circumferential direction of the blower fan 121G in the air suction port 123G.

Since the fan-shaped part 402G of the inside air suction side partitioning member 40G slides on the partition wall 17, the inside air suction side partitioning member 40G can partition an air passage in the casing 11 into the driver's seat side inside air passage 18B and the passenger's seat side inside inside air passage 19B regardless of an angle of the inside air suction side partitioning member 40G.

In the present embodiment, the blower fan 121F (first blower fan) of the outside air blower 12F is disposed on an end face side of the driver's seat side outside air passage 18A and the passenger's seat side outside air passage 19A. The blower fan 121G (second blower fan) of the inside air blower 12G is disposed on an end face side of the driver's seat side inside air passage 18B and the passenger's seat side inside air passage 19B.

According to the above configuration, since the air flows straightly into the blower fan 121F of the outside air blower 12F from the driver's seat side outside air passage 18A, and the passenger's seat side outside air passage 19A, and the air flows straightly into the blower fan 121G of the inside air blower 12G from the driver's seat side inside air passage 18B and the passenger's seat side inside air passage 19B, the pressure loss can be reduced as compared with a case in which the air is bent and flows into the blower fan.

In addition, since the respective two blowers 12F and 12G suction the air from two air passages and blow out the suctioned air, separately, the blower fans of the blowers can be reduced in size as compared with a case in which the air from the four air passages is suctioned and blown out by one blower, separately.

Fourteenth Embodiment

In the above first embodiment, the blowing side partitioning members 20 that separate the first blowing space 25 and the second blowing space 26 from each other are arranged at regular angular intervals in the rotation direction R1. On the other hand, in the present embodiment, for the purpose of reducing a blade passing frequency sound, blowing side partitioning members 20 are arranged at irregular angular intervals in a fan rotation direction R1.

Figure 33:
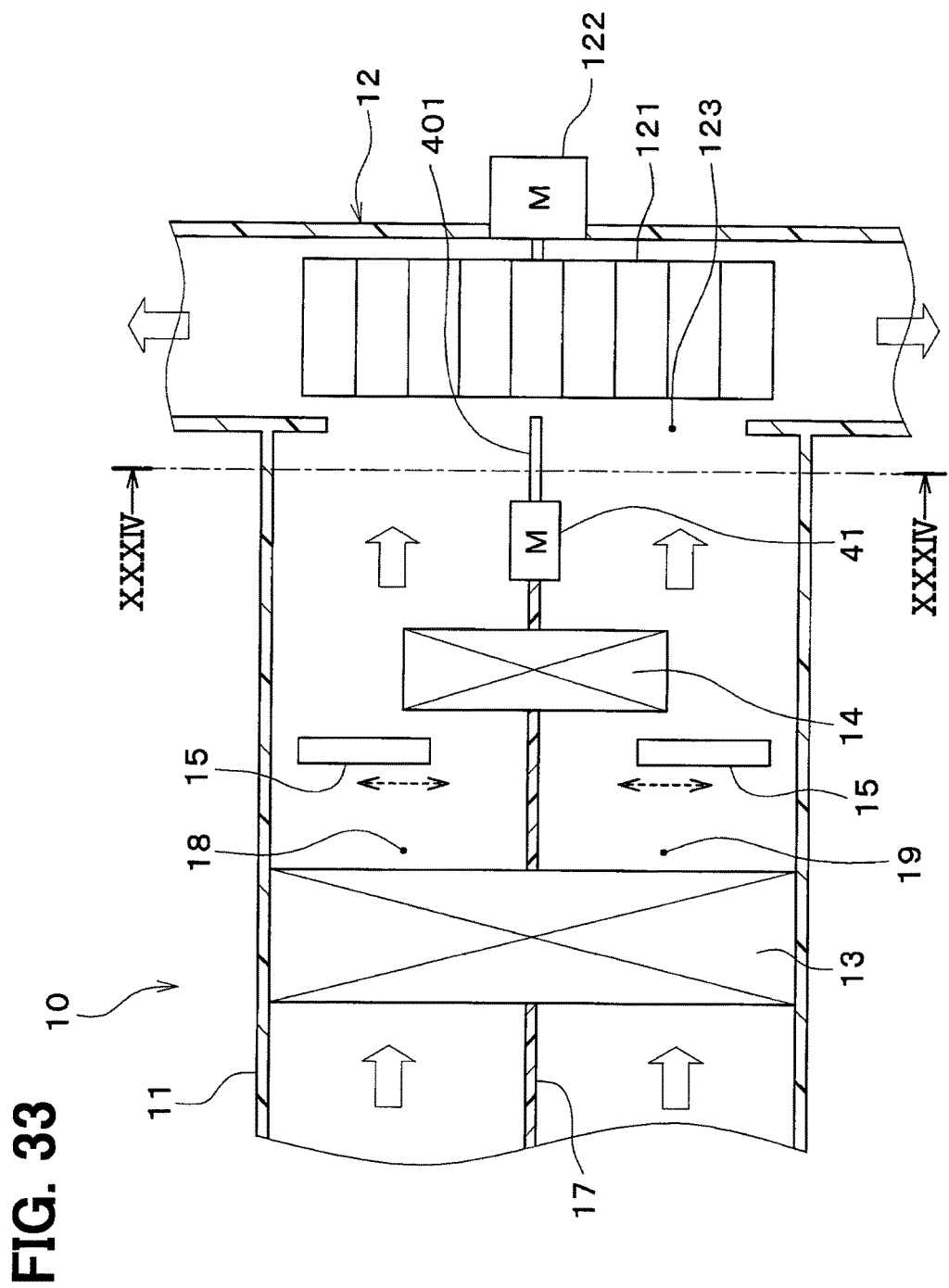
FIG. 33 is a schematic cross-sectional view illustrating a vehicle air conditioning device according to a fourteenth embodiment of the present disclosure.

In the present embodiment, as illustrated in FIG. 33, a blower 12 is disposed on an end face side (right side in FIG. 33) of a first air passage 18 and a second air passage 19. Therefore, a rotation shaft of a blower fan 121 in the blower 12 is in parallel to the first air passage 18 and the second air passage 19.

Figure 34:
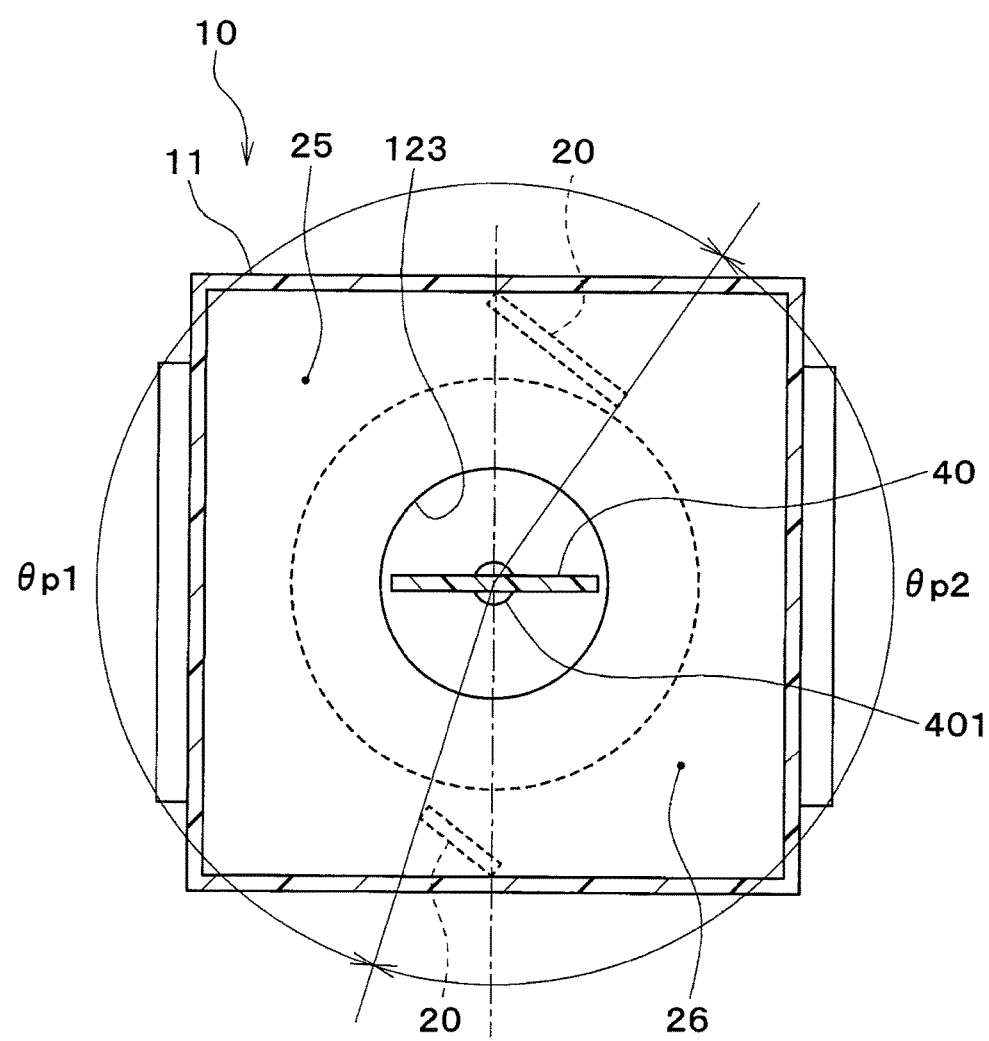
FIG. 34 is a schematic cross-sectional view taken along a line XXXIV-XXXIV in FIG. 33.

In an example of FIG. 34, since two of the blowing side partitioning members 20 are provided, angular intervals $\theta p1$ and $\theta p2$ of the respective blowing side partitioning members 20 are set to angles other than 180 degrees. For example, when three of the blowing side partitioning members 20 are provided, the angular intervals of the respective blowing side partitioning members 20 may be set to angles other than 120 degrees.

With the above configuration, since a phase of the respective blade passing frequency sounds generated by hitting the air blown from the blower fan 121 on the blowing side partitioning members 20 can be deviated, the blade passing frequency sound can be reduced.

The aforementioned embodiments can be properly combined together. For example, the aforementioned embodiments can be modified in various forms as described below.

In the above embodiment, the casing 11 is provided with the driver's seat side center opening portion 21, the driver's seat side side opening portion 22, the passenger's seat side center opening portion 23, and the passenger's seat side side opening portion 24. However, the present invention is not limited to this configuration, and multiple opening portions may be provided in the casing 11. For example, a foot opening portion for blowing out the air conditioning wind toward the feet of the occupant, and a defroster opening portion for blowing out the air conditioning wind toward all window glasses of a vehicle may be provided.

In the above embodiments, the angle $\theta$ defined between the suction side partitioning members 40 and the blowing side partitioning members 20 is changed according to the blowing port mode. However, the present invention is not limited to this configuration, and the angle $\theta$ may be changed according to the pressure loss of the overall air passages in the air conditioning device.

For example, the angle $\theta$ may be changed according to an opening (opening adjusted by a louver) of the blowing ports of the respective blowing ducts 27, 28, 29, and 30.

When a blowing rate (in other words, rotation speed of the electric motor 122) caused by the blower fan 121 is changed to change the pressure loss, since an angle by which the blower fan 121 rotates since the blower fan 121 suctions the air until the blower fan 121 blows out the air is not changed, there is no need to change the angle $\theta$.

In the above sixth embodiment, the blowing side partitioning members 20 move (swing) to switch between the partition state and the low resistance state. However, the present invention is not limited to this configuration. For example, a shape of the blowing side partitioning members 20 may be deformed to switch between the partition state and the low resistance state.

The above respective embodiments merely show configuration examples of the air conditioning device according to the present disclosure. The present disclosure can be extensively applied to a variety of air conditioning devices in which multiple air passages are defined in the case. For example, the present disclosure is not limited to a vehicle air conditioning device and can be applied to an air conditioning device of a stationary type.

In the above eighth and ninth embodiments, the suction side partitioning members 66 are each formed into a plate shape. Alternatively, the suction side partitioning members 66 may be each formed into a curved plate shape.

In the above eighth and ninth embodiments, the air passage in the casing 11 is partitioned into the three air passages 18, 19, and 65, but may be partitioned into two, or four or more air passages.

What is claimed is:

1. An air conditioning device, comprising:
a casing including a plurality of air passages;
a rotary blower fan that is disposed in the casing, suctions air from the plurality of air passages, and blows out the air;
a suction side partitioning member that is disposed on a suction side of the rotary blower fan in the casing, and separates air flows from the plurality of air passages from each other; and
a blowing side partitioning member that is disposed on a blowing side of the rotary blower fan in the casing, and separates the air flows from the plurality of air passages from each other, wherein
a position of the blowing side partitioning member is deviated from a position of the suction side partitioning member in a rotation direction of the rotary blower fan,
the rotary blower fan is a centrifugal fan that includes a rotation shaft and a plurality of blades disposed around the rotation shaft, suctions the air from a radially inner side, and blows out the air toward a radially outer side,
the suction side partitioning member partitions a space located on the suction side of the rotary blower fan into a plurality of suction spaces corresponding to the plurality of air passages, the blowing side partitioning member partitions a space located on the blowing side of the rotary blower fan into a plurality of blowing spaces corresponding to the plurality of air passages, and spaces of the plurality of suction spaces and spaces of the plurality of blowing spaces, which correspond to each other, are deviated from each other in the rotation direction of the rotary blower fan.

2. The air conditioning device according to claim 1, further comprising an actuating device that moves at least one of the suction side partitioning member and the blowing side partitioning member to change a deviation between the position of the suction side partitioning member and the position of the blowing side partitioning member in the rotation direction of the rotary blower fan.

3. The air conditioning device according to claim 2, further comprising a blowing duct that is connected to the casing and includes a blowing air passage which sends the air flows from the plurality of air passages to a space to be air-conditioned, separately, wherein the actuating device increases the deviation between the position of the suction side partitioning member and the position of the blowing side partitioning member in the rotation direction of the rotary blower fan with increase in pressure loss of the air flows in the casing and the blowing duct.

4. The air conditioning device according to claim 3, wherein the casing is provided with a plurality of opening portions that communicate with the blowing air passage, and the suction side partitioning member and the blowing side partitioning member separate the air flow for each of the plurality of opening portions.

5. The air conditioning device according to claim 4, wherein the blowing air passage includes a first blowing air passage that communicates with one of the plurality of opening portions, and a second blowing air passage that communicates with another of the plurality of opening portions, a pressure loss of the air flow in the second blowing air passage is larger than a pressure loss of the air flow in the first blowing air passage, the suction side partitioning member and the blowing side partitioning member separate a first space in which the air flows toward the one opening from a second opening in which the air flows toward the other opening, and the second space is larger than the first space in the rotation direction of the rotary blower fan.

6. The air conditioning device according to claim 4, wherein the blowing side partitioning member is switchable between a partition state in which an air flow directed to one of the plurality of opening portions is separated, and a low resistance state in which a resistance against an air flow directed toward another of the plurality of opening portions becomes low as compared with the partition state, and the air conditioning device further comprising:

an opening and closing device that opens and closes the one opening; and a switching device that switches the blowing side partitioning member to be in the low resistance state when the opening and closing device closes the one opening.

7. The air conditioning device according to claim 1, wherein the rotary blower fan is disposed on a lateral side of the plurality of air passages, and an angle from a portion of the suction side partitioning member located on an upstream side in the plurality of air passages to the blowing side partitioning member in the rotation direction of the rotary blower fan is larger than an angle from a portion of the suction side partitioning member located on the downstream side in the plurality of air passages to the blowing side partitioning member in the rotation direction of the rotary blower fan.

8. The air conditioning device according to claim 1, further comprising a blowing duct that is connected to the casing, and defines a blowing air passage for blowing out the air flows from the plurality of air passages into the space to be air-conditioned, separately from each other, wherein the rotary blower fan includes a first blower fan and a second blower fan which are rotationally driven in synchronization with each other, the casing and the blowing duct include a first air passage in which the first blower fan suctions and blows out the air, and a second air passage in which the second blower fan suctions and blows out the air, a pressure loss in the first air passage and a pressure loss in the second air passage are different from each other, the suction side partitioning member includes a first suction side partitioning member disposed on a suction side of the first blower fan, and a second suction side partitioning member disposed on a suction side of the second blower fan, the blowing side partitioning member includes a first blowing side partitioning member disposed on a blowing side of the first blower fan and a second blowing side partitioning member disposed on a blowing side of the second blower fan, and a relative angle between the first suction side partitioning member and the first blowing side partitioning member is different from a relative angle between the second suction side partitioning member and the second blowing side partitioning member.

9. The air conditioning device according to claim 1, wherein the plurality of air passages includes a driver's seat side outside air passage in which an outside air to be blown out toward a driver's seat side flows, a passenger's seat side outside air passage in which the outside air to be blown out toward a passenger's seat side flows, a driver's seat side inside air passage in which an inside air to be blown out toward the driver's seat side flows, and a passenger's seat side inside air passage in which the inside air to be blown out toward the passenger's seat side flows, and the rotary blower fan includes a first blower fan that suctions the air from the driver's seat side outside air passage and the passenger's seat side outside air passage and blows out the air, and a second blower fan that suctions the air from the driver's seat side inside air passage and the passenger's seat side inside air passage and blows out the air.

10. The air conditioning device according to claim 9, wherein the first blower fan is a centrifugal fan that includes a rotation shaft and a plurality of blades disposed around the rotation shaft, suctions the air from a radially inner side, and blows out the air toward a radially outer side, the second blower fan is a centrifugal fan that includes a rotation shaft and a plurality of blades disposed around the rotation shaft, suctions the air from a radially inner side, and blows out the air toward a radially outer side, the first blower fan is disposed on lateral sides of the driver's seat side outside air passage and the passenger's seat side outside air passage, and the second blower fan is disposed on lateral sides of the driver's seat side inside air passage and the passenger's seat side inside air passage.

11. The air conditioning device according to claim 9, wherein the first blower fan is a centrifugal fan that includes a rotation shaft and a plurality of blades disposed around the rotation shaft, suctions the air from a radially inner side, and blows out the air toward a radially outer side, the second blower fan is a centrifugal fan that includes a rotation shaft and a plurality of blades disposed around the rotation shaft, suctions the air from a radially inner side, and blows out the air toward a radially outer side, the first blower fan is disposed on end face sides of the driver's seat side outside air passage and the passenger's seat side outside air passage, and the second blower fan is disposed on end face sides of the driver's seat side inside air passage and the passenger's seat side inside air passage.

12. The air conditioning device according to claim 1, wherein the plurality of air passages includes an outside air passage in which an outside air flows, and an inside air passage in which an inside air flows, the suction side partitioning member and the blowing side partitioning member are fixed to the casing, the suction side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, the blowing side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, and a relative angle between the respective first portions of the suction side partitioning member and the blowing side partitioning member in the rotation direction of the rotary blower fan is smaller than a relative angle between the respective second portions of the suction side partitioning member and the blowing side partitioning member in the rotation direction of the rotary blower fan.

13. The air conditioning device according to claim 1, wherein the plurality of air passages includes a driver's seat side outside air passage in which an outside air to be blown out toward a driver's seat side flows, a passenger's seat side outside air passage in which the outside air to be blown out toward a passenger's seat side flows, a driver's seat side inside air passage in which an inside air to be blown out toward the driver's seat side flows, and a passenger's seat side inside air passage in which the inside air to be blown out toward the passenger's seat side flows, the rotary blower fan includes a first blower fan that suctions the air from the driver's seat side outside air passage and the driver's seat side inside air passage and blows out the air, and a second blower fan that suctions the air from the passenger's seat side outside air passage and the passenger's seat side inside air passage and blows out the air, the first blower fan is a centrifugal fan that includes a rotation shaft and a plurality of blades disposed around the rotation shaft, suctions the air from a radially inner side, and blows out the air toward a radially outer side, the second blower fan is a centrifugal fan that includes a rotation shaft and a plurality of blades disposed around the rotation shaft, suctions the air from a radially inner side, and blows out the air toward a radially outer side, the first blower fan is disposed on lateral sides of the driver's seat side outside air passage and the driver's seat side inside air passage, the second blower fan is disposed on lateral sides of the passenger's seat side outside air passage and the passenger's seat side inside air passage, the suction side partitioning member includes a driver's seat suction side partitioning member disposed on a suction side of the first blower fan and a passenger's seat suction side partitioning member disposed on a suction side of the second blower fan, the blowing side partitioning member includes a driver's seat blowing side partitioning member disposed on a blowing side of the first blower fan and a driver's seat blowing side partitioning member disposed on a blowing side of the second blower fan, the driver's seat suction side partitioning member, the passenger's seat suction side partitioning member, the driver's seat blowing side partitioning member, and the passenger's seat blowing side partitioning member are fixed to the casing, the driver's seat suction side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, the driver's seat blowing side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, a relative angle between the respective first portions of the driver's seat suction side partitioning member and the driver's seat blowing side partitioning member in the rotation direction of the rotary blower fan is smaller than a relative angle between the respective second portions of the driver's seat suction side partitioning member and the driver's seat blowing side partitioning member in the rotation direction of the rotary blower fan, the passenger's seat suction side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, the passenger's seat blowing side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, and a relative angle between the respective first portions of the passenger's seat suction side partitioning member and the passenger's seat blowing side partitioning member in the rotation direction of the rotary blower fan is smaller than a relative angle between the respective second portions of the passenger's seat suction side partitioning member and the passenger's seat blowing side partitioning member in the rotation direction of the rotary blower fan.

14. The air conditioning device according to claim 1, wherein the plurality of air passages includes a driver's seat side outside air passage in which an outside air to be blown out toward a driver's seat side flows, a passenger's seat side outside air passage in which the outside air to be blown out toward a passenger's seat side flows, a driver's seat side inside air passage in which an inside air to be blown out toward the driver's seat side flows, and a passenger's seat side inside air passage in which the inside air to be blown out toward the passenger's seat side flows, and the rotary blower fan is disposed on end face sides of the driver's seat side outside air passage, the passenger's seat side outside air passage, the driver's seat side inside air passage and the passenger's seat side inside air passage, suctions the air from the driver's seat side outside air passage, the passenger's seat side outside air passage, the driver's seat side inside air passage and the passenger's seat side inside air passage, and blows out the air.

15. The air conditioning device according to claim 1, wherein the casing includes a plurality of blowing opening portions that blows out the respective air flows separated by the blowing side partitioning member toward a space to be air-conditioned, separately, a virtual line segment that extends from a rotation center of the rotary blower fan toward one air passage of the plurality of air passages is defined as a suction side virtual line segment, a virtual line segment that extends from the rotation center of the rotary blower fan toward one blowing opening portion of the plurality of blowing opening portions for blowing out an air flow from the one air passage is defined as a blowing side virtual line segment, and when viewed in a rotation shaft direction of the rotary blower fan, an angle from the suction side virtual line segment to the blowing side virtual line segment in the rotation direction of the rotary blower fan is smaller than an angle from the suction side virtual line segment to the blowing side virtual line segment in a direction opposite to the rotation direction of the rotary blower fan.

16. The air conditioning device according to claim 15, wherein when viewed in the rotation shaft direction of the rotary blower fan, the suction side virtual line segment is a virtual line segment that bisects an angle defined between a virtual line segment, which connects the rotation center of the rotary blower fan and an end point of the one air passage that overlaps with an outer edge of the rotary blower fan and is located on one end side in the circumferential direction of the rotary blower fan, and a virtual line segment, which connects the rotation center of the rotary blower fan and an end point of the one air passage that overlaps with the outer edge of the rotary blower fan and is located on the other end side in the circumferential direction of the rotary blower fan, and the blowing side virtual line segment is a virtual line segment that connects a middle point of the one blowing opening portion in the width direction and the rotation center of the rotary blower fan when viewed in the rotation axis direction of the rotary blower fan.

17. The air conditioning device according to claim 15, further comprising:

a blowing duct that is connected to the casing and provides a blowing air passage for blowing out the air flows from the plurality of blowing opening portions toward the space to be air-conditioned; and an actuating device that moves at least one of the suction side partitioning member and the blowing side partitioning member so as to increase a deviation between the position of the suction side partitioning member and the position of the blowing side partitioning member in the rotation direction of the rotary blower fan with increase in pressure loss of the air flows in the casing and the blowing duct.

18. An air conditioning device, comprising:

a casing including a plurality of air passages;

a rotary blower fan that is disposed in the casing, suctions air from the plurality of air passages, and blows out the air;

a suction side partitioning member that is disposed on a suction side of the rotary blower fan in the casing, and separates air flows from the plurality of air passages from each other; and a blowing side partitioning member that is disposed on a blowing side of the rotary blower fan in the casing, and separates the air flows from the plurality of air passages from each other, wherein a position of the blowing side partitioning member is deviated from a position of the suction side partitioning member in a rotation direction of the rotary blower fan, the plurality of air passages includes an outside air passage in which an outside air flows, and an inside air passage in which an inside air flows, the suction side partitioning member and the blowing side partitioning member are fixed to the casing, the suction side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, the blowing side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, and a relative angle between the respective first portions of the suction side partitioning member and the blowing side partitioning member in the rotation direction of the rotary blower fan is smaller than a relative angle between the respective second portions of the suction side partitioning member and the blowing side partitioning member in the rotation direction of the rotary blower fan.

19. An air conditioning device, comprising:

a casing including a plurality of air passages;

a rotary blower fan that is disposed in the casing, suctions air from the plurality of air passages, and blows out the air;

a suction side partitioning member that is disposed on a suction side of the rotary blower fan in the casing, and separates air flows from the plurality of air passages from each other; and a blowing side partitioning member that is disposed on a blowing side of the rotary blower fan in the casing, and separates the air flows from the plurality of air passages from each other, wherein a position of the blowing side partitioning member is deviated from a position of the suction side partitioning member in a rotation direction of the rotary blower fan, the plurality of air passages includes a driver's seat side outside air passage in which an outside air to be blown out toward a driver's seat side flows, a passenger's seat side outside air passage in which the outside air to be blown out toward a passenger's seat side flows, a driver's seat side inside air passage in which an inside air to be blown out toward the driver's seat side flows, and a passenger's seat side inside air passage in which the inside air to be blown out toward the passenger's seat side flows, the rotary blower fan includes a first blower fan that suctions the air from the driver's seat side outside air passage and the driver's seat side inside air passage and blows out the air, and a second blower fan that suctions the air from the passenger's seat side outside air passage and the passenger's seat side inside air passage and blows out the air, the first blower fan is a centrifugal fan that includes a rotation shaft and a plurality of blades disposed around the rotation shaft, suctions the air from a radially inner side, and blows out the air toward a radially outer side, the second blower fan is a centrifugal fan that includes a rotation shaft and a plurality of blades disposed around the rotation shaft, suctions the air from a radially inner side, and blows out the air toward a radially outer side, the first blower fan is disposed on lateral sides of the driver's seat side outside air passage and the driver's seat side inside air passage, the second blower fan is disposed on lateral sides of the passenger's seat side outside air passage and the passenger's seat side inside air passage, the suction side partitioning member includes a driver's seat suction side partitioning member disposed on a suction side of the first blower fan and a passenger's seat suction side partitioning member disposed on a suction side of the second blower fan, the blowing side partitioning member includes a driver's seat blowing side partitioning member disposed on a blowing side of the first blower fan and a driver's seat blowing side partitioning member disposed on a blowing side of the second blower fan, the driver's seat suction side partitioning member, the passenger's seat suction side partitioning member, the driver's seat blowing side partitioning member, and the passenger's seat blowing side partitioning member are fixed to the casing, the driver's seat suction side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, the driver's seat blowing side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, a relative angle between the respective first portions of the driver's seat suction side partitioning member and the driver's seat blowing side partitioning member in the rotation direction of the rotary blower fan is smaller than a relative angle between the respective second portions of the driver's seat suction side partitioning member and the driver's seat blowing side partitioning member in the rotation direction of the rotary blower fan, the passenger's seat suction side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, the passenger's seat blowing side partitioning member includes a first portion that separates the outside air flow and the inside air flow from each other such that the rotation direction of the rotary blower fan is directed from the outside air flow toward the inside air flow, and a second portion that separates the outside air flow and the inside air flow from each other such that the rotation direction of the rotary blower fan is directed from the inside air flow toward the outside air flow, and a relative angle between the respective first portions of the passenger's seat suction side partitioning member and the passenger's seat blowing side partitioning member in the rotation direction of the rotary blower fan is smaller than a relative angle between the respective second portions of the passenger's seat suction side partitioning member and the passenger's seat blowing side partitioning member in the rotation direction of the rotary blower fan.

* * * * *